US007994250B2

(12) United States Patent
Origuchi et al.

(10) Patent No.: US 7,994,250 B2
(45) Date of Patent: Aug. 9, 2011

(54) VINYL-URETHANE COPOLYMERS WITH INTERMEDIARY LINKAGE SEGMENTS HAVING SILICON-OXYGEN BONDS AND PRODUCTION METHODS THEREOF

(75) Inventors: Toshiki Origuchi, Osaka (JP); Shintaro Ogawa, Osaka (JP); Yoshitaka Nakayama, Osaka (JP)

(73) Assignee: Konishi Co., Ltd., Osaka-shi (JP)

( * ) Notice: Subject to any disclaimer, the term of this patent is extended or adjusted under 35 U.S.C. 154(b) by 643 days.

(21) Appl. No.: 10/581,446

(22) PCT Filed: Dec. 2, 2004

(86) PCT No.: PCT/JP2004/018332
§ 371 (c)(1),
(2), (4) Date: Jul. 11, 2006

(87) PCT Pub. No.: WO2005/054341
PCT Pub. Date: Jun. 16, 2005

(65) Prior Publication Data
US 2007/0117902 A1 May 24, 2007

(30) Foreign Application Priority Data
Dec. 3, 2003 (JP) ................................ 2003-404029

(51) Int. Cl.
C08F 283/00 (2006.01)
C09G 77/06 (2006.01)
(52) U.S. Cl. ......................... 524/457; 524/837; 524/839
(58) Field of Classification Search .................. 524/457, 524/837
See application file for complete search history.

(56) References Cited

U.S. PATENT DOCUMENTS

| 4,130,708 | A | | 12/1978 | Friedlander et al. | |
|---|---|---|---|---|---|
| 4,762,887 | A | | 8/1988 | Griswold et al. | |
| 5,109,057 | A | * | 4/1992 | Tsuno et al. | 524/588 |
| 5,118,752 | A | * | 6/1992 | Chang et al. | 524/521 |
| 5,126,411 | A | * | 6/1992 | Rauterkus et al. | 525/455 |
| 5,258,443 | A | | 11/1993 | Nield et al. | |
| 5,320,769 | A | | 6/1994 | Kinoshita et al. | |
| 5,426,158 | A | * | 6/1995 | Mueller et al. | 525/455 |
| 5,541,251 | A | * | 7/1996 | Bontinck et al. | 524/507 |
| 5,543,445 | A | | 8/1996 | Nield et al. | |
| 5,554,686 | A | * | 9/1996 | Frisch et al. | 524/588 |
| 5,840,800 | A | * | 11/1998 | Joffre et al. | 524/806 |
| 5,854,332 | A | * | 12/1998 | Swarup et al. | 524/507 |
| 6,031,041 | A | * | 2/2000 | Chung et al. | 524/507 |
| 6,046,295 | A | * | 4/2000 | Frisch et al. | 528/28 |
| 6,524,564 | B1 | | 2/2003 | Kim et al. | |
| 6,579,517 | B1 | * | 6/2003 | Kim et al. | 424/70.12 |
| 7,101,405 | B2 | | 9/2006 | Cottard et al. | |
| 7,122,599 | B2 | | 10/2006 | Haubennestel et al. | |
| 7,172,809 | B2 | * | 2/2007 | Barancyk et al. | 428/323 |
| 7,576,167 | B2 | * | 8/2009 | Mori et al. | 528/13 |
| 2004/0204539 | A1 | * | 10/2004 | Schindler et al. | 524/588 |
| 2007/0117902 | A1 | | 5/2007 | Origuchi et al. | |
| 2009/0326151 | A1 | * | 12/2009 | Shimizu et al. | 525/102 |

FOREIGN PATENT DOCUMENTS

| EP | 549849 A | | 7/1993 |
|---|---|---|---|
| EP | 549849 A1 | | 7/1993 |
| JP | 5-186717 A | | 7/1993 |
| JP | 8-73596 A | | 3/1996 |
| JP | 11-263905 A | | 9/1999 |
| JP | 2001-2911 A | | 1/2001 |
| JP | 2001-40048 A | | 2/2001 |
| JP | 2001-323040 A | | 11/2001 |
| JP | 2003-238795 A | | 8/2003 |
| JP | 2003238795 | * | 8/2003 |
| JP | 2004-035590 | * | 2/2004 |
| JP | 2004-35590 A | | 2/2004 |
| JP | 2004-182934 | * | 7/2004 |
| JP | 2004-182934 A | | 7/2004 |
| WO | WO 00/12588 A1 | | 3/2000 |
| WO | WO 03/011937 A1 | | 2/2003 |
| WO | WO 2005/054341 A1 | | 6/2005 |
| WO | WO 2006/073174 A | | 7/2006 |

OTHER PUBLICATIONS

Lai. Journal of Applied Polymer Science 56, 301-310 (1995).*
Morita. English Translation of JP 2004-182934.*
Nomura et al. AIPN/JPO Englsih machine translation of JP 2004-035590.*
Mori et al. AIPN/JPO Englsih machine translation of JP 2003-238795.*
STIC search results.*

(Continued)

Primary Examiner — Mark Eashoo
Assistant Examiner — Michael A Salvitti
(74) Attorney, Agent, or Firm — Birch, Stewart, Kolasch & Birch, LLP

(57) ABSTRACT

To provide vinyl-urethane copolymers that can form cured articles having excellent hot-water resistance, water resistance, heat resistance, and weather resistance, and to provide production methods thereof.
A vinyl-urethane copolymer contains at least one vinyl polymer chain and at least one urethane polymer chain, in which the vinyl polymer chain is combined with the urethane polymer chain through a linkage segment having a silicon-oxygen bond.
A method produces a vinyl-urethane copolymer comprising at least one vinyl polymer chain and at least one urethane polymer chain, in which the vinyl polymer chain is combined with the urethane polymer chain through a linkage segment having a silicon-oxygen bond, by following Steps (X) and (Y): Step (X) of carrying out preparation of an aqueous dispersion or aqueous solution of a urethane polymer (A) having at least one silicon-containing hydrolyzable group; and Step (Y) of, in the aqueous dispersion or aqueous solution of the urethane polymer (A) having at least one silicon-containing hydrolyzable group, carrying out polymerization of an ethylenically unsaturated monomer (B) and carrying out preparation of a vinyl-urethane copolymer using a compound (C) having at least one functional group reactive with a silicon-containing hydrolyzable group and at least one functional group reactive with an ethylenically unsaturated bond-containing group in at least one period selected from before the polymerization reaction, during the polymerization reaction, and after the polymerization reaction.

14 Claims, 1 Drawing Sheet

OTHER PUBLICATIONS

Advisory Action dated Apr. 15, 2010 in U.S. Appl. No. 10/581,446.
Examiner Interview dated Mar. 15, 2010 in U.S. Appl. No. 10/581,446.
Final Rejection dated Dec. 1, 2009 in U.S. Appl. No. 10/581,446.
International Search Report dated Mar. 15, 2005 in Application No. PCT/JP2004/018332.
Lai et al., "Novel Polyurethane-Silicone Hydrogels," Journal of Applied Polymer Science, vol. 56, pp. 301-310, 1995.
Non-Final Rejection dated May 15, 2009 in U.S. Appl. No. 10/581,446.
Non-Final Rejection dated Oct. 29, 2010 in U.S. Appl. No. 10/581,446.
Non-Final Rejection dated Sep. 29, 2008 in U.S. Appl. No. 10/581,446.
STIC Search Results, pp. 1-409, Jul. 13, 2010.
International Search Report dated Oct. 2, 2007 in Application No. PCT/JP2007/063106.
Non-final Rejection dated Nov. 23, 2010 in U.S. Appl. No. 12/306,887.

* cited by examiner

VINYL-URETHANE COPOLYMERS WITH INTERMEDIARY LINKAGE SEGMENTS HAVING SILICON-OXYGEN BONDS AND PRODUCTION METHODS THEREOF

TECHNICAL FIELD

The present invention relates to vinyl-urethane copolymers each having a vinyl polymer chain and a urethane polymer chain, and to production methods thereof. More specifically, it relates to vinyl-urethane copolymers, such as acrylic-urethane copolymers and acrylic-silicone-urethane copolymers, which can form cured articles excellent in hot-water resistance, water resistance, heat resistance, and weather resistance, and to production methods thereof.

BACKGROUND ART

Demands have been made to provide, for example, water-based (aqueous) adhesives, sealing materials, and paints for mitigating environmental issues. A variety of compounds have been proposed for these water-based treating agents such as water-based adhesives, water-based sealing materials, and water-based paints so as to improve their adhesion as well as properties of the resulting cured articles (e.g., coatings), such as hot-water resistance, water resistance, heat resistance, weather resistance, and optical transparency. Examples of these compounds can be found in Japanese Unexamined Patent Application Publication (JP-A) No. 11-263905, JP-A No. 2001-40048, and JP-A No. 2001-2911. However, no compound has been provided which can form cured articles sufficiently satisfying all the properties including hot-water resistance, water resistance, heat resistance, weather resistance, and optical transparency.

DISCLOSURE OF INVENTION

Accordingly, an object of the present invention is to provide a vinyl-urethane copolymer that can form cured articles having excellent hot-water resistance, water resistance, heat resistance, and weather resistance, even though it is water-based (aqueous), and to provide a method that can efficiently produce the vinyl-urethane copolymer.

Another object of the present invention is to provide a method for efficiently producing a vinyl-urethane copolymer even without using an organic solvent.

After intensive investigations to achieve the above objects, the present inventors have found that a vinyl-urethane copolymer can be highly efficiently prepared by bonding a vinyl polymer chain, such as an acrylic polymer chain, to a specific urethane polymer through the intermediary of a specific linkage segment using a specific polymerization method, and that the vinyl-urethane copolymer can form coatings and other cured articles excellent in hot-water resistance, water resistance, heat resistance, and weather resistance, even though it is a water-based substance. The present invention has been achieved based on these findings.

Specifically, the present invention provides a vinyl-urethane copolymer comprising at least one vinyl polymer chain and at least one urethane polymer chain, the vinyl polymer chain being combined with the urethane polymer chain through the intermediary of a linkage segment having a silicon-oxygen bond.

In the vinyl-urethane copolymers according to the present invention, the urethane polymer chain is preferably a residue of a urethane polymer (A) having at least one silicon-containing hydrolyzable group, and the vinyl polymer chain is preferably a residue of a polymer derived from an ethylenically unsaturated monomer (B) and a compound (C) as monomer components, wherein the compound (C) comprises at least one functional group reactive with a silicon-containing hydrolyzable group and at least one functional group reactive with an ethylenically unsaturated bond-containing group. The linkage segment is preferably a silicone polymer chain. The silicone polymer chain can be derived from: a silicon-containing hydrolyzable group of a urethane polymer (A) having at least one silicon-containing hydrolyzable group; a functional group reactive with a silicon-containing hydrolyzable group of a compound (C) having at least one functional group reactive with a silicon-containing hydrolyzable group and at least one functional group reactive with an ethylenically unsaturated bond-containing group; and a silane compound (D) comprising at least one silicon-containing hydrolyzable group.

The urethane polymer (A) having at least one silicon-containing hydrolyzable group is preferably an alkoxysilylated urethane polymer (A1) containing at least one hydrophilic group. The alkoxysilylated urethane polymer (A1) containing at least one hydrophilic group is preferably a urethane polymer containing at least one hydrophilic group and having at least one terminal alkoxysilyl group, the urethane polymer corresponding to a hydrophilic group-containing urethane polymer, except with at least part of terminal isocyanate groups being alkoxysilylated. Among such urethane polymers, preferred is a urethane polymer containing at least one hydrophilic group and having at least one terminal alkoxysilyl group, as a reaction product among a compound (A1-a) containing plural isocyanate-reactive groups and having no hydrophilic group; a compound (A1-b) containing at least one hydrophilic group and plural isocyanate-reactive groups; a polyisocyanate compound (A1-c); and an alkoxysilane compound (A1-d) containing at least one isocyanate-reactive group.

The silane compound (D) having a silicon-containing hydrolyzable group can preferably be an alkoxy group-containing silane compound.

The ethylenically unsaturated monomer (B) preferably comprises an acrylic monomer.

The compound (C) having at least one functional group reactive with a silicon-containing hydrolyzable group and at least one functional group reactive with an ethylenically unsaturated bond-containing group is preferably a compound comprising a silicon-containing hydrolyzable group and an ethylenically unsaturated bond-containing group, or a compound comprising a silicon-containing hydrolyzable group and a mercapto group.

The present invention further provides a method for producing a vinyl-urethane copolymer comprising at least one vinyl polymer chain and at least one urethane polymer chain, the vinyl polymer chain being combined with the urethane polymer chain through the intermediary of a linkage segment having a silicon-oxygen bond, the method comprising following Steps (X) and (Y):

Step (X) of carrying out preparation of an aqueous dispersion or aqueous solution of a urethane polymer (A) having at least one silicon-containing hydrolyzable group; and Step (Y) of, in the aqueous dispersion or aqueous solution of the urethane polymer (A) having at least one silicon-containing hydrolyzable group, carrying out polymerization of an ethylenically unsaturated monomer (B), and carrying out preparation of a vinyl-urethane copolymer using a compound (C) in at least one period selected from the group consisting of before the polymerization reaction, during the polymerization reaction, and after the polymerization reaction, the compound (C) having at least one functional group reactive with a silicon-containing hydrolyzable group and at least one functional group reactive with an ethylenically unsaturated bond-containing group.

Step (Y) can be at least one step selected from the group consisting of following Steps (Y1-a), (Y1-b), (Y1-c), and (Y1-d):

Step (Y1-a) of, in the aqueous dispersion or aqueous solution of the urethane polymer (A) having at least one silicon-containing hydrolyzable group, carrying out the polymerization of the ethylenically unsaturated monomer (B) simultaneously with a reaction using the compound (C) having at least one functional group reactive with a silicon-containing hydrolyzable group and at least one functional group reactive with an ethylenically unsaturated bond-containing group, to thereby yield a vinyl-urethane copolymer;

Step (Y1-b) of, in the aqueous dispersion or aqueous solution of the urethane polymer (A) having at least one silicon-containing hydrolyzable group, carrying out the polymerization of the ethylenically unsaturated monomer (B) and subsequently carrying out a reaction using the compound (C) having at least one functional group reactive with a silicon-containing hydrolyzable group and at least one functional group reactive with an ethylenically unsaturated bond-containing group, to thereby yield a vinyl-urethane copolymer;

Step (Y1-c) of, in the aqueous dispersion or aqueous solution of the urethane polymer (A) having at least one silicon-containing hydrolyzable group, carrying out a reaction using the functional group reactive with a silicon-containing hydrolyzable group of the compound (C) having at least one functional group reactive with a silicon-containing hydrolyzable group and at least one functional group reactive with an ethylenically unsaturated bond-containing group, and subsequently carrying out the polymerization of the ethylenically unsaturated monomer (B) simultaneously with a reaction using the functional group reactive with an ethylenically unsaturated bond-containing group of the compound (C) having at least one functional group reactive with a silicon-containing hydrolyzable group and at least one functional group reactive with an ethylenically unsaturated bond-containing group, to thereby yield a vinyl-urethane copolymer; and Step (Y1-d) of, in the aqueous dispersion or aqueous solution of the urethane polymer (A) having at least one silicon-containing hydrolyzable group, carrying out a reaction using the functional group reactive with a silicon-containing hydrolyzable group of the compound (C) having at least one functional group reactive with a silicon-containing hydrolyzable group and at least one functional group reactive with an ethylenically unsaturated bond-containing group, subsequently carrying out the polymerization of the ethylenically unsaturated monomer (B) and a reaction using the functional group reactive with an ethylenically unsaturated bond-containing group of the compound (C) having at least one functional group reactive with a silicon-containing hydrolyzable group and at least one functional group reactive with an ethylenically unsaturated bond-containing group simultaneously with a reaction using another additional portion of the compound (C) having at least one functional group reactive with a silicon-containing hydrolyzable group and at least one functional group reactive with an ethylenically unsaturated bond-containing group, to thereby yield a vinyl-urethane copolymer.

Step (Y) can also be at least one step selected from the group consisting of following Steps (Y2-a), (Y2-b) and (Y2-c):

Step (Y2-a) of, in the aqueous dispersion or aqueous solution of the urethane polymer (A) having at least one silicon-containing hydrolyzable group, carrying out hydrolysis or condensation of a silane compound (D) having a silicon-containing hydrolyzable group, subsequently carrying out the polymerization of the ethylenically unsaturated monomer (B) and carrying out preparation of a vinyl-urethane copolymer using the compound (C) having at least one functional group reactive with a silicon-containing hydrolyzable group and at least one functional group reactive with an ethylenically unsaturated bond-containing group in at least one period selected from the group consisting of before the hydrolysis or condensation reaction, during the hydrolysis or condensation reaction, after the hydrolysis or condensation reaction and before the polymerization reaction, during the polymerization reaction, and after the polymerization reaction;

Step (Y2-b) of, in the aqueous dispersion or aqueous solution of the urethane polymer (A) having at least one silicon-containing hydrolyzable group, carrying out the polymerization of the ethylenically unsaturated monomer (B) simultaneously with hydrolysis or condensation of a silane compound (D) having a silicon-containing hydrolyzable group, and carrying out preparation of a vinyl-urethane copolymer using the compound (C) having at least one functional group reactive with a silicon-containing hydrolyzable group and at least one functional group reactive with an ethylenically unsaturated bond-containing group in at least one period selected from the group consisting of before the hydrolysis or condensation reaction and the polymerization reaction, during the hydrolysis or condensation reaction and the polymerization reaction, and after the hydrolysis or condensation reaction and the polymerization reaction; and Step (Y2-c) of, in the aqueous dispersion or aqueous solution of the urethane polymer (A) having at least one silicon-containing hydrolyzable group, carrying out the polymerization of the ethylenically unsaturated monomer (B), subsequently carrying out hydrolysis or condensation of a silane compound (D) having a silicon-containing hydrolyzable group, and carrying out preparation of a vinyl-urethane copolymer using the compound (C) having at least one functional group reactive with a silicon-containing hydrolyzable group and at least one functional group reactive with an ethylenically unsaturated bond-containing group in at least one period selected from the group consisting of before the polymerization reaction, after the polymerization reaction and before the hydrolysis or condensation reaction, during the hydrolysis or condensation reaction, and after the hydrolysis or condensation reaction.

The silane compound (D) having a silicon-containing hydrolyzable group used in Steps (Y2-a), (Y2-b), and (Y2-c) preferably comprises a silane compound having at least one functional group reactive with an ethylenically unsaturated bond-containing group in combination with a silane compound free from a functional group reactive with an ethylenically unsaturated bond-containing group.

Step (X) is preferably following Step (X1):

Step (X1) of carrying out preparation of a urethane polymer (A) having at least one silicon-containing hydrolyzable group using an ethylenically unsaturated monomer (B) as a solvent to yield a reaction mixture, and dispersing or dissolving the reaction mixture in water to thereby yield an aqueous dispersion or aqueous solution of the urethane polymer (A) having at least one silicon-containing hydrolyzable group.

The urethane polymer (A) having at least one silicon-containing hydrolyzable group, the ethylenically unsaturated monomer (B), the compound (C) having at least one functional group reactive with a silicon-containing hydrolyzable group and at least one functional group reactive with an ethylenically unsaturated bond-containing group, and the silane compound (D) having a silicon-containing hydrolyzable group, and other components used typically in Step (X) and/or Step (Y) are as above.

BEST MODE FOR CARRYING OUT THE INVENTION

[Vinyl-urethane copolymers]

Figure 1:
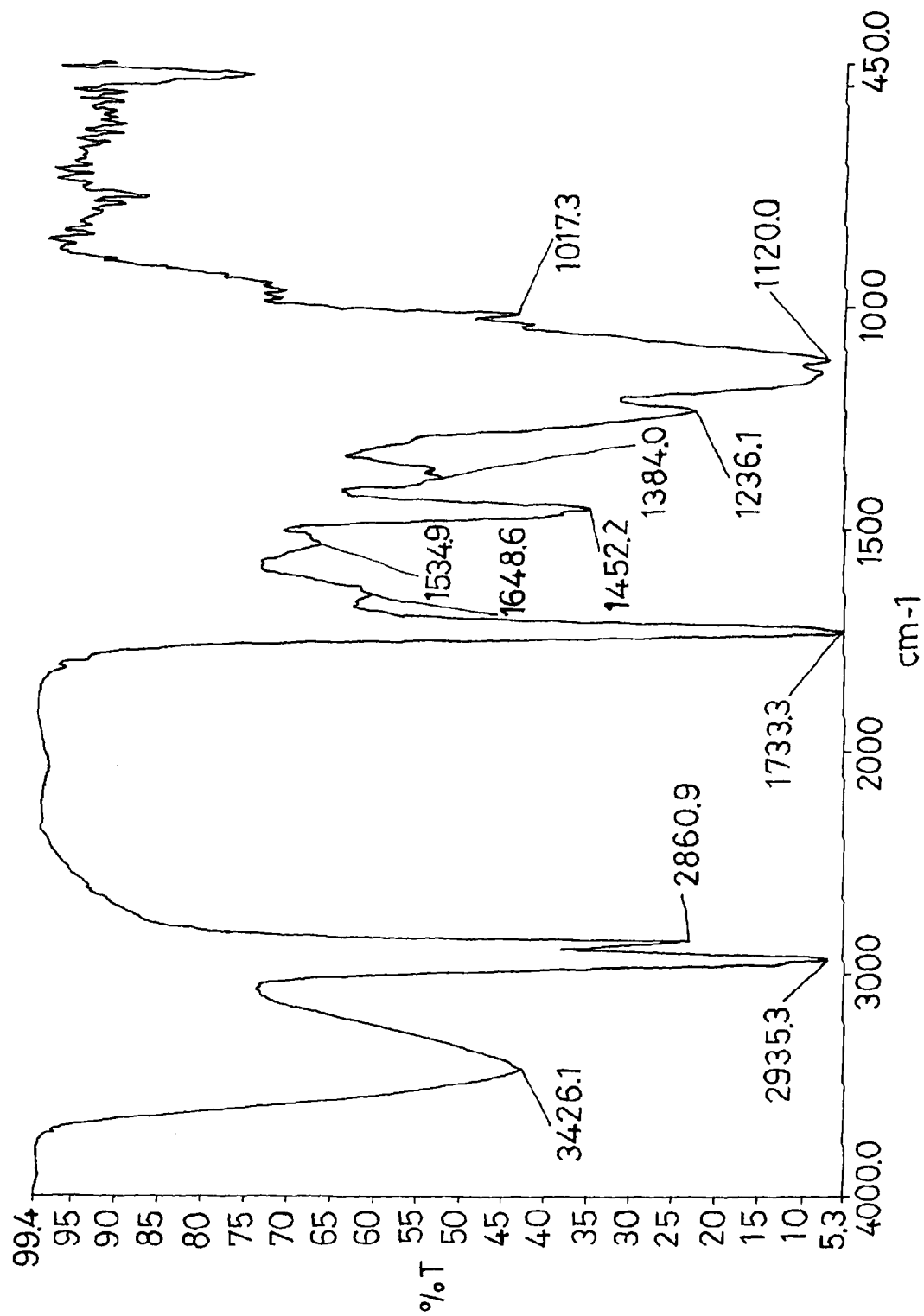
FIG. 1 shows the infrared absorption spectral data of a vinyl-silicone-urethane copolymer (vinyl-urethane terpolymer) according to Example 10.

The vinyl-urethane copolymers according to the present invention are vinyl-urethane copolymers comprising at least one vinyl polymer chain and at least one urethane polymer chain, in which the vinyl polymer chain is combined with the urethane polymer chain through the intermediary of a linkage segment having a silicon-oxygen bond (siloxane bond; Si—O bond) (hereinafter also referred to as "Si—O bond-containing linkage segment"). More specifically, the vinyl-urethane copolymers according to the present invention can be represented, for example, by following Formula (1):

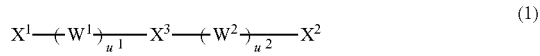

wherein $X^1$ represents a urethane polymer chain; $X^2$ represents a vinyl polymer chain; $X^3$ represents a Si—O bond-containing linkage segment; $W^1$ represents a bivalent organic group; $W^2$ represents a bivalent organic group; $u^1$ denotes 0 or 1; and $u^2$ denotes 0 or 1.

When $u^1$ in Formula (1) is 1, it means that the urethane polymer chain $X^1$ and the Si—O bond-containing linkage segment $X^3$ are combined with each other through the intermediary of the bivalent organic group $W^1$. When $u^1$ is 0, it means that the urethane polymer chain $X^1$ and the Si—O bond-containing linkage segment $X^3$ are directly combined with each other without the intermediary of the bivalent organic group $W^1$. When $u^2$ is 1, it means that the vinyl polymer chain $X^2$ and the Si—O bond-containing linkage segment $X^3$ are combined with each other through the intermediary of the bivalent organic group $W^2$. When $u^2$ is 0, it means that the vinyl polymer chain $X^2$ and the Si—O bond-containing linkage segment $X^3$ are directly combined with each other without the intermediary of the bivalent organic group $W^2$.

Consequently, the vinyl-urethane copolymers represented by Formula (1) have configurations in which the urethane polymer chain $X^1$ and the Si—O bond-containing linkage segment $X^3$ are combined with each other with or without the intermediary of the bivalent organic group $W^1$; and the vinyl polymer chain $X^2$ and the Si—O bond-containing linkage segment $X^3$ are combined with each other with or without the intermediary of the bivalent organic group $W^2$.

The bivalent organic group $W^1$ is not specifically limited, as long as it is a bivalent organic group that can combine the urethane polymer chain $X^1$ and the Si—O bond-containing linkage segment $X^3$ with each other. It can be selected as appropriate from among bivalent organic groups comprising organic atoms such as carbon atom, nitrogen atom, oxygen atom, and hydrogen atom. More specific examples of the bivalent organic group $W^1$ include bivalent hydrocarbon groups such as bivalent aliphatic hydrocarbon groups, bivalent alicyclic hydrocarbon groups, bivalent aromatic hydrocarbon groups, and groups each comprising two or more of these groups in combination; and carbonyl group, oxy group, imino group, thiocarbonyl group, thioxy group, and groups comprising two or more of these groups such as "—NH—C(=O)—NH—(bivalent hydrocarbon group)—" group, "—NH—C(=O)—S—(bivalent hydrocarbon group)-" group, and "—NH—C(=O)—NH—(bivalent hydrocarbon group)-NH-(bivalent hydrocarbon group)-" group. Each of these groups may have one or more substituents. The substituents are preferably inactive substituents such as hydrocarbon groups. The substituents can each be bound to, for example, a carbon atom in the bivalent hydrocarbon group, or to the nitrogen atom in an imino group or the "—NH—" moiety.

The bivalent organic group $W^2$ is not specifically limited, as long as it is a bivalent organic group that can combine the vinyl polymer chain $X^2$ and the Si—O bond-containing linkage segment $X^3$. It can be selected as appropriate from among bivalent organic groups comprising organic atoms such as carbon atom, nitrogen atom, oxygen atom, and hydrogen atom. More specific examples of the bivalent organic group $W^2$ include bivalent hydrocarbon groups such as bivalent aliphatic hydrocarbon groups, bivalent alicyclic hydrocarbon groups, bivalent aromatic hydrocarbon groups, and groups each comprising two or more of these groups in combination; and carbonyl group, oxy group, imino group, thiocarbonyl group, thioxy group, and groups comprising two or more of these groups, such as "—O—C(=O)—" group, "—NH—C(=O)—" group, "-(bivalent hydrocarbon group)-O—C(=O)—" group, and "-(bivalent hydrocarbon group)-NH—C(=O)—" group. Each of these groups may have one or more substituents. The substituents are preferably inactive substituents such as hydrocarbon groups. The substituents can each be bound to, for example, a carbon atom in the bivalent hydrocarbon group, or to a nitrogen atom of the imino group or of the "—NH—" moiety.

As is described above, the vinyl-urethane copolymers according to the present invention may further comprise one or more bivalent organic groups interposing between the vinyl polymer chain and the Si—O bond-containing linkage segment and/or between the urethane polymer chain and the Si—O bond-containing linkage segment, as long as a vinyl polymer chain and a urethane polymer chain are combined with each other through the intermediary of a Si—O bond-containing linkage segment. Specifically, the vinyl-urethane copolymers according to the present invention each have a configuration comprising a vinyl polymer chain and a urethane polymer chain, in which the vinyl polymer chain and the urethane polymer chain are combined with each other through the intermediary of a Si—O bond-containing linkage segment, wherein the urethane polymer chain and the Si—O bond-containing linkage segment are combined with each other with or without the intermediary of a bivalent organic group, and the vinyl polymer chain and the Si—O bond-containing linkage segment are combined with each other with or without the intermediary of a bivalent organic group.

The Si—O bond-containing linkage segments in the vinyl-urethane copolymers according to the present invention can be any of low-molecular-weight or relatively low-molecular weight Si—O bond-containing linkage segments and high-molecular-weight or relatively high-molecular-weight Si—O bond-containing linkage segments, as long as they each have at least one Si—O bond. Specifically, examples of the Si—O bond-containing linkage segments are a Si—O bond-containing linkage segment having a skeleton or principal chain represented by "—(Si—O)g$^1$-Si—", wherein g$^1$ is an integer of 1 or more; and a Si—O bond-containing linkage segment having a skeleton or principal chain represented by "—(Si—O)g$^2$-V—(O—Si)g$^3$-", wherein V is a bivalent organic group except for a group represented by "—(Si—O)g$^4$-Si—", wherein g$^4$ is an integer of 1 or more; g$^2$ is an integer of 1 or more; and g$^3$ is an integer of 1 or more. Naturally "Si" means a silicon atom; and "O" means an oxygen atom. When the Si—O bond-containing linkage segment is a high-molecular-weight or relatively high-molecular-weight Si—O bond-containing linkage segment, the high-molecular-weight Si—O bond-containing linkage segment can be used as a silicone polymer chain. In contrast, when the Si—O bond-containing linkage segment is a low-molecular-weight or relatively low-molecular-weight Si—O bond-containing linkage segment, the low-molecular-weight Si—O bond-containing linkage segment can be used as a silicone segment.

The Si—O bond-containing linkage segments, especially high-molecular-weight Si—O bond-containing linkage segments, may have a network structure. When the Si—O bond-containing linkage segment is a high-molecular-weight Si—O bond-containing linkage segment (silicone polymer chain), it may comprise one silicone polymer chain to which plural urethane polymer chains and/or plural vinyl polymer chains are bound, or, alternatively, it may comprise plural silicone polymer chains bound to one urethane polymer chain or one vinyl polymer chain. It is not always necessary that one or more urethane polymer chains and one or more vinyl polymer chains are bound to every silicone polymer chain.

Consequently the vinyl-urethane copolymers according to the present invention are (1) vinyl-urethane copolymers each having two polymer chains, i.e., a vinyl polymer chain and a urethane polymer chain, as polymer chains (hereinafter also referred to as "vinyl-urethane bipolymers"), or (2) vinyl-urethane copolymers each having three polymer chains, i.e., a vinyl polymer chain, a silicone polymer chain, and a urethane polymer chain, as polymer chains (vinyl-silicone-urethane copolymers; hereinafter also referred to as "vinyl-urethane terpolymers".

As is described above, vinyl-urethane copolymers in the present invention are classified as vinyl-urethane bipolymers and vinyl-urethane terpolymers according to whether the Si—O bond-containing linkage segment is a low-molecular-weight Si—O bond-containing linkage segment or a high-molecular-weight Si—O bond-containing linkage segment. This classification, however, is conducted only for the sake of convenience. Specifically, there is the case where no significant difference can be found between some vinyl-urethane bipolymers and some vinyl-urethane terpolymers, and in this case, the copolymers can be classified as one of the two categories as appropriate or can be classified as belonging to the two categories.

The urethane polymer chains in the vinyl-urethane copolymers are not specifically limited, as long as they are polymer chains comprising polymers having a urethane bond. Such polymers preferably have a urethane bond in their principal chain or skeleton. The urethane polymer chains are preferably residues of the urethane polymers (A) having at least one silicon-containing hydrolyzable group. Consequently, the urethane polymer chains may comprise, for example, a urethane polymer in the urethane polymer (A) having at least one silicon-containing hydrolyzable group (e.g., a urethane polymer segment in the principal chain or skeleton of the urethane polymer).

The vinyl polymer chains in the vinyl-urethane copolymers are not specifically limited, as long as they are polymer chains comprising polymers derived from a vinyl-containing monomer component. They are preferably residues derived from polymers (vinyl polymers) each comprising an ethylenically unsaturated monomer (B) and a compound (C) as monomer components, which compound (C) comprises at least one functional group reactive with a silicon-containing hydrolyzable group and at least one functional group reactive with an ethylenically unsaturated bond-containing group. The vinyl polymer chains can therefore basically comprise a polymer (vinyl polymer) derived from an ethylenically unsaturated monomer (B), such as a vinyl polymer segment of the principal chain or skeleton in the vinyl polymer.

When the vinyl-urethane copolymers have a silicone polymer chain, the silicone polymer chain can be constituted by the silicon-containing hydrolyzable group of the urethane polymer (A) having at least one silicon-containing hydrolyzable group; the functional group reactive with a silicon-containing hydrolyzable group of the compound (C) having at least one functional group reactive with a silicon-containing hydrolyzable group and at least one functional group reactive with an ethylenically unsaturated bond-containing group; and a silane compound (D) comprising at least one silicon-containing hydrolyzable group. The silicone polymer chain preferably basically comprises a polymer of a silane compound (D) having a silicon-containing hydrolyzable group (silicone polymer), such as a silicone polymer segment of the principal chain or skeleton of the silicone polymer.

A compound (C) having at least one functional group reactive with an ethylenically unsaturated bond-containing group, and a silicon-containing hydrolyzable group as the functional group reactive with a silicon-containing hydrolyzable group can form a silicone polymer chain, because the compound (C) in this case is a silane compound having a silicon-containing hydrolyzable group. Namely, some of the compounds (C) having at least one functional group reactive with a silicon-containing hydrolyzable group and at least one functional group reactive with an ethylenically unsaturated bond-containing group can also be used as a silane compound (D) having a silicon-containing hydrolyzable group. Consequently, some silicone polymer chains may comprise a polymer chain containing the compound (C) having at least one functional group reactive with a silicon-containing hydrolyzable group and at least one functional group reactive with an ethylenically unsaturated bond-containing group as a constitutional unit.

The vinyl-urethane copolymers according to the present invention can be represented, for example, by following Formula (2):

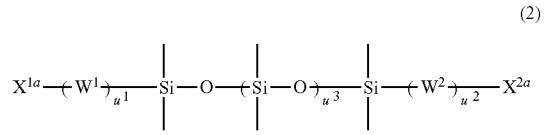

(2)

wherein $X^{1a}$ represents a residue of a urethane polymer (A) having at least one silicon-containing hydrolyzable group; $X^{2a}$ represents a residue of a polymer derived from an ethylenically unsaturated monomer (B) and a compound (C) having at least one functional group reactive with a silicon-containing hydrolyzable group and at least one functional group reactive with an ethylenically unsaturated bond-containing group, as monomer components; $u^3$ is an integer of 1 or more; and $W^1$, $W^2$, $u^1$, and $u^2$ are as defined above, when the Si—O bond-containing linkage segment is a silicone polymer chain having a skeleton or principal chain comprising silicon atom (Si) and oxygen atom (O) alone, the urethane polymer chain is a residue of a urethane polymer (A) having at least one silicon-containing hydrolyzable group, and the vinyl polymer chain is a residue of a polymer derived from, as monomer components, an ethylenically unsaturated monomer (B) and a compound (C) having at least one functional group reactive with a silicon-containing hydrolyzable group and at least one functional group reactive with an ethylenically unsaturated bond-containing group.

Formula (2) indicates only the skeleton or principal chain of a silicone polymer chain. Specifically, the "Si—O—(Si—O) $u^3$-Si" moiety in Formula (2) means the skeleton or principal chain of the silicone polymer chain. To each of silicon atoms in the skeleton or principal chain of the silicone polymer chain, for example, a hydrocarbon group (e.g., an alkyl group), hydrogen atom, hydroxyl group, a hydrocarbon-oxy group (e.g., an alkoxy group), and/or a silicone polymer chain can be bound. Likewise, a urethane polymer chain and/or a vinyl polymer chain may be bound thereto with or without the intermediary of a bivalent organic group. When another silicone polymer chain is bound to the silicone polymer chain in Formula (2), a urethane polymer chain and/or a vinyl polymer chain may be bound to a terminal of the other silicone polymer chain with or without the intermediary of a bivalent organic group. A hydrocarbon group (e.g., an alkyl group), hydrogen atom, hydroxyl group, a hydrocarbon-oxy group (e.g., an alkoxy group), and/or a silicone polymer chain, for example, can be bound to each of silicon atoms in the skeleton or principal chain of the other silicone polymer chain. A urethane polymer chain and/or a vinyl polymer chain may be bound thereto with or without the intermediary of a bivalent organic group, as in the silicone polymer chain.

In Formula (2), $u^3$ is not specifically limited, as long as it is an integer of 1 or more (a positive integer), and can be selected as appropriate according to the vinyl-urethane copolymer having a target structure.

$X^{1a}$ in Formula (2) is a residue of a urethane polymer (A) having at least one silicon-containing hydrolyzable group, and the urethane polymer (A) having at least one silicon-containing hydrolyzable group can be represented by following Formula (2a). $X^{2a}$ is a residue of a polymer (vinyl polymer) derived from, as monomer components, an ethylenically unsaturated monomer (B) and a compound (C) having at least one functional group reactive with a silicon-containing hydrolyzable group and at least one functional group reactive with an ethylenically unsaturated bond-containing group, and the polymer can be represented by following Formula (2b):

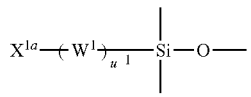

(2a)

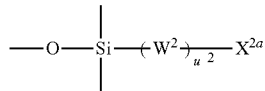

(2b)

wherein $X^{1a}$, $X^{2a}$, $W^1$, $W^2$, $u^1$, and $u^2$ are as defined above.

While not clearly indicated in Formulae (2a) and (2b), a hydrocarbon group (e.g., an alkyl group), hydrogen atom, hydroxyl group, or a hydrocarbon-oxy group (e.g., an alkoxy group) is bound to each of the silicon atom in Formula (2a) and the silicon atom in Formula (2b). Three groups (including hydrogen atoms) can be bound to such a silicon atom, and these three groups can be the same as one another, partially same as each other, or different from one another. The oxygen atoms bound to the silicon atoms in Formulae (2a) and (2b) are oxygen atoms in a hydroxyl group or a hydrocarbon-oxy group. Thus, each at least one hydroxyl group or hydrocarbon-oxy group is essentially bound to the silicon atoms in the urethane polymer (A) having at least one silicon-containing hydrolyzable group represented by Formula (2a) and the polymer represented by Formula (2b).

Urethane Polymers (A) Having at Least One Silicon-Containing Hydrolyzable Group

The urethane polymers (A) having at least one silicon-containing hydrolyzable group (hereinafter also referred to as "urethane polymers (A)") are not specifically limited, as long as they are each a polymer which has a urethane polymer chain containing a urethane bond per molecule (especially as the skeleton of a principal chain) and contains at least one silicon-containing hydrolyzable group per molecule. In these urethane polymers (A), the method for introducing a silicon-containing hydrolyzable group into a urethane polymer is not specifically limited and can be, for example, a conventional method for introducing a silicon-containing hydrolyzable group into a urethane polymer having no hydrolyzable silicon atom, or an analogous method to the conventional method. Examples of the method include a method of using a monomer having a silicon-containing hydrolyzable group as a monomer component constituting a urethane polymer; and a method of reacting a urethane polymer having a functional group with a compound having a silicon-containing hydrolyzable group and a functional group reactive with the functional group of the urethane polymer. Specifically, the former method can be a method of using, as monomer components, a compound having at least one silicon-containing hydrolyzable group and plural isocyanate-reactive groups, and a polyisocyanate compound having a silicon-containing hydrolyzable group. Examples of isocyanate-reactive groups are hydroxyl group, isocyanate group, amino group, epoxy group, and mercapto group. The latter method can be a method of reacting a urethane polymer having hydroxyl group, isocyanate group, amino group, epoxy group, and/or mercapto group as a functional group with a silicon-containing hydrolyzable compound (e.g., an alkoxysilane compound) having a silicon-containing hydrolyzable group, hydroxyl group, isocyanate group, amino group, epoxy group, and/or mercapto group as a functional group reactive with the functional group of the urethane polymer. For example, an after-mentioned alkoxysilane compound (A1-d) containing at least one isocyanate-reactive group can be used as the compound having a silicon-containing hydrolyzable group and a functional group reactive with the functional group of the urethane polymer.

Each of these urethane polymers (A) can be used alone or in combination.

The urethane polymers (A) preferably each have a hydrolyzable silyl group as the silicon-containing hydrolyzable group. Accordingly, a urethane polymer having a hydrolyzable silyl group (hydrolyzable silylated urethane polymer) can be preferably used as the urethane polymers (A).

The urethane polymers (A) essentially have dispersibility or solubility in water, because an aqueous dispersion or aqueous solution of the urethane polymers (A) is prepared in Step (X). The urethane polymers (A) essentially have a group capable of exhibiting the dispersibility or solubility, and a hydrophilic group such as an anionic group, a cationic group, or a nonionic group is preferred as the group of this type. Accordingly, the urethane polymers (A) are preferably hydrolyzable silylated urethane polymers having at least one hydrophilic group per molecule (a hydrophilic group-containing hydrolyzable silylated urethane polymer).

An alkoxysilyl group is especially preferred as the hydrolyzable silyl group in the hydrolyzable silylated urethane polymers. Preferred examples of alkoxy groups in such alkoxysilyl groups are $C_{1-4}$ alkoxy groups (i.e., alkoxy groups having one to four carbon atoms) such as methoxy group, ethoxy group, propoxy group, isopropoxy group, butoxy group, isobutyloxy group, s-butyloxy group, and t-butyloxy group. More preferred alkoxy groups include methoxy group, ethoxy group, and propoxy group, of which methoxy group and ethoxy group are especially preferred. Naturally, the alkoxy groups can also be alkoxy groups having five or more carbon atoms.

Generally, one to three alkoxy groups are bound to one silicon atom, and preferably two or three alkoxy groups are bound to one silicon atom. Each of these alkoxy groups can be used alone or in combination. Specifically, a plurality of the same alkoxy group, or two or more different alkoxy groups can be bound to one silicon atom.

Consequently, alkoxysilylated urethane polymers can be used as the hydrolyzable silylated urethane polymers, of which an alkoxysilylated urethane polymer (A1) containing at least one hydrophilic group is preferred.

The alkoxysilylated urethane polymer (A1) containing at least one hydrophilic group is not specifically limited, as long as it is a urethane polymer having at least one hydrophilic group per molecule and containing at least one alkoxysilyl group per molecule. Among such urethane polymers, preferred is a urethane polymer containing at least one hydrophilic group and having at least one terminal alkoxysilyl group, corresponding to a hydrophilic group-containing urethane polymer, except with terminal isocyanate groups at least partially alkoxysilylated.

More specifically, the alkoxysilylated urethane polymer (A1) containing at least one hydrophilic group can be, for example, a urethane polymer containing at least one hydrophilic group and having at least one terminal alkoxysilyl group, as a reaction product among a compound (A1-a) containing plural isocyanate-reactive groups and having no hydrophilic group, a compound (A1-b) containing at least one hydrophilic group and plural isocyanate-reactive groups, a polyisocyanate compound (A1-c), and an alkoxysilane compound (A1-d) containing at least one isocyanate-reactive group.

Compounds (A1-a) Containing Plural Isocyanate-Reactive Groups and Having No Hydrophilic Group The compounds (A1-a) containing plural isocyanate-reactive groups and having no hydrophilic group (hereinafter also referred to as "isocyanate-reactive compounds (A1-a)") are not specifically limited, as long as they each have at least two isocyanate-reactive groups per molecule and has no hydrophilic group such as an anionic group, a cationic group, or a nonionic group in the molecule. The isocyanate-reactive groups are not specifically limited, as long as they are groups having reactivity with isocyanate group, and include hydroxyl group, primary amino groups (unsubstituted amino groups), secondary amino groups (mono-substituted amino groups), and mercapto group. The at least two isocyanate-reactive groups may comprise identical groups or two or more different groups. Hydroxyl group, primary amino groups, and secondary amino groups are preferred in the present invention, of which hydroxyl group is typically preferred. Accordingly, examples of the isocyanate-reactive compounds (A1-a) include hydrophilic group-free polyol compounds, hydrophilic group-free polyamine compounds, hydrophilic group-free polythiol compounds, of which hydrophilic group-free polyol compounds and hydrophilic group-free polyamine compounds are preferred, and hydrophilic group-free polyol compounds (compounds containing plural hydroxyl groups and having no hydrophilic group) are more preferred. Each of these isocyanate-reactive compounds (A1-a) can be used alone or in combination.

The hydrophilic group-free polyol compounds (A1-a) (hereinafter also referred to as "polyols (A1-a)") as the isocyanate-reactive compounds (A1-a) are not specifically limited, as long as they comprise no hydrophilic group (hydrophilic group such as an anionic group, a cationic group, or a nonionic group) in the molecule and comprise at least two hydroxyl groups per molecule. Examples of the polyols (A1-a) include polyhydric alcohols, polyether polyols, polyester polyols, polycarbonate polyols, polyolefin polyols, polyacrylic polyols, and caster oil.

Of the polyols (A1-a), the polyhydric alcohols include ethylene glycol, diethylene glycol, propylene glycol, dipropylene glycol, trimethylene glycol, 1,4-tetramethylenediol, 1,3-tetramethylenediol, 2-methyl-1,3-trimethylenediol, 1,5-pentamethylenediol, neopentyl glycol, 1,6-hexamethylenediol, 3-methyl-1,5-pentamethylenediol, 2,4-diethyl-1,5-pentamethylenediol, glycerol, trimethylolpropane, trimethylolethane, cyclohexanediols (e.g., 1,4-cyclohexanediol), bisphenols (e.g., bisphenol-A), and sugar alcohols (e.g., xylitol and sorbitol).

Examples of the polyether polyols include polyalkylene glycols such as polyethylene glycols, polypropylene glycols, and polytetramethylene glycols; and copolymers containing plural alkylene oxides as monomer components [(alkylene oxide-another alkylene oxide) copolymers], such as ethylene oxide-propylene oxide copolymers.

Examples of the polyester polyols include polycondensation products between a polyhydric alcohol and a polycarboxylic acid; ring-opened polymers of cyclic esters (lactones); and reaction products of three different components, i.e., a polyhydric alcohol, a polycarboxylic acid, and a cyclic ester. The polyhydric alcohol in the polycondensation products between a polyhydric alcohol and a polycarboxylic acid can be any of the above-exemplified polyhydric alcohols. Examples of the polycarboxylic acid include aliphatic dicarboxylic acids such as malonic acid, maleic acid, succinic acid, glutaric acid, adipic acid, suberic acid, azelaic acid, sebacic acid, and dodecanedioic acid; alicyclic dicarboxylic acids such as 1,4-cyclohexanedicarboxylic acid; and aromatic dicarboxylic acids such as terephthalic acid, isophthalic acid, orthophthalic acid, 2,6-naphthalenedicarboxylic acid, p-phenylenedicarboxylic acid, and trimellitic acid. The cyclic ester in the ring-opening polymers of a cyclic ester includes, for example, propiolactone, β-methyl-δ-valerolactone, and ε-caprolactone. The polyhydric alcohol, polycarboxylic acid, and cyclic ester in the reaction products of three components can be those as listed above.

The polycarbonate polyols include reaction products between polyhydric alcohols and phosgene; and ring-opened polymers of cyclic carbonic esters such as alkylene carbonates. Specifically, the polyhydric alcohols in the reaction products between polyhydric alcohols and phosgene can be the above-listed polyhydric alcohols. The alkylene carbonates in the ring-opened polymers of cyclic carbonic esters include ethylene carbonate, trimethylene carbonate, tetramethylene carbonate, and hexamethylene carbonate. The polycarbonate polyols can be any compounds that have a carbonate bond in the molecule and have a terminal hydroxyl group. They may have an ester bond in addition to a carbonate bond.

The polyolefin polyols are polyols comprising an olefin as the component (monomer component) of a skeleton or principal chain of polymers or copolymers and at least two hydroxyl groups per molecule. Preferably they have at least two hydroxyl groups in their terminals. The olefin can be an olefin having a terminal carbon-carbon double bond, such as an alpha-olefin including ethylene or propylene; an olefin having a carbon-carbon double bond in a moiety other than the terminals, such as isobutene; or a diene, such as butadiene or isoprene.

The polyacrylic polyols are polyols having a (meth)acrylate as the component (monomer component) of a skeleton or principal chain of polymers or copolymers and at least two hydroxyl groups per molecule. Preferred examples of the (meth)acrylate include (meth)acrylic acid alkyl esters including (meth)acrylic acid ($C_{1-20}$ alkyl) esters such as methyl (meth)acrylate, ethyl(meth)acrylate, propyl(meth)acrylate, butyl(meth)acrylate, hexyl(meth)acrylate, octyl(meth)acrylate, 2-ethylhexyl(meth)acrylate, decyl(meth)acrylate, dodecyl(meth)acrylate, and octadecyl(meth)acrylate.

Hydroxyl-containing α,β-unsaturated compounds can be used as copolymerization components (copolymerizable monomer components) for the olefins and (meth)acrylates in the polyolefin polyols and polyacrylic polyols so as to introduce hydroxyl group into the molecules. Examples of these α,β-unsaturated compounds are hydroxyalkyl(meth)acrylates such as 2-hydroxyethyl(meth)acrylate and 3-hydroxypropyl(meth)acrylate.

Preferred polyols (A1-a) are polyether polyols, polyester polyols, or polycarbonate polyols.

The hydrophilic group-free polyamine compounds and hydrophilic group-free polythiol compounds as the isocyanate-reactive compounds (A1-a) can be, for example, hydrophilic group-free polyamine compounds and hydrophilic group-free polythiol compounds corresponding to the above-exemplified hydrophilic group-free polyol compounds (A1-a).

For example, the hydrophilic group-free polyamine compounds as the isocyanate-reactive compounds (A1-a) include aliphatic polyamines, alicyclic polyamines, aromatic polyamines, and araliphatic polyamines. The hydrophilic group-free polyamine compounds can also be hydrophilic group-free polyamine derivatives, such as hydrazine and derivatives thereof.

Examples of the aliphatic polyamines are aliphatic diamines such as ethylenediamine, 1,3-trimethylenediamine, 1,4-tetramethylenediamine, 1,3-pentamethylenediamine, 1,5-pentamethylenediamine, 1,6-hexamethylenediamine, 1,2-propylenediamine, 1,2-butylenediamine, 2,3-butylenediamine, 1,3-butylenediamine, 2-methyl-1,5-pentamethylenediamine, 3-methyl-1,5-pentamethylenediamine, 2,4,4-trimethyl-1,6-hexamethylenediamine, and 2,2,4-trimethyl-1,6-hexamethylenediamine; as well as diethylenetriamine, triethylenetetramine, tetraethylenepentamine, and pentaethylenehexamine.

The alicyclic polyamines include, for example, alicyclic diamines such as 1,3-cyclopentanediamine, 1,4-cyclohexanediamine, 1,3-cyclohexanediamine, 1-amino-3-aminomethyl-3,5,5-trimethylcyclohexane, 1-amino-l-methyl-4-aminomethylcyclohexane, 1-amino-1-methyl-3-aminomethylcyclohexane, 4,4'-methylenebis(cyclohexylamine), 4,4'-methylenebis(3-methylcyclohexylamine), methyl-2,3-cyclohexanediamine, methyl-2,4-cyclohexanediamine, methyl-2,6-cyclohexanediamine, 1,3-bis(aminomethyl)cyclohexane, 1,4-bis(aminomethyl)cyclohexane, isophoronediamine, and norbornanediamine.

The aromatic polyamines include aromatic diamines such as m-phenylenediamine, p-phenylenediamine, 2,4-tolylenediamine, 2,6-tolylenediamine, naphthylene-1,4-diamine, naphthylene-1,5-diamine, 4,4'-diphenyldiamine, 4,4'-diphenylmethanediamine, 2,4'-diphenylmethanediamine, 4,4'-(diphenyl ether)diamine, 2-nitrodiphenyl-4,4'-diamine, 2,2'-diphenylpropane-4,4'-diamine, 3,3'-dimethyldiphenylmethane-4,4'-diamine, 4,4'-diphenylpropanediamine, and 3,3'-dimethoxydiphenyl-4,4'-diamine.

Examples of the araliphatic polyamines include araliphatic diamines such as 1,3-xylylenediamine, 1,4-xylylenediamine, α,α,α',α'-tetramethyl-1,3-xylylenediamine, α,α,α',α'-tetramethyl-1,4-xylylenediamine, ω,ω'-diamino-1,4-diethylbenzene, 1,3-bis(1-amino-1-methylethyl)benzene, 1,4-bis(1-amino-1-methylethyl)benzene, and 1,3-bis(α,α-dimethylaminomethyl)benzene.

The hydrazine and derivatives thereof as the hydrophilic group-free polyamine derivatives include, for example, hydrazine and dihydrazide compounds. The dihydrazide compounds include aliphatic dicarboxylic dihydrazides such as carbodihydrazide (carbohydrazide), oxalic dihydrazide, malonic dihydrazide, succinic dihydrazide, glutaric dihydrazide, and adipic dihydrazide; aromatic dicarboxylic dihydrazides such as isophthalic dihydrazide and terephthalic dihydrazide; and alicyclic dicarboxylic dihydrazides such as 1,4-cyclohexanedicarboxylic dihydrazide.

The molecular weights of the isocyanate-reactive compounds (A1-a) are not specifically limited, and the compounds can be any of low-molecular-weight compounds and high-molecular-weight compounds. When the isocyanate-reactive compounds (A1-a) are low-molecular-weight compounds such as low-molecular-weight hydrophilic group-free polyol compounds or low-molecular-weight hydrophilic group-free polyamine compounds, they can also be used as chain-extenders.

Compounds (A1-b) comprising a hydrophilic group and plural isocyanate-reactive groups The compounds (A1-b) comprising at least one hydrophilic group and plural isocyanate-reactive groups (hereinafter also referred to as "isocyanate-reactive compounds (A1-b)") are not specifically limited, as long as they comprise at least one hydrophilic group, such as an anionic group, a cationic group, and a nonionic group, per molecule and comprise at least two isocyanate-reactive groups per molecule. In the isocyanate-reactive compounds (A1-b), the hydrophilic groups include anionic groups, cationic groups and nonionic groups, of which anionic groups are preferred. Carboxyl group and sulfo group are preferred as the anionic groups, of which carboxyl group is optimum. Examples of the cationic groups include tertiary amino groups (di-substituted amino groups). Examples of the nonionic groups include groups each containing a polyoxyalkylene chain such as a polyoxyethylene chain, a polyoxypropylene chain, or an oxyethylene-oxypropylene copolymer chain.

In the isocyanate-reactive compounds (A1-b), the isocyanate-reactive groups are not specifically limited, as long as they are groups having reactivity with isocyanate group, and include, for example, hydroxyl group, primary amino groups, secondary amino groups, and mercapto group. Each of these isocyanate-reactive groups can be used alone or in combination. The isocyanate-reactive groups for use in the present invention are preferably hydroxyl group, primary amino groups, and secondary amino groups, of which hydroxyl group is typically preferred.

Consequently, the isocyanate-reactive compounds (A1-b) can be, for example, any of hydrophilic group-containing polyol compounds, hydrophilic group-containing polyamine compounds, and hydrophilic group-containing polythiol compounds, of which hydrophilic group-containing polyol compounds (compounds containing both a hydrophilic group and plural hydroxyl groups) are preferred. Each of these isocyanate-reactive compounds (A1-b) can be used alone or in combination.

As is described above, the isocyanate-reactive compounds (A1-b) are preferably anionic group-containing polyol compounds having an anionic group as the hydrophilic group, and hydroxyl groups as the isocyanate-reactive groups (compounds containing an anionic group and plural hydroxyl groups).

The anionic group-containing polyol compounds (A1-b) (hereinafter also referred to as "polyols (A1-b)") as the isocyanate-reactive compounds (A1-b) include carboxyl group-containing polyols corresponding to the polyols listed as the polyols (A1-a), except with carboxyl group being introduced. The polyols (A1-b) for use in the present invention are preferably low-molecular-weight polyols having an anionic group, of which typically preferred is a polyhydroxycarboxylic acid represented by following Formula (3):

$$(HO)_a L(COOH)_b \qquad (3)$$

wherein L represents a hydrocarbon moiety having one to twelve carbon atoms; "a" is an integer of 2 or more; and "b" is an integer of 1 or more.

The hydrocarbon moiety L in Formula (3) is preferably an aliphatic hydrocarbon moiety and can be any of straight-chain or branched chain moieties. The repetition numbers "a" and "b" can be the same as or different from each other. The two or more hydroxyl groups can be bound to the same carbon atom or bound to different carbon atoms. When "b" is 2 or more, the two or more carboxyl groups can be bound to the same carbon atom or bound to different carbon atoms.

Of such polyhydroxycarboxylic acids, dimethylolalkanoic acids are preferred, and 2,2-dimethylolalkanoic acids are more preferred. Examples of the dimethylolalkanoic acids are 2,2-dimethylolpropionic acid, 2,2-dimethylolbutanoic acid, 2,2-dimethylolpentanoic acid, 2,2-dimethylolhexanoic acid, 2,2-dimethylolheptanoic acid, 2,2-dimethyloloctanoic acid, 2,2-dimethylolnonanoic acid, and 2,2-dimethyloldecanoic acid.

The cationic group-containing polyol compounds (A1-b) as the isocyanate-reactive compounds (A1-b) include, for example, tertiary amino group-containing polyols corresponding to the polyols listed as the polyols (A1-a), except with tertiary amino group (di-substituted amino group) being introduced. The cationic group-containing polyol compounds (A1-b) are preferably low-molecular-weight polyols having a cationic group. Specific examples of the low-molecular-weight tertiary amino group-containing polyols include N-alkyldi(alcohol)amines (N-alkyldialkanolamines and N,N-dihydroxyalkyl-alkylamines) including N-alkyldiethanolamines such as N-methyldiethanolamine, N-ethyldiethanolamine, N-propyldiethanolamine, N-isopropyldiethanolamine, and N-butyldiethanolamine; N-alkyldipropanolamines such as N-methyldipropanolamine, N-ethyldipropanolamine, N-propyldipropanolamine, N-isopropyldipropanolamine, and N-butyldipropanolamine; and N-alkyldibutanolamines such as N-methyldibutanolamine, N-ethyldibutanolamine, N-propyldibutanolamine, N-isopropyldibutanolamine, and N-butyldibutanolamine. N-tri(alcohol)amines such as N-triethanolamine can also be used. The cationic group-containing polyol compounds (A1-b) can also be polymeric or high-molecular-weight tertiary amino group-containing polyols.

The nonionic group-containing polyol compounds (A1-b) as the isocyanate-reactive compounds (A1-b) include, for example, polyoxyalkylene chain-containing polyols corresponding to the polyols listed as the polyols (A1-a), except with nonionic hydrophilic group being introduced. Examples of the nonionic hydrophilic group include polyoxyalkylene chains such as polyoxyethylene chain, polyoxypropylene chain, and oxyethylene-oxypropylene copolymer chain.

Polyisocyanate Compounds (A1-c)

The polyisocyanate compounds (A1-c) (hereinafter also referred to as "polyisocyanates (A1-c)") are not specifically limited, as long as they are compounds having at least two isocyanate groups per molecule. The polyisocyanate (A1-c) include, for example, aliphatic polyisocyanates, alicyclic polyisocyanates, aromatic polyisocyanates, and araliphatic polyisocyanates. Each of these polyisocyanates (A1-c) can be used alone or in combination.

Examples of the aliphatic polyisocyanates are aliphatic diisocyanates such as 1,3-trimethylene diisocyanate, 1,4-tetramethylene diisocyanate, 1,3-pentamethylene diisocyanate, 1,5-pentamethylene diisocyanate, 1,6-hexamethylene diisocyanate, 1,2-propylene diisocyanate, 1,2-butylene diisocyanate, 2,3-butylene diisocyanate, 1,3-butylene diisocyanate, 2-methyl-1,5-pentamethylene diisocyanate, 3-methyl-1,5-pentamethylene diisocyanate, 2,4,4-trimethyl-1,6-hexamethylene diisocyanate, 2,2,4-trimethyl-1,6-hexamethylene diisocyanate, 2,6-diisocyanatemethyl caproate, and lysine diisocyanate.

Examples of the alicyclic polyisocyanates are alicyclic diisocyanates such as 1,3-cyclopentane diisocyanate, 1,4-cyclohexane diisocyanate, 1,3-cyclohexane diisocyanate, 3-isocyanatomethyl-3,5,5-trimethylcyclohexyl isocyanate, 4,4'-methylenebis(cyclohexyl isocyanate), methyl-2,4-cyclohexane diisocyanate, methyl-2,6-cyclohexane diisocyanate, 1,3-bis(isocyanatomethyl)cyclohexane, 1,4-bis(isocyanatomethyl)cyclohexane, isophorone diisocyanate, and norbornane diisocyanate.

The aromatic polyisocyanates include, for example, aromatic diisocyanates such as m-phenylene diisocyanate, p-phenylene diisocyanate, 2,4-tolylene diisocyanate, 2,6-tolylene diisocyanate, naphthylene-1,4-diisocyanate, naphthylene-1,5-diisocyanate, 4,4'-diphenyl diisocyanate, 4,4'-diphenylmethane diisocyanate, 2,4'-diphenylmethane diisocyanate, 4,4'-(diphenyl ether) diisocyanate, 2-nitrodiphenyl-4,4'-diisocyanate, 2,2'-diphenylpropane-4,4'-diisocyanate, 3,3'-dimethyldiphenylmethane-4,4'-diisocyanate, 4,4'-diphenylpropane diisocyanate, and 3,3'-dimethoxydiphenyl-4,4'-diisocyanate.

The araliphatic polyisocyanate include araliphatic diisocyanates such as 1,3-xylylene diisocyanate, 1,4-xylylene diisocyanate, ω,ω'-diisocyanato-1,4-diethylbenzene, 1,3-bis(1-isocyanato-1-methylethyl)benzene, 1,4-bis(1-isocyanato-1-methylethyl)benzene, and 1,3-bis(α,α-dimethylisocyanatomethyl)benzene.

Preferred examples of the polyisocyanates (A1-c) are 1,6-hexamethylene diisocyanate, 4,4'-methylenebis(cyclohexyl isocyanate), 1,3-bis(isocyanatomethyl)cyclohexane, 1,4-bis(isocyanatomethyl)cyclohexane, isophorone diisocyanate, 2,4-tolylene diisocyanate, 2,6-tolylene diisocyanate, 4,4'-diphenylmethane diisocyanate, 1,3-xylylene diisocyanate, 1,4-xylylene diisocyanate, norbornane diisocyanate, and 1,3-bis(α,α-dimethylisocyanatomethyl)benzene. Resins with less decoloration can be obtained by using an aliphatic polyisocyanate, an alicyclic polyisocyanate, and/or an araliphatic polyisocyanate as the polyisocyanate (A1-c).

The polyisocyanates (A1-c) for use in the present invention can also be dimers, trimers, reaction products, and polymers derived from the above-exemplified aliphatic polyisocyanates, alicyclic polyisocyanates, aromatic polyisocyanates, and araliphatic polyisocyanates. Examples thereof are dimers and trimers of diphenylmethane diisocyanate; reaction products between trimethylolpropane and tolylene diisocyanate; reaction products between trimethylolpropane and hexamethylene diisocyanate; poly(methylene)-poly(phenyl isocyanate)s; polyether polyisocyanates; and polyester polyisocyanates.

One or more diisothiocyanate compounds, such as phenyl diisothiocyanate, can also be used in combination with the polyisocyanates (A1-c) in the present invention.

Alkoxysilane compounds (A1-d) containing at least one isocyanate-reactive group The alkoxysilane compounds (A1-d) containing at least one isocyanate-reactive group (hereinafter also referred to as "isocyanate-reactive group-containing alkoxysilanes (A1-d)") are not specifically limited, as long as they are silane compounds having at least one isocyanate-reactive group per molecule and at least one alkoxy group per molecule. Each of these isocyanate-reactive group-containing alkoxysilanes (A1-d) can be used alone or in combination.

The isocyanate-reactive groups are not specifically limited, as long as they have reactivity with isocyanate group, and include primary amino groups (unsubstituted amino groups), secondary amino groups (mono-substituted amino groups), mercapto group, isocyanate group, and hydroxyl group, of which primary amino groups, secondary amino groups, and mercapto group are preferred. The isocyanate-reactive group-containing alkoxysilanes (A1-d) may each comprise isocyanate-reactive groups of the same type or of different types.

The isocyanate-reactive group-containing alkoxysilanes (A1-d) for use in the present invention are preferably primary or secondary amino group-containing alkoxysilane compounds (A1-d1) and mercapto group-containing alkoxysilane compounds (A1-d2).

The primary or secondary amino group-containing alkoxysilane compounds (A1-d1) (hereinafter also referred to as "amino group-containing alkoxysilanes (A1-d1)") are not specifically limited, as long as they are silane compounds having at least one primary or secondary amino group and at least one alkoxy group per molecule. Accordingly, the amino group-containing alkoxysilanes (A1-d1) may further comprise one or more tertiary amino groups (di-substituted amino group) as amino groups. The mercapto group-containing alkoxysilane compounds (A1-d2) (hereinafter also referred to as "mercapto group-containing alkoxysilanes (A1-d2)") are not specifically limited, as long as they are silane compounds having at least one mercapto group and at least one alkoxy group per molecule.

Preferred examples of the alkoxy groups in the isocyanate-reactive group-containing alkoxysilanes (A1-d) include $C_{1-4}$ alkoxy groups (alkoxy groups having one to four carbon atoms), such as methoxy group, ethoxy group, propoxy group, isopropoxy group, butoxy group, isobutyloxy group, s-butyloxy group, and t-butyloxy group. More preferred alkoxy groups are methoxy group, ethoxy group, and propoxy group, of which methoxy group and ethoxy group are typically preferred. The alkoxy groups can also be alkoxy groups having five or more carbon atoms.

Such alkoxy groups are generally bound to the silicon atom of the isocyanate-reactive group-containing alkoxysilanes (A1-d), and the number thereof is generally one to three, and preferably two or three. Each of these alkoxy groups can be used alone or in combination. Specifically, a plurality of the same alkoxy group or different alkoxy groups can be bound to the silicon atom of the isocyanate-reactive group-containing alkoxysilanes (A1-d).

Of amino groups as the isocyanate-reactive groups, secondary amino groups and tertiary amino groups may form secondary amino groups and tertiary amino groups by having one or more substituents. Examples of the substituents are hydrocarbons including aryl groups such as phenyl group, alkyl groups such as methyl group, ethyl group, propyl group, and butyl group, and cycloalkyl groups such as cyclohexyl group; and heterocyclic groups (heterocycle-containing groups) such as heterocyclic groups having an imide skeleton. The substituents such as hydrocarbon groups and heterocyclic groups may further have one or more substituents, such as hydrocarbon groups, alkoxy groups, aryloxy groups, cycloalkyloxy groups, alkoxycarbonyl groups, aryloxycarbonyl groups, cycloalkyloxycarbonyl groups, acyl groups, carboxyl group, cyano group, oxo group, amide bond-containing group, amino groups, heterocyclic groups, and groups containing groups comprising combinations of these groups.

The isocyanate-reactive groups, such as primary amino groups, secondary amino groups, and mercapto group, can be directly bound to the silicon atom but are preferably bound thereto through the intermediary of a bivalent group. The bivalent group can be any of bivalent organic groups. Examples of the bivalent organic groups are bivalent hydrocarbon groups comprising one or more hydrocarbon groups alone, such as alkylene groups, arylene groups, alkylene-arylene groups, and alkylene-arylene-alkylene groups; and bivalent groups comprising one or more hydrocarbon groups in combination with another group, such as alkylene-oxy-alkylene groups, alkylene-carbonyl-oxy-alkylene groups, alkylene-oxy-carbonyl-alkylene groups, alkylene-poly(oxyalkylene) groups, alkylene-imino groups, and alkylene-imino-alkylene groups. Examples of the other group are oxy group, carbonyl-oxy group, carbonyl group, imino group, and amide bond-containing groups. The bivalent organic groups are preferably bivalent organic groups, such as bivalent hydrocarbon groups, having about one to about twenty carbon atoms.

Accordingly, amino group-containing alkoxysilanes (A1-d1) as the isocyanate-reactive group-containing alkoxysilanes (A1-d) may comprise an amino group in the form of an aminoalkyl group. Examples of such aminoalkyl groups include amino-alkyl groups such as aminomethyl group, 1-aminoethyl group, 2-aminoethyl group, 1-aminopropyl group, 2-aminopropyl group, and 3-aminopropyl group, of which amino-($C_{1-3}$ alkyl) groups are preferred; corresponding secondary amino groups (amino-alkyl groups having one hydrocarbon group as a substituent); and corresponding tertiary amino groups (amino-alkyl groups having two hydrocarbon group as substituents). The substituents, such as hydrocarbon groups, substituted to the nitrogen atoms in the secondary amino groups and tertiary amino groups may further have an amino group. Namely, the secondary amino groups and the tertiary amino groups may be in the form of, for example, N-aminoalkyl-aminoalkyl groups and N-[N-(aminoalkyl)aminoalkyl]aminoalkyl groups. They may further comprise a secondary amino group in addition to a primary amino group. The number of the primary amino group and the secondary amino group is not specifically limited and is generally one or two.

More specifically, as the isocyanate-reactive group-containing alkoxysilanes (A1-d), the amino group-containing alkoxysilanes (A1-d1) are preferably amino group-containing alkoxysilane compounds represented by following Formula (4a) or (4b), and the mercapto group-containing alkoxysilanes (A1-d2) are preferably mercapto group-containing alkoxysilane compounds represented by following Formula (4c):

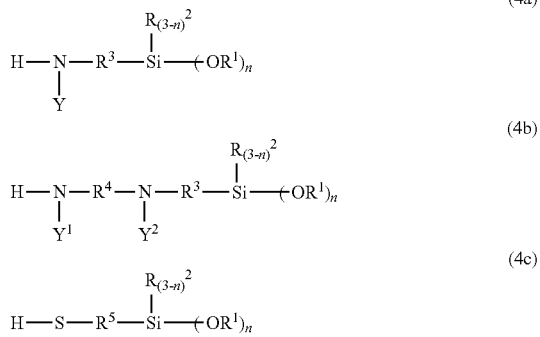

wherein $R^1$ and $R^2$ are the same as or different from each other and each represent a hydrogen atom or a hydrocarbon group; $R^3$ represents a bivalent organic group; $R^4$ represents a bivalent organic group; $R^5$ represents a bivalent organic group; Y represents a hydrogen atom or "an organic group which may have a $-Si(OR^{1a})_h(R^{2a})_{3-h}$ group, wherein $R^{1a}$ and $R^{2a}$ are the same as or different from each other and each represent a hydrogen atom or a hydrocarbon group; and "h" is an integer of 1 to 3"; $Y^1$ and $Y^2$ are the same as or different from each other and each represent a hydrogen atom or "an organic group which may have a $-Si(OR^{1b})_i(R^{2b})_{3-i}$ group, wherein $R^{1b}$ and $R^{2b}$ are the same as or different from each other and each represent a hydrogen atom or a hydrocarbon group; and "i" is an integer of 1 to 3"; and "n" represents an integer of 1 to 3.

In Formulae (4a), (4b), and (4c), $R^1$ and $R^2$ are each a hydrogen atom or a hydrocarbon group. $R^1$ and $R^2$ may be the same as or different from one another. The hydrocarbon groups as $R^1$ include, for example, aliphatic hydrocarbon groups, alicyclic hydrocarbon groups, aromatic hydrocarbon groups, (aromatic hydrocarbon)-(aliphatic hydrocarbon) groups, and (alicyclic hydrocarbon)-(aliphatic hydrocarbon) groups. Preferred examples of the aliphatic hydrocarbon groups as $R^1$ include alkyl groups having about one to about twenty carbon atoms ($C_{1-20}$ alkyl groups), such as methyl group, ethyl group, propyl group, isopropyl group, butyl group, isobutyl group, t-butyl group, s-butyl group, n-pentyl group, hexyl group, heptyl group, octyl group, 2-ethylhexyl group, nonyl group, decyl group, undecyl group, dodecyl group, tridecyl group, tetradecyl group, pentadecyl group, hexadecyl group, heptadecyl group, and octadecyl group. The alicyclic hydrocarbon groups as $R^1$ include, for example, cycloalkyl groups having about five to about ten carbon atoms constituting the ring, such as cyclohexyl group; and groups having a polycyclic hydrocarbon ring including a bridged ring such as a hydrocarbon ring in norbornane. The aromatic hydrocarbon groups as $R^1$ include, for example, aryl groups such as phenyl group and naphthyl group. The aromatic rings in the aromatic hydrocarbon groups can be benzene ring and fused carbon rings including fused carbon rings each comprising two to ten 4- to 7-membered carbon rings being fused, such as naphthalene ring. Examples of the (aromatic hydrocarbon)-(aliphatic hydrocarbon) groups include aralkyl groups including phenyl-($C_{1-6}$ alkyl) groups, such as benzyl group, phenethyl group, and phenylpropyl group. Examples of the (alicyclic hydrocarbon)-(aliphatic hydrocarbon) groups include cycloalkyl-($C_{1-6}$ alkyl) groups such as cyclohexyl-methyl group and cyclohexyl-ethyl group. The substituent $R^1$ is preferably a hydrogen atom or an alkyl group having one to six carbon atoms.

The hydrocarbon group as $R^2$ can be as with the hydrocarbon groups as $R^1$, such as aliphatic hydrocarbon groups, alicyclic hydrocarbon groups, aromatic hydrocarbon groups, (aromatic hydrocarbon)-(aliphatic hydrocarbon) groups, and (alicyclic hydrocarbon)-(aliphatic hydrocarbon) groups. $R^2$ is preferably a hydrogen atom, an aliphatic hydrocarbon group, such as an alkyl group having one to ten carbon atoms, an aryl group, or an aralkyl group.

The bivalent organic group as $R^3$ is preferably a bivalent hydrocarbon group. Examples of the bivalent hydrocarbon group include bivalent aliphatic hydrocarbon groups, bivalent alicyclic hydrocarbon groups, bivalent aromatic hydrocarbon groups, and groups comprising these bivalent hydrocarbon groups in combination, such as (bivalent aliphatic hydrocarbon)-(bivalent aromatic hydrocarbon) groups, and (bivalent aliphatic hydrocarbon)-(bivalent aromatic hydrocarbon)-(bivalent aliphatic hydrocarbon) groups. The bivalent aliphatic hydrocarbon groups include, for example, alkylene groups such as methylene group, ethylene group, trimethylene group, propylene group, tetramethylene group, pentamethylene group, hexamethylene group, heptamethylene group, and octamethylene group. The bivalent alicyclic hydrocarbon groups include, for example, cycloalkylene groups such as cyclohexylene group. Examples of the bivalent aromatic hydrocarbon groups are arylene groups such as phenylene group and naphthylene group. The bivalent hydrocarbon group as $R^3$ is preferably an alkylene group such as an alkylene group having one to ten carbon atoms, or an arylene group. The bivalent hydrocarbon group as $R^3$, such as an alkylene group or an arylene group, may have a side chain.

The group $R^4$ is a bivalent organic group. The bivalent organic group as $R^4$ is preferably a bivalent hydrocarbon group as in the bivalent organic group as $R^3$. The bivalent hydrocarbon group relating to $R^4$ can be as with the bivalent hydrocarbon groups as in the bivalent hydrocarbon groups relating to $R^3$, and examples thereof are bivalent aliphatic hydrocarbon groups, bivalent alicyclic hydrocarbon groups, bivalent aromatic hydrocarbon groups, and groups comprising these bivalent hydrocarbon groups in combination. The bivalent hydrocarbon group as $R^4$, such as an alkylene group or an arylene group, may have a side chain. The bivalent hydrocarbon group as $R^4$ is preferably an alkylene group such as an alkylene group having one to ten carbon atoms, or an arylene group.

The group $R^5$ is a bivalent organic group. The bivalent organic group as $R^5$ is preferably a bivalent hydrocarbon group as with the bivalent organic groups as $R^3$ and $R^4$. The bivalent hydrocarbon group relating to $R^5$ can be as with the bivalent hydrocarbon groups as in the bivalent hydrocarbon groups relating to $R^3$ and $R^4$, and examples thereof are bivalent aliphatic hydrocarbon groups, bivalent alicyclic hydrocarbon groups, bivalent aromatic hydrocarbon groups, and groups comprising these bivalent hydrocarbon groups in combination. The bivalent hydrocarbon group as $R^5$, such as an alkylene group or an arylene group, may have a side chain. The bivalent hydrocarbon group as $R^5$ is preferably an alkylene group such as an alkylene group having one to ten carbon atoms, or an arylene group.

Y is a hydrogen atom or an "organic group which may have a $-Si(OR^{1a})_h(R^{2a})_{3-h}$ group, wherein $R^{1a}$ and $R^{2a}$ are the same as or different from each other and each represent a hydrogen atom or a hydrocarbon group; and "h" is an integer of 1 to 3". The hydrocarbon group as $R^{1a}$ can be as with the hydrocarbon group as $R^1$. The hydrocarbon group as $R^{2a}$ can be as with the hydrocarbon group as $R^2$.

$Y^1$ and $Y^2$ are each a hydrogen atom or an "organic group which may have a —$Si(OR^{1b})_i(R^{2b})_{3-i}$ group, wherein $R^{1b}$ and $R^{2b}$ are the same as or different from each other and each represent a hydrogen atom or a hydrocarbon group; and "i" is an integer of 1 to 3". $Y^1$ and $Y^2$ may be the same as or different from each other. The hydrocarbon group as $R^{1b}$ can be as with the hydrocarbon group as $R^{1a}$. The hydrocarbon group as $R^{2b}$ can be as with the hydrocarbon group as $R^{2a}$. $Y^1$ and $Y^2$ can be as with the groups as Y.

The repetition number "n" is not specifically limited, as long as it is an integer of 1 to 3, but is preferably 2 or 3. The repetition numbers "h" and "i" are not specifically limited, as long as they are each an integer of 1 to 3, but are preferably 2 or 3, as in "n".

The group Y in Formula (4a) is a hydrogen atom or a group represented by any one of following Formulae (5a) to (5e):

(5a)

(5b)

(5c)

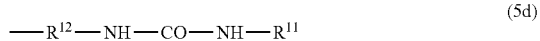
(5d)

(5e)

wherein $R^6$, $R^7$, $R^8$ and $R^9$ are the same as or different from each other and each represent a hydrogen atom, a hydrocarbon group, a carboxy-hydrocarbon group, or a substituted oxycarbonyl group; Z represents a hydrogen atom or an "organic group which may have a —$Si(OR^{1c})_j(R^{2c})_{3-j}$ group, wherein $R^{1c}$ and $R^{2c}$ are the same as or different from each other and each represent a hydrogen atom or a hydrocarbon group; and "j" is an integer of 1 to 3"; $R^{10}$ is a hydrogen atom or an organic group; $R^{11}$ is an organic group; $R^{12}$ represents a bivalent organic group; $R^{13}$ represents a bivalent organic group; $Y^3$ and $Y^4$ are the same as or different from each other and each represent a hydrogen atom or an "organic group which may have a —$Si(OR^{1d})_k(R^{2d})_{3-k}$ group, wherein $R^{1d}$ and $R^{2d}$ are the same as or different from each other and each represent a hydrogen atom or a hydrocarbon group; and "k" is an integer of 1 to 3", wherein at least one of $Y^3$ and $Y^4$ is not a hydrogen atom.

In Formula (5a), $R^6$, $R^7$, $R^8$ and $R^9$ may be the same as or different from one another and are each a hydrogen atom, a hydrocarbon group, a carboxy-hydrocarbon group, or a substituted oxycarbonyl group. The hydrocarbon group includes the above-exemplified aliphatic hydrocarbon groups, alicyclic hydrocarbon groups and aromatic hydrocarbon groups, as well as aralkyl groups. The carboxy-hydrocarbon groups are preferably carboxy-alkyl groups such as carboxymethyl group, carboxyethyl group, carboxypropyl group, carboxyisopropyl group, carboxybutyl group, carboxyisobutyl group, carboxypentyl group, carboxyhexyl group, carboxyheptyl group, and carboxyoctyl group. Examples of the substituted oxycarbonyl groups include alkoxycarbonyl groups such as methoxycarbonyl group, ethoxycarbonyl group, propoxycarbonyl group, isopropoxycarbonyl group, butoxycarbonyl group, pentyloxycarbonyl group, hexyloxycarbonyl group, heptyloxycarbonyl group, octyloxycarbonyl group, nonyloxycarbonyl group, and decyloxycarbonyl group. The alkoxy moieties in the alkoxycarbonyl groups are preferably alkoxy groups having one to twenty carbon atoms. The groups $R^6$, $R^7$, $R^8$, and $R^9$ can each be selected as appropriate according to the type of Z.

The group Z is a hydrogen atom or an "organic group which may have a —$Si(OR^{1c})_j(R^{2c})_{3-j}$ group, wherein $R^{1c}$ and $R^{2c}$ are the same as or different from each other and each represent a hydrogen atom or a hydrocarbon group; and "j" is an integer of 1 to 3". The organic group as Z is not specifically limited and includes, for example, acyl groups, carboxyl group, substituted oxycarbonyl groups, carbamoyl groups such as N-substituted carbamoyl groups and unsubstituted carbamoyl group, cyano group, as well as hydrocarbon groups such as alkyl groups, cycloalkyl groups, and aryl groups, acyloxy groups, and heterocyclic groups. These organic groups may each have one or more substituents. Examples of the substituents are amino groups such as substituted amino groups and unsubstituted amino group, hydroxyl group, and nitro group. Examples of the acyl groups as the organic group as Z include aliphatic acyl groups such as formyl group, acetyl group, propionyl group, butyryl group, isobutyryl group, valeryl group, pivaloyl group, hexanoyl group, octanoyl group, decanoyl group, lauroyl group, myristoyl group, palmitoyl group, and stearoyl group; acetoacetyl group; alicyclic acyl groups including cycloalkanecarbonyl groups such as cyclopentanecarbonyl group and cyclohexanecarbonyl group; and aromatic acyl groups such as benzoyl group and naphthoyl group. The substituted oxycarbonyl groups include substituted oxycarbonyl groups each having a hydrogen atom in a carboxyl group being substituted with an organic group having a molecular weight of 500 or less, such as alkoxycarbonyl groups, cycloalkyloxycarbonyl groups, aryloxycarbonyl groups, and aralkyloxycarbonyl groups. The alkoxycarbonyl groups include, for example, methoxycarbonyl, ethoxycarbonyl, isopropoxycarbonyl, butoxycarbonyl, t-butoxycarbonyl, hexyloxycarbonyl, decyloxycarbonyl, and hexadecyloxycarbonyl groups. The aryloxycarbonyl groups include, for example, phenyloxycarbonyl group and naphthyloxycarbonyl group. The cycloalkyloxycarbonyl groups include, for example, cyclohexyloxycarbonyl group. The aralkyloxycarbonyl groups include, for example, benzyloxycarbonyl group.

The hydrocarbon group as $R^{1c}$ in Z can be as with the hydrocarbon groups as $R^{1a}$ and $R^{1b}$. The hydrocarbon group as $R^{2c}$ can be as with the hydrocarbon groups as $R^{2a}$ and $R^{2b}$. The organic group which may have a "—$Si(OR^{1c})_j(R^{2c})_{3-j}$" group includes groups corresponding to organic groups as exemplified above, except with a "—$Si(OR^{1c})_j(R^{2c})_{3-j}$" group bound thereto. Examples of such groups are "-carbonyl-(bivalent hydrocarbon)-$Si(OR^{1c})_j(R^{2c})_{3-j}$" groups and "-carbonyl-oxy-(bivalent hydrocarbon)-$Si(OR^{1c})_j(R^{2c})_{3-j}$" groups. The bivalent hydrocarbon groups in these groups can be as with the bivalent hydrocarbon groups as $R^3$, $R^4$, and $R^5$, such as bivalent aliphatic hydrocarbon groups, bivalent alicyclic hydrocarbon groups, bivalent aromatic hydrocarbon groups, and groups comprising these bivalent hydrocarbon groups in combination. The bivalent hydrocarbon groups are preferably alkylene groups, such as alkylene groups having one to ten carbon atoms, or arylene groups. The bivalent hydrocarbon groups such as alkylene groups and arylene groups, may have a side chain.

When Z is an acyl group, a carboxyl group, a substituted oxycarbonyl group, a carbamoyl group, or an organic group having a "—$Si(OR^{1c})_j(R^{2c})_{3-j}$" group, it is acceptable that one of $R^6$ and $R^7$ is a hydrogen atom and the other is a substituted oxycarbonyl group; and one of $R^8$ and $R^9$ is a hydrogen atom and the other is a carboxymethyl group or methyl group. When Z is a cyano group, all the groups $R^6$, $R^7$, $R^8$, and $R^9$ may be hydrogen atoms.

In Formula (5b), $R^{10}$ is a hydrogen atom or an organic group. The organic group as $R^{10}$ is preferably an organic group having a molecular weight of 500 or less.

$R^{11}$s in Formulae (5c) and (5d) are each an organic group. The organic groups as $R^{11}$s are preferably organic groups having a molecular weight of 3,000 or less.

The organic group as $R^{10}$ in Formula (5b) and the organic groups as $R^{11}$s in Formulae (5c) and (5d) are preferably one having a molecular eight of 500 or less, and those having a molecular weight of 3,000 or less, respectively, selected from among, for example, hydrocarbon groups including aliphatic hydrocarbon groups, alicyclic hydrocarbon groups, aromatic hydrocarbon groups, (aromatic hydrocarbon)-(aliphatic hydrocarbon) groups, and (alicyclic hydrocarbon)-(aliphatic hydrocarbon) groups; and organic groups comprising these hydrocarbon groups bound to each other through the intermediary of oxygen atom, sulfur atom, or nitrogen atom (in the form of, for example, —O—, —S—, or —NH—). These organic groups may each have one or more substituents such as oxo group, hydroxyl group, amino group, and carboxyl group.

In Formula (5d), $R^{12}$ is a bivalent organic group. In Formula (5e), $R^{13}$ is a bivalent organic group. The bivalent organic groups as $R^{12}$ and $R^{13}$ can be, for example, bivalent organic groups having a molecular weight of 500 or less. The bivalent organic groups having a molecular weight of 500 or less may each be substituted or unsubstituted. Preferred examples of $R^{12}$ and $R^{13}$ are bivalent hydrocarbon groups. The bivalent hydrocarbon groups as $R^{12}$ and $R^{13}$ can be as with the bivalent hydrocarbon groups as $R^3$, $R^4$, and $R^5$, such as bivalent aliphatic hydrocarbon groups, bivalent alicyclic hydrocarbon groups, bivalent aromatic hydrocarbon groups, and groups comprising these bivalent hydrocarbon groups in combination. The bivalent hydrocarbon groups as $R^{12}$ and $R^{13}$, such as alkylene groups and arylene groups, may each have a side chain. The bivalent hydrocarbon groups as $R^{12}$ and $R^{13}$ are each preferably an alkylene group, such as an alkylene group having one to ten carbon atoms, or an arylene group.

The groups $Y^3$ and $Y^4$ are each a hydrogen atom or an "organic group which may have a —Si$(OR^{1d})_k(R^{2d})_{3-k}$ group, wherein $R^{1d}$ and $R^{2d}$ are the same as or different from each other and each represent a hydrogen atom or a hydrocarbon group; and "k" is an integer of 1 to 3", wherein at least one of $Y^3$ and $Y^4$ is not a hydrogen atom. The groups $Y^3$ and $Y^4$ may be the same as or different from each other. The hydrocarbon groups as $R^{1d}$ can be as with the hydrocarbon groups as $R^{1a}$, $R^{1b}$, and $R^{1c}$. The hydrocarbon groups as $R^{2d}$ can be as with the hydrocarbon groups as $R^{2a}$, $R^{2b}$, and $R^{2c}$.

The "organic groups which may have a —Si$(OR^{1d})_k(R^{2d})_{3-k}$ group" as $Y^3$ and $Y^4$ include groups represented by Formulae (5a), (5b), (5c), and (5d). When one of $Y^3$ and $Y^4$ is a group represented by Formula (5a), the other is preferably a group represented by Formula (5a), (5b), (5c), or (5d). When one of $Y^3$ and $Y^4$ is a group represented by Formula (5b), the other is preferably a group represented by Formula (5a), (5c), or (5d). When one of $Y^3$ and $Y^4$ is a group represented by Formula (5c), the other is preferably a hydrogen atom.

The groups $Y^1$ and $Y^2$ in Formula (4b) are preferably groups represented by Formulae (5a), (5b), (5c), and (5d).

As the isocyanate-reactive group-containing alkoxysilanes (A1-d) for use in the present invention, the amino group-containing alkoxysilane (A1-d1) is preferably an amino group-containing alkoxysilane compound represented by following Formula (6a) having a primary amino group alone as an isocyanate-reactive group; an amino group-containing alkoxysilane compound represented by following Formula (6b) having a primary amino group and a secondary amino group as isocyanate-reactive groups; or an amino group-containing alkoxysilane compound represented by following Formula (6c) having a secondary amino group alone as an isocyanate-reactive group. The mercapto group-containing alkoxysilane (A1-d2) is preferably a mercapto group-containing alkoxysilane compound represented by following Formula (6d) having a mercapto group alone as an isocyanate-reactive group.

The amino group-containing alkoxysilane compounds represented by Formula (6a) correspond to the amino group-containing alkoxysilane compounds represented by Formula (4a) wherein Y is a hydrogen atom; $R^1$ and $R^2$ are the same as or different from each other and each represent an alkyl group; and $R^3$ is an alkylene group. The amino group-containing alkoxysilane compounds represented by Formula (6b) correspond to the amino group-containing alkoxysilane compounds represented by Formula (4b), wherein $Y^1$ and $Y^2$ are hydrogen atoms; $R^1$ and $R^2$ are the same as or different from each other and each represent an alkyl group; and $R^3$ and $R^4$ are the same as or different from each other and each represent an alkylene group. The amino group-containing alkoxysilane compounds represented by Formula (6c) correspond to the amino group-containing alkoxysilane compounds represented by Formula (4a), wherein Y is an aryl group, an alkyl group, or a cycloalkyl group; $R^1$ and $R^2$ are the same as or different from each other and each represent an alkyl group; and $R^3$ is an alkylene group. The mercapto group-containing alkoxysilane compounds represented by Formula (6d) correspond to the mercapto group-containing alkoxysilane compounds represented by Formula (4c), wherein $R^1$ and $R^2$ are the same as or different from each other and each represent an alkyl group; and $R^5$ is an alkylene group.

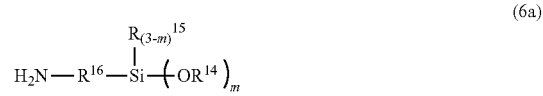

(6a)

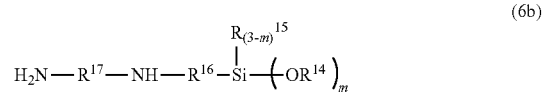

(6b)

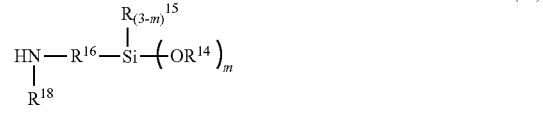

(6c)

(6d)

In Formulae (6a), (6b), (6c), and (6d), $R^{14}$ and $R^{15}$ are the same as or different from each other and each represent an alkyl group; $R^{16}$ and $R^{17}$ each represent an alkylene group; $R^{18}$ represents an aryl group, an alkyl group, or a cycloalkyl group; and "m" is an integer of 1 to 3. The alkylene groups as $R^{16}$ and $R^{17}$ in Formula (6b) may be the same as or different from each other.

The alkyl groups as $R^{14}$s in Formulae (6a) to (6d) are preferably, for example, alkyl groups having about one to about four carbon atoms ($C_{1-4}$ alkyl groups) such as methyl group, ethyl group, propyl group, isopropyl group, butyl group, isobutyl group, and t-butyl group. The alkyl groups as $R^{15}$s can be as with the alkyl groups as $R^{14}$s, of which methyl group and ethyl group are preferred. The alkylene groups as $R^{16}$s are preferably alkylene groups having about one to about three carbon atoms, such as methylene group, ethylene group, and trimethylene group. The alkylene group as $R^{17}$ is preferably an alkylene group having about one to about three carbon atoms, as in the alkylene groups as $R^{16}$s. As $R^{18}$, the aryl group is preferably a phenyl group; the alkyl group is preferably an alkyl group having about one to about four carbon atoms, such as methyl group, ethyl group, propyl group, isopropyl group, butyl group, isobutyl group, or t-butyl group; and the cycloalkyl group is preferably cyclohexyl group. The repetition number "m" is an integer of 1 to 3.

More specifically, examples of the amino group-containing alkoxysilane represented by Formula (6a) having a primary amino group alone as an isocyanate-reactive group include aminoalkyltrialkoxysilanes such as aminomethyltrimethoxysilane, aminomethyltriethoxysilane, β-aminoethyltrimethoxysilane, β-aminoethyltriethoxysilane, γ-aminopropyltrimethoxysilane, γ-aminopropyltriethoxysilane, γ-aminopropyltripropoxysilane, γ-aminopropyltriisopropoxysilane, and γ-aminopropyltributoxysilane; (aminoalkyl) alkyldialkoxysilanes such as β-aminoethylmethyldimethoxysilane, β-aminoethylmethyldiethoxysilane, γ-aminopropylmethyldimethoxysilane, γ-aminopropylmethyldiethoxysilane, and γ-aminopropylmethyldipropoxysilane; and corresponding aminoalkyldialkyl(mono)alkoxysilanes.

Examples of the amino group-containing alkoxysilane represented by Formula (6b) having a primary amino group and a secondary amino group as isocyanate-reactive groups include N-(aminoalkyl)aminoalkyltrialkoxysilanes such as N-β-(aminoethyl)-γ-aminopropyltrimethoxysilane and N-β-(aminoethyl)-γ-aminopropyltriethoxysilane; and N-(aminoalkyl)aminoalkylalkyldialkoxysilanes such as N-β-(aminoethyl)-γ-aminopropylmethyldimethoxysilane and N-β-(aminoethyl)-γ-aminopropylmethyldiethoxysilan.

Examples of the amino group-containing alkoxysilane represented by Formula (6c) having a secondary amino group alone as an isocyanate-reactive group include N-phenyl-β-aminoethyltrialkoxysilanes such as N-phenyl-β-aminoethyltrimethoxysilane and N-phenyl-β-aminoethyltriethoxysilane; N-phenyl-γ-aminopropyltrialkoxysilanes such as N-phenyl-γ-aminopropyltrimethoxysilane, N-phenyl-γ-aminopropyltriethoxysilane, N-phenyl-γ-aminopropyltripropoxysilane, and N-phenyl-γ-aminopropyltributoxysilane; corresponding N-phenylaminoalkyl(mono- or di-)alkyl(di- or mono-)alkoxysilanes; as well as N-alkylaminoalkyltrialkoxysilanes corresponding to the above-listed amino group-containing alkoxysilanes having a secondary amino group substituted with phenyl group, such as N-methyl-3-aminopropyltrimethoxysilane, N-ethyl-3-aminopropyltrimethoxysilane, N-n-propyl-3-aminopropyltrimethoxysilane, N-n-butyl-aminomethyltrimethoxysilane, N-n-butyl-2-aminoethyltrimethoxysilane, N-n-butyl-3-aminopropyltrimethoxysilane, N-n-butyl-3-aminopropyltriethoxysilane, and N-n-butyl-3-aminopropyltripropoxysilane, and corresponding N-alkylaminoalkyl(mono- or di-)alkyl(di- or mono)alkoxysilanes.

The amino group-containing alkoxysilanes (A1-d1) for use in the present invention can also be products under the trade names of "KBM 6063", "X-12-896", "KBM 576", "X-12-565", "X-12-580", "X-12-5263", "X-12-666", "KBM 6123", "X-12-575", "X-12-577", "X-12-563B", "X-12-730", "X-12-562", "X-12-5202", "X-12-5204", and "KBE 9703" (each available from Shin-Etsu Chemical Co., Ltd.). Consequently, the amino group-containing alkoxysilanes (A1-d1) can also be N-(5-aminopentyl)-γ-aminopropyltrimethoxysilane, N-β-[N-β-(aminoethyl)aminoethyl]-γ-aminopropyltrimethoxysilane, 1,2-bis (γ-trimethoxysilyl-propylamino) ethane, bis (γ-trimethoxysilyl-propyl)amine, N-β-(aminoethyl)-β-(4-aminomethylphenyl)ethyltrimethoxysilane, and corresponding alkoxysilane compounds having hydrocarbon groups (e.g., alkyl groups and alkylene groups) different in carbon number; alkoxysilane compounds further having, in addition to primary or secondary amino group, another group such as a styrenically unsaturated group, an olefinically unsaturated group, or a carboxyl group; alkoxysilane compounds having a primary or secondary amino group and further having the form of a salt such as a hydrochloride; and alkoxysilane compounds having a primary or secondary amino group and plural alkoxysilyl groups.

Examples of the alkoxysilane represented by Formula (6d) having a mercapto group as an isocyanate-reactive group include mercaptoalkyltrialkoxysilanes such as mercaptomethyltrimethoxysilane, mercaptomethyltriethoxysilane, β-mercaptoethyltrimethoxysilane, β-mercaptoethyltriethoxysilane, γ-mercaptopropyltrimethoxysilane, γ-mercaptopropyltriethoxysilane, γ-mercaptopropyltripropoxysilane, γ-mercaptopropyltriisopropoxysilane, and γ-mercaptopropyltributoxysilane; (mercaptoalkyl)alkyldialkoxysilanes such as β-mercaptoethylmethyldimethoxysilane, β-mercaptoethylmethyldiethoxysilane, γ-mercaptopropylmethyldimethoxysilane, γ-mercaptopropylmethyldiethoxysilane, and γ-mercaptopropylmethyldipropoxysilane; and corresponding mercaptoalkyldialkyl(mono)alkoxysilanes.

The isocyanate-reactive group-containing alkoxysilanes (A1-d) for use in the present invention are preferably amino group-containing alkoxysilanes (A1-d1) for easy reaction and high availability due to their wide distribution in the market. Of the amino group-containing alkoxysilanes (A1-d1), preferred examples of amino group-containing alkoxysilanes having at least a primary amino group as an isocyanate-reactive group are N-β-(aminoethyl)-γ-aminopropyltrimethoxysilane, N-β-(aminoethyl)-γ-aminopropyltriethoxysilane, N-β-(aminoethyl)-γ-aminopropylmethyldimethoxysilane, and γ-aminopropyltrimethoxysilane. Preferred examples of amino group-containing alkoxysilanes having a secondary amino group alone as an isocyanate-reactive group include N-phenyl-γ-aminopropyltrimethoxysilane and N-n-butyl-3-aminopropyltrimethoxysilane.

The amino group-containing alkoxysilanes (A1-d1) can also be alkoxysilane compounds having at least a secondary amino group as an isocyanate-reactive group (hereinafter also referred to as "ester-modified amino group-containing alkoxysilanes (A1-d4)"), as reaction products between an alkoxysilane compound having at least a primary amino group as an isocyanate-reactive group (hereinafter also referred to as "primary amino group-containing alkoxysilane") as exemplified above, and an unsaturated carboxylic ester (A1-d3). The primary amino group-containing alkoxysilane preferably has a primary amino group and a secondary amino group as isocyanate-reactive groups. Preferred examples of such ester-modified amino group-containing alkoxysilanes (A1-d4) are secondary amino group-containing alkoxysilane compounds as reaction products between an alkoxysilane compound having at least a primary amino group and an unsaturated carboxylic ester (A1-d3), of which secondary amino group-containing alkoxysilane compounds as reaction products between an alkoxysilane compound comprising a primary amino group and a secondary amino group, and an unsaturated carboxylic ester (A1-d3) are more preferred.

Examples of the ester-modified amino group-containing alkoxysilanes (A1-d4) include the amino group-containing alkoxysilane compounds represented by Formula (4a) wherein Y is represented by Formula (5a), wherein $R^6$ and $R^8$ are the same as or different from each other and each represent a hydrogen atom or alkyl group; $R^7$ is a hydrogen atom, an alkyl group, an aryl group, an alkoxycarbonyl group, an aryloxycarbonyl group, or a cycloalkyloxycarbonyl group; $R^9$ is a hydrogen atom; and Z is an alkoxycarbonyl group, an aryloxycarbonyl group, or a cycloalkyloxycarbonyl group.

The unsaturated carboxylic esters (A1-d3) for use in the ester-modified amino group-containing alkoxysilanes (A1-d4) are not specifically limited, as long as they are compounds corresponding to unsaturated carboxylic acids, except with at least one of, preferably all of, carboxyl groups in an unsaturated carboxylic acid being in the form of an ester. The unsaturated carboxylic esters (A1-d3) can be any of unsaturated monocarboxylic esters and unsaturated polycarboxylic esters such as unsaturated dicarboxylic esters. Each of these unsaturated carboxylic esters (A1-d3) can be used alone or in combination.

The unsaturated carboxylic esters (A1-d3) are preferably compounds in which a carboxyl group or a corresponding ester bond-containing group is directly bound to a carbon atom constituting a carbon-carbon double bond. Examples of the corresponding ester bond-containing group are alkoxycarbonyl groups, cycloalkyloxycarbonyl groups, and aryloxycarbonyl groups. These compounds include, for example, unsaturated monocarboxylic esters such as acrylic esters, methacrylic esters, crotonic esters, isocrotonic esters, 2-butenoic esters, 3-methyl-2-butenoic esters, 2-pentenoic esters, 2-octenoic esters, and cinnamic esters; and esters of unsaturated dicarboxylic acids, such as maleic esters (mono- or di-esters), fumaric esters (mono- or di-esters), and itaconic esters (mono- or di-esters).

The ester moieties in the unsaturated carboxylic esters (A1-d3) include esters of aliphatic hydrocarbons including alkyl esters, such as methyl ester, ethyl ester, propyl ester, isopropyl ester, butyl ester, isobutyl ester, s-butyl ester, t-butyl ester, pentyl ester, isopentyl ester, hexyl ester, heptyl ester, octyl ester, 2-ethylhexyl ester, nonyl ester, decyl ester, isodecyl ester, undecyl ester, dodecyl ester, tridecyl ester, tetradecyl ester, hexadecyl ester, and octadecyl ester; esters of alicyclic hydrocarbons including cycloalkyl esters, such as cyclohexyl ester, isobornyl ester, bornyl ester, dicyclopentadienyl ester, dicyclopentyl ester, dicyclopentenyl ester, and tricyclodecanyl ester; and esters of aromatic hydrocarbons including aromatic esters, such as phenyl ester and benzyl ester. Plural ester moieties, if present, may be the same as or different from each other.

Of the above-exemplified unsaturated carboxylic esters, acrylic esters, methacrylic esters (these are also synthetically referred to as "(meth)acrylic esters"), and maleic acid diesters are preferred as the unsaturated carboxylic esters (A1-d3). More specific examples of the (meth)acrylic esters include (meth)acrylic acid alkyl esters such as methyl(meth)acrylate, ethyl(meth)acrylate, butyl(meth)acrylate, hexyl(meth)acrylate, octyl(meth)acrylate, 2-ethylhexyl(meth)acrylate, dodecyl(meth)acrylate, and octadecyl(meth)acrylate. Examples of the maleic acid diesters include maleic acid dialkyl esters such as dimethyl maleate, diethyl maleate, dibutyl maleate, dihexyl maleate, dioctyl maleate, di(2-ethylhexyl)maleate, didodecyl maleate, and dioctadecyl maleate.

More specifically, the alkoxysilane compounds [ester-modified amino group-containing alkoxysilanes (A1-d4)] having at least a secondary amino group as an isocyanate-reactive group, as reaction products between a primary amino group-containing alkoxysilane and an unsaturated carboxylic ester (A1-d3) include compounds in which a carbon atom at the beta-position of the carbon-carbon double bond in the unsaturated carboxylic ester (A1-d3) is bound to at least a nitrogen atom of the amino group in the primary amino group-containing alkoxysilane. Namely, such ester-modified amino group-containing alkoxysilanes (A1-d4) are compounds as reaction products of a Michael addition reaction in which the nitrogen atom of the amino group in the primary amino group-containing alkoxysilane is bound to the unsaturated bond (carbon-carbon double bond) of the unsaturated carboxylic ester (A1-d3). This reaction can be carried out in the presence or in the absence of a solvent. The reaction can be conducted with heating and/or under a pressure (under a load).

Specifically, when the primary amino group-containing alkoxysilane is the alkoxysilane compound represented by Formula (6a) having a primary amino group alone as an isocyanate-reactive group; and the unsaturated carboxylic ester (A1-d3) is an unsaturated carboxylic ester represented by following Formula (7):

wherein $R^{19}$ and $R^{21}$ are the same as or different from each other and each represent a hydrogen atom or alkyl group; $R^{20}$ represents an alkyl group, an aryl group, or a cycloalkyl group; and $R^{22}$ represents a hydrogen atom, an alkyl group, an aryl group, an alkoxycarbonyl group, an aryloxycarbonyl group, or a cycloalkyloxycarbonyl group, the ester-modified amino group-containing alkoxysilanes (A1-d4) can be represented by following Formula (8):

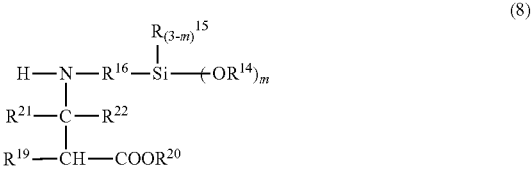

wherein $R^{14}$ to $R^{16}$, $R^{19}$ to $R^{22}$, and "m" are as defined above.

When the primary amino group-containing alkoxysilane is the alkoxysilane compound represented by Formula (6b) having a primary amino group and a secondary amino group as isocyanate-reactive groups, and the unsaturated carboxylic ester (A1-d3) is the unsaturated carboxylic ester represented by Formula (7), the ester-modified amino group-containing alkoxysilanes (A1-d4) can be represented by following Formula (9a) or Formula (9b):

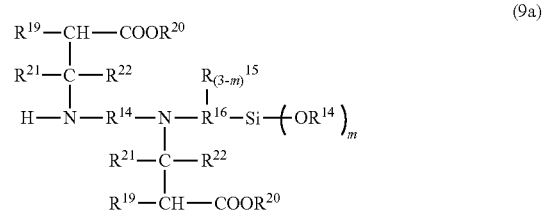

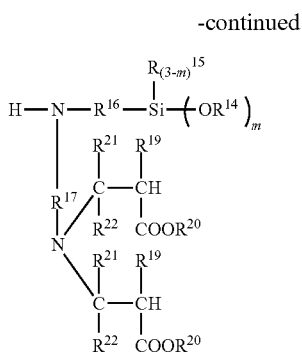

(9b)

wherein $R^{14}$ to $R^{17}$, $R^{19}$ to $R^{22}$ and "m" are as defined above.

In Formulae (7), (8), (9a) and (9b), $R^{14}$ to $R^{17}$ and "m" are as defined above. Specifically, the alkyl group as $R^{14}$ is preferably an alkyl group having about one to about four carbon atoms, such as methyl group, ethyl group, propyl group, isopropyl group, butyl group, isobutyl group, or t-butyl group. The alkyl group as $R^{15}$ can be as with the alkyl group as $R^{14}$, of which methyl group or ethyl group is preferred. The alkylene group as $R^{16}$ is preferably an alkylene group having about one to about three carbon atoms, such as methylene group, ethylene group, or trimethylene group. The alkylene group as $R^{17}$ can be an alkylene group having about one to about three carbon atoms, as with the alkylene group as $R^{16}$. The repetition number "m" is an integer of 1 to 3.

The alkyl group as $R^{19}$ can be, for example, an alkyl group having about one to about two carbon atoms, such as methyl group or ethyl group. The alkyl group as $R^{20}$ can be, for example, an alkyl group having about one to about twenty carbon atoms, such as methyl group, ethyl group, propyl group, butyl group, isobutyl group, t-butyl group, hexyl group, octyl group, or 2-ethylhexyl group. The aryl group as $R^{20}$ includes phenyl group, and the cycloalkyl group as $R^{20}$ includes cyclohexyl group. The alkyl group as $R^{21}$ can be, for example, an alkyl group having about one to about six carbon atoms, such as methyl group, ethyl group, propyl group, butyl group, isobutyl group, t-butyl group, or hexyl group. The alkyl group as $R^{22}$ can be, for example, an alkyl group having about one to about two carbon atoms, such as methyl group or ethyl group. The aryl group as $R^{22}$ includes phenyl group. The alkyl group moiety, aryl group moiety, and cycloalkyl group moiety of the alkoxycarbonyl group, aryloxycarbonyl group, and cycloalkyloxycarbonyl group as $R^{22}$ are preferably the above-exemplified alkyl group, aryl group, and cycloalkyl group as $R^{20}$, respectively.

The amino group-containing alkoxysilanes (A1-d) for use in the present invention are preferably alkoxysilane compounds containing at least a secondary amino group, of which the ester-modified alkoxysilanes (A1-d4) as represented by Formulae (8), and (9b) are more preferred.

Preferred examples of the isocyanate-reactive group-containing alkoxysilanes (A1-d) are isocyanate-reactive group-containing alkoxysilanes represented by Formulae (6a) to (6d) (amino group- or mercapto group-containing alkoxysilanes) and the ester-modified alkoxysilanes (A1-d4), of which ester-modified alkoxysilanes (A1-d4) as represented by Formulae (8), (9a), and (9b) are more preferred.

Alkoxysilylated urethane polymers (A1) containing at least one hydrophilic group The alkoxysilylated urethane polymers (A1) containing at least one hydrophilic group are reaction products among an isocyanate-reactive compound (A1-a), an isocyanate-reactive compound (A1-b), a polyisocyanate (A1-c), and an isocyanate-reactive group-containing alkoxysilane (A1-d), and are urethane prepolymers having at least one hydrophilic group (preferably an anionic group) derived from the isocyanate-reactive compound (A1-b) in the molecule and at least one alkoxysilyl group derived from the isocyanate-reactive group-containing alkoxysilane (A1-d) in the molecule (preferably at a terminal of the principal chain), as is described above. The alkoxysilylated urethane polymers (A1) containing at least one hydrophilic group may further comprise one or more side chains and/or groups, including side chains derived from the unsaturated carboxylic ester moiety of the isocyanate-reactive group-containing alkoxysilane (A1-d) (an ester groups, i.e., groups having an ester bond).

The alkoxysilylated urethane polymers (A1) containing at least one hydrophilic group can be, for example, urethane prepolymers having at least one terminal alkoxysilyl group and containing at least one hydrophilic group as reaction products between a hydrophilic group-containing urethane prepolymer and the isocyanate-reactive group-containing alkoxysilane (A1-d), in which terminal isocyanate groups of the hydrophilic group-containing urethane prepolymer are at least partially alkoxysilylated, and the hydrophilic group-containing urethane prepolymer is a reaction product among the isocyanate-reactive compound (A1-a), the isocyanate-reactive compound (A1-b), and the polyisocyanate (A1-c).

More specifically, the hydrophilic group-containing urethane prepolymer is a reaction product among the isocyanate-reactive compound (A1-a), the isocyanate-reactive compound (A1-b), and the polyisocyanate (A1-c), and the reaction can be carried out according to a known or conventional method for reacting a polyol compound and a polyisocyanate compound to yield a urethane prepolymer. The hydrophilic group-containing urethane prepolymer preferably has at least one terminal isocyanate group.

A polymerization catalyst can be used for accelerating the reaction upon mixing or reaction of the isocyanate-reactive compound (A1-a), the isocyanate-reactive compound (A1-b), and the polyisocyanate (A1-c). The reaction or mixing can be conducted in a solvent.

The reaction between the hydrophilic group-containing urethane prepolymer and the isocyanate-reactive group-containing alkoxysilane (A1-d) can be carried out by mixing the two components and, optionally, heating the mixture. The hydrophilic group-containing urethane prepolymer having terminal alkoxysilyl can be prepared by at least partially alkoxysilylating terminal isocyanate groups as a result typically of a reaction between the hydrophilic group-containing urethane prepolymer and the isocyanate-reactive group-containing alkoxysilane (A1-d). A polymerization catalyst can be used in the mixing or reaction, as is described above. One or more solvents can be used in the mixing or reaction.

The polymerization catalyst can be, for example, a known or conventional polymerization catalyst (curing catalyst) for the reaction between a polyol compound and a polyisocyanate compound. More specific examples of the polymerization catalyst include organic tin compounds, metal complexes, amine compounds and other basic compounds, and organic phosphate compounds. Examples of the organic tin compounds include dibutyltin dilaurate, dibutyltin maleate, dibutyltin phthalate, stannous octoate, dibutyltin methoxide, dibutyltin diacetylacetate, and dibutyltin diversatate. Examples of the metal complexes are titanate compounds such as tetrabutyl titanate, tetraisopropyl titanate, and triethanolamine titanate; metal salts of carboxylic acids, such as lead octoate, lead naphthoate, and cobalt naphthoate; and metal acetylacetonate complexes such as aluminum acetylacetonate complex and vanadium acetylacetonate complex. The amine compounds and other basic compounds include, for example, aminosilanes such as γ-aminopropyltrimethoxysilane and γ-aminopropyltriethoxysilane; quaternary ammonium salts such as tetramethylammonium chloride and benzalkonium chloride; and straight-chain or cyclic tertiary amines or quaternary ammonium salts each containing plural nitrogen atoms, such as products under the trade names of "DABCO" series and "DABCO BL" series available from Sankyo Air Products Co., Ltd., and 1,8-diazabicyclo[5.4.0]undec-7-ene. The organic phosphate compounds include monomethyl phosphate, di-n-butyl phosphate, and triphenyl phosphate.

Thus, alkoxysilylated urethane polymers (A1) containing at least one hydrophilic group (especially, urethane polymers containing at least one hydrophilic group and having at least one terminal alkoxysilyl group) can be prepared. In these mixing procedures, the order of mixing individual components is not limited. However, for efficiently producing an alkoxysilylated urethane polymer (A1) containing at least one hydrophilic group, it is preferred to prepare a hydrophilic group-containing urethane prepolymer having terminal alkoxusilyl by adding a polyisocyanate (A1-c) to a mixture of an isocyanate-reactive compound (A1-a) and an isocyanate-reactive compound (A1-b) and, if necessary, adding a polymerization catalyst thereto to carry out a reaction to thereby initially prepare a hydrophilic group-containing urethane prepolymer; and adding an isocyanate-reactive group-containing alkoxysilane (A1-d) to the reaction mixture to thereby yield a hydrophilic group-containing urethane prepolymer having terminal alkoxysilyl.

The proportions of the components, i.e., the isocyanate-reactive compound (A1-a), the isocyanate-reactive compound (A1-b), the polyisocyanate (A1-c), and the isocyanate-reactive group-containing alkoxysilane (A1-d) in the alkoxysilylated urethane polymer (A1) containing at least one hydrophilic group are not specifically limited. For example, the proportions of the polyisocyanate (A1-c) and the total of the isocyanate-reactive compound (A1-a) and the isocyanate-reactive compound (A1-b) can be selected within such a range that the ratio by equivalent of isocyanate groups in the polyisocyanate (A1-c) to isocyanate-reactive groups in the isocyanate-reactive compound (A1-a) and the isocyanate-reactive compound (A1-b) [NCO/(NCO-reactive group)] is more than 1 and equal to or less than 2.0, preferably 1.02 to 1.5, and more preferably 1.05 to 1.4. If the ratio of NCO to NCO-reactive group is excessively large (e.g., if it exceeds 2.0 (by equivalent)), the dispersibility may decrease. In contrast, if it is excessively small (e.g., if it is 1 or less (by equivalent)), silyl groups may not be sufficiently introduced, and the physical properties may decrease.

Alternately, the polyisocyanate (A1-c) may be contained in such a proportion that the hydrophilic group-containing urethane prepolymer has an isocyanate group content of 0.3 to 7.0 percent by mass, preferably 0.4 to 4.0 percent by mass, and more preferably 0.5 to 3.0 percent by mass. If the isocyanate content is excessively large (for example, if it exceeds 7.0 percent by mass), the dispersibility may decrease. In contrast, if the isocyanate content is excessively small (for example, if it is less than 0.3 percent by mass), the reaction time is very long, and silyl groups may not be sufficiently introduced to thereby decrease the water resistance.

The isocyanate-reactive compound (A1-b) is preferably contained in such a proportion that the anionic group content, if contained as a hydrophilic group, of the alkoxysilylated urethane polymer (A1) containing at least one hydrophilic group [i.e., anionic group-containing alkoxysilylated urethane polymer] is 0.4 meq/g or more, for example, 0.4 to 0.7 meq/g, and preferably 0.4 to 0.6 meq/g. If the anionic group content is excessively large, the water resistance may decrease. In contrast, if the anionic group content is excessively small (for example, if it is less than 0.4 meq/g), the dispersion stability may decrease.

The isocyanate-reactive group-containing alkoxysilane (A1-d) is preferably contained in such a proportion that the silicon atom content of the alkoxysilylated urethane polymer (A1) containing at least one hydrophilic group is, for example, 0.02 to 10 percent by mass, preferably 0.03 to 3 percent by mass, and more preferably 0.05 to 2 percent by mass. If the silicon atom content is excessively large (for example, if it exceeds 10 percent by mass), the resulting composition may have decreased stability. In contrast, if it is excessively small (for example, if it is less than 0.02 percent by mass), a bipolymer or terpolymer may not be formed, and expected advantages may not be obtained.

The amount of the unsaturated carboxylic ester (A1-d3), if used, is preferably such that at least one secondary amino group is remained in the ester-modified amino group-containing alkoxysilane (A1-d4). For example, the amount can be selected within the range of about 0.8 to about 2 moles per 1 mole of primary amino groups and secondary amino groups in the primary amino group-containing alkoxysilane. The unsaturated carboxylic ester (A1-d3) can be used in a reaction under such conditions that at least secondary amino group remains.

Any solvents can be used for the preparation of the urethane polymers (A) [especially, the alkoxysilylated urethane polymers (A1) containing at least one hydrophilic group], such as the solvent for the preparation of the hydrophilic group-containing urethane prepolymer and the solvent used in the reaction between the hydrophilic group-containing urethane prepolymer and the isocyanate-reactive group-containing alkoxysilane (A1-d). Examples thereof include organic solvents including ketones such as acetone, methyl ethyl ketone, and methyl isobutyl ketone; and pyrrolidones such as N-methylpyrrolidone. An organic solvent, if used as the solvent, can be removed from the reaction mixture after the preparation of an urethane polymer having at least one silicon-containing hydrolyzable group by a known removing process, including a distillation process such as vacuum distillation.

When vinyl-urethane copolymers are prepared according to the method for producing a vinyl-urethane copolymer comprising Steps (X) and (Y) as specifically illustrated below, the solvent for use in the preparation of the urethane polymer (A) [especially, the alkoxysilylated urethane polymer (A1) containing at least one hydrophilic group] is preferably an ethylenically unsaturated monomer (B) (vinyl monomer component) which will be subjected to polymerization in Step (Y). When the urethane polymer (A) is prepared by using the ethylenically unsaturated monomer (B) as a solvent, the reaction mixture after the preparation of the urethane polymer (A) can be used in Step (X) as intact. Specifically, an aqueous dispersion or aqueous solution of the urethane polymer (A) further containing the ethylenically unsaturated monomer (B) can be prepared in Step (X) by dispersing or dissolving the reaction mixture after the preparation of the urethane polymer (A) using the ethylenically unsaturated monomer (B) as a solvent in water as intact so as to disperse or dissolve, in water, the urethane polymer (A) together with the ethylenically unsaturated monomer (B) as a solvent. In addition, the ethylenically unsaturated monomer (B) in the aqueous dispersion or aqueous solution obtained in Step (X) [namely, the ethylenically unsaturated monomer (B) used as a solvent in the preparation of the urethane polymer (A)] can be used as a monomer component (vinyl monomer component) in the polymerization of the ethylenically unsaturated monomer (B) in Step (Y). The use of the ethylenically unsaturated monomer (B) as a solvent in the preparation of the urethane polymer (A) eliminates the need for removing the solvent, and the ethylenically unsaturated monomer (B) can be used in Step (X) and Step (Y) as intact as contained in the system. Accordingly, vinyl-urethane copolymers can be produced under such conditions as to be very excellent not only to human bodies but also to the environment. In addition, they can be produced in a short time and at reduced cost.

Part or all of the ethylenically unsaturated monomer (B), if used, can be used as a solvent in the preparation of the urethane polymer (A). When only part of the ethylenically unsaturated monomer (B) is used as a solvent in the preparation of the urethane polymer (A), the remainder of the ethylenically unsaturated monomer (B) can be introduced into the system in Step (Y) by, for example, an introduction procedure in one step or an introduction procedure by dropwise addition for carrying out polymerization of the ethylenically unsaturated monomer (B).

Preferred urethane polymers (A) for use in the present invention are urethane polymers having at least one silicon-containing hydrolyzable group, derived from the amino group-containing alkoxysilane compound or mercapto group-containing alkoxysilane compound represented by Formulae (6a) to (6d) or the ester-modified amino group-containing alkoxysilane (A1-d4), as the isocyanate-reactive group-containing alkoxysilane (A1-d). Of such ester-modified amino group-containing alkoxysilanes (A1-d4), ester-modified alkoxysilanes (A1-d4) represented by Formulae (8), (9a), and (9b) are more preferred.

Ethylenically Unsaturated Monomers (B)

The ethylenically unsaturated monomers (B) comprise at least one ethylenically unsaturated bond-containing group per molecule. These ethylenically unsaturated monomers (B) are not specifically limited, as long as they are monomers (vinyl monomer components) having at least one ethylenically unsaturated bond (ethylenic carbon-carbon double bond) per molecule. These ethylenically unsaturated monomers (B) can be used alone or in combination.

The ethylenically unsaturated bond-containing group in the ethylenically unsaturated monomers (B) is not specifically limited, as long as it is a group containing an ethylenically unsaturated bond (ethylenic carbon-carbon double bond). Examples thereof are vinyl group; and 1-alkylvinyl groups such as 1-methylvinyl group (isopropenyl group), and 1-ethylvinyl group. The ethylenically unsaturated bond-containing group is preferably vinyl group and/or isopropenyl group, of which vinyl group is more preferred.

Specifically, the ethylenically unsaturated monomers (B) can be selected as appropriate from among ethylenically unsaturated monomers (polymerizable unsaturated monomers) such as acrylic monomers, carboxyl group-containing monomers, acid anhydride group-containing monomers, hydroxyl group-containing monomers, epoxy group-containing monomers, amino group-containing monomers, cyano group-containing monomers, styrenic monomers, olefinic monomers, vinyl esters, vinyl ethers, alkoxyalkyl (meth)acrylate monomers, (N-substituted) acrylamide monomers, N-vinyllactams, heterocycle-containing vinyl monomers, alkylene glycol (meth)acrylate monomers, sulfonic group-containing vinyl monomers, phosphate group-containing vinyl monomers, halogen atom-containing vinyl monomers, and polyfunctional monomers. Specific examples of these ethylenically unsaturated monomers (B) are listed below.

The ethylenically unsaturated monomers (B) may further comprise one or more groups such as reactive or nonreactive groups, in addition to the group having an ethylenic carbon-carbon double bond (e.g., vinyl group). Of such additional groups, nonreactive groups are preferred. Examples of the additional groups are substituted oxycarbonyl groups such as alkoxycarbonyl groups, cycloalkyloxycarbonyl groups, and aryloxycarbonyl groups; carboxyl group; hydroxyl group; epoxy group; amino group; aminoalkylcarbonyl groups; cyano group; hydrocarbon groups such as alkyl groups, aryl groups, and cycloalkyl groups; acyl groups; acyloxy groups; substituted carbonyloxy groups such as alkylcarbonyloxy groups, cycloalkylcarbonyloxy groups, and arylcarbonyloxy groups; substituted oxy groups such as alkoxy groups, cycloalkyloxy groups, and aryloxy groups; substituted aminocarbonyl groups such as dialkylamino-carbonyl groups; heterocycle-containing groups; isocyanate group; oxo group; sulfonic group; phosphate group; and halogen atoms. The ethylenically unsaturated monomers (B) may each have one or more of these groups alone or in combination. These groups may each further have one or more groups with or without the intermediary of a bivalent group. When a reactive group is contained, it is essentially a group other than the functional group reactive with a silicon-containing hydrolyzable group.

Acrylic monomers can be preferably used as the ethylenically unsaturated monomer (B) in the present invention. Specifically, the ethylenically unsaturated monomer (B) preferably comprise at least an acrylic monomer.

Specifically, the acrylic monomers include acrylic esters and methacrylic esters [(meth)acrylic esters]. Examples of the (meth)acrylic esters include (meth)acrylic acid alkyl esters, (meth)acrylic acid cycloalkyl esters, and (meth)acrylic acid aryl esters. Examples of the (meth)acrylic acid alkyl esters include (meth)acrylic acid $C_{1-20}$ alkyl esters, such as methyl(meth)acrylate, ethyl(meth)acrylate, propyl(meth)acrylate, isopropyl(meth)acrylate, butyl(meth)acrylate, isobutyl(meth)acrylate, s-butyl (meth)acrylate, t-butyl(meth)acrylate, pentyl(meth)acrylate, hexyl(meth)acrylate, heptyl(meth)acrylate, octyl(meth)acrylate, 2-ethylhexyl(meth)acrylate, isooctyl(meth)acrylate, nonyl(meth)acrylate, isononyl(meth)acrylate, decyl(meth)acrylate, isodecyl(meth)acrylate, undecyl(meth)acrylate, dodecyl(meth)acrylate, tridecyl(meth)acrylate, tetradecyl(meth)acrylate, pentadecyl(meth)acrylate, hexadecyl(meth)acrylate, heptadecyl(meth)acrylate, octadecyl(meth)acrylate, nonadecyl(meth)acrylate, and eicosyl(meth)acrylate. Among them, (meth) acrylic acid $C_{1-6}$ alkyl esters are preferred, and (meth) acrylic acid $C_{1-4}$ alkyl esters are more preferred.

The (meth)acrylic acid cycloalkyl esters include cyclohexyl (meth)acrylate. The (meth)acrylic acid aryl esters include phenyl(meth)acrylate.

An ethylenically unsaturated monomer (copolymerizable unsaturated monomer) capable of copolymerizing with an acrylic monomer is preferably used, in addition to the acrylic monomer, as the ethylenically unsaturated monomers (B) in the present invention. Known or conventional copolymerizable unsaturated monomers can be used as the copolymerizable unsaturated monomer. Specific examples of the copolymerizable unsaturated monomers include carboxyl group-containing monomers such as acrylic acid, methacrylic acid, itaconic acid, maleic acid, fumaric acid, crotonic acid, and carboxyalkyl (meth)acrylates including carboxyethyl acrylate; acid anhydride group-containing monomers such as maleic anhydride and itaconic anhydride; hydroxyl group-containing monomers such as hydroxyethyl(meth)acrylate, hydroxypropyl(meth)acrylate, hydroxybutyl(meth)acrylate, hydroxyhexyl(meth)acrylate, and hydroxyoctyl(meth)acrylate; epoxy group-containing monomers such as glycidyl (meth)acrylate; amino group-containing monomers such as aminoethyl(meth)acrylate, N,N-dimethylaminoethyl(meth)acrylate, and t-butylaminoethyl(meth)acrylate; cyano group-containing monomers such as acrylonitrile and methacrylonitrile; styrenic monomers such as styrene and α-methylstyrene; olefinic monomers such as ethylene, propylene, isoprene, butadiene, and isobutylene; vinyl esters such as vinyl acetate and vinyl propionate; vinyl ethers such as methyl vinyl ether, ethyl vinyl ether, propyl vinyl ether, and butyl vinyl ether; alkoxyalkyl(meth)acrylate monomers such as methoxyethyl(meth)acrylate and ethoxyethyl(meth)acrylate; (N-substituted) acrylamide monomers such as (meth)acrylamide, N,N-dimethyl(meth)acrylamide, N-butyl(meth)acrylamide, N-methylol(meth)acrylamide, and N-methylolpropane(meth)acrylamide; N-vinylcarboxylic acid amides; N-vinyllactams such as N-vinylcaprolactam; heterocycle-containing vinyl monomers such as N-vinylpyridine, N-vinylpyrimidine, N-vinylpyrazine, N-vinylpyrrole, N-vinylimidazole, N-vinylpyrrolidone, N-(1-methylvinyl)pyrrolidone, N-vinylpiperidone, N-vinylpiperazine, N-vinyloxazole, and N-vinylmorpholine; alkylene glycol(meth)acrylate monomers such as polyethylene glycol(meth)acrylate, polypropylene glycol(meth)acrylate, methoxyethylene glycol(meth)acrylate, and methoxypolypropylene glycol(meth)acrylate; sulfonic group-containing vinyl monomers such as styrenesulfonic acid and allylsulfonic acid; phosphate group-containing vinyl monomers such as 2-hydroxyethylacryloyl phosphate; and halogen atom-containing vinyl monomers such as vinyl chloride.

The copolymerizable unsaturated monomers also include appropriately selected polyfunctional monomers such as hexanediol di(meth)acrylate, (poly)ethylene glycol di(meth)acrylate, (poly)propylene glycol di(meth)acrylate, neopentyl glycol di(meth)acrylate, pentaerythritol di(meth)acrylate, trimethylolpropane tri(meth)acrylate, pentaerythritol tri(meth)acrylate, dipentaerythritol hexa(meth)acrylate, epoxy acrylate, polyester acrylate, urethane acrylate, divinylbenzene, butyl di(meth)acrylate, and hexyl di(meth)acrylate.

Of course, each of these copolymerizable unsaturated monomers can be used alone or in combination.

Compounds (C)

The compounds (C) having at least one functional group reactive with a silicon-containing hydrolyzable group and at least one functional group reactive with an ethylenically unsaturated bond-containing group (hereinafter also referred to as "compounds (C)") are not specifically limited, as long as they are compounds, such as monomer components, which have at least one functional group reactive with an ethylenically unsaturated bond-containing group (hereinafter also referred to as "unsaturated bond-reactive group") and at least one functional group reactive with a silicon-containing hydrolyzable group (hereinafter also referred to as "hydrolysis-reactive group") per molecule. Each of these compounds (C) can be used alone or in combination.

The functional groups reactive with an ethylenically unsaturated bond-containing group (unsaturated bond-reactive groups) in the compounds (C) are not specifically limited, as long as they are functional groups that are reactive with a group containing an ethylenically unsaturated bond (ethylenic carbon-carbon double bond). The functional groups are preferably capable of undergoing addition reaction or polymerization reaction with the group. Examples of the unsaturated bond-reactive groups are ethylenically unsaturated bond-containing groups and mercapto group, and these ethylenically unsaturated bond-containing groups and mercapto group are advantageously used. The ethylenically unsaturated bond-containing groups as the unsaturated bond-reactive groups are not specifically limited as long as they are groups containing an ethylenically unsaturated bond (ethylenic carbon-carbon double bond) as above. Examples thereof include vinyl group; and 1-alkylvinyl groups such as 1-methylvinyl group (isopropenyl group) and 1-ethylvinyl group, of which vinyl group and isopropenyl group are preferred, and vinyl group is more preferred.

The functional groups reactive with a silicon-containing hydrolyzable group (hydrolysis-reactive groups) in the compounds (C) are not specifically limited, as long as they are functional groups that are reactive with a silicon-containing hydrolyzable group. The functional groups are preferably capable of undergoing hydrolysis reaction with the group. Preferred examples thereof are silicon-containing hydrolyzable groups.

Consequently, the compounds (C) can be compounds having a silicon-containing hydrolyzable group and an ethylenically unsaturated bond-containing group (silane compounds having an ethylenically unsaturated bond-containing group) and compounds having a silicon-containing hydrolyzable group and a mercapto group (silane compounds having a mercapto group).

The silicon-containing hydrolyzable groups as the hydrolysis-reactive groups in the compounds (C) are preferably hydrolyzable silyl groups as above, of which alkoxysilyl groups are more preferred. Preferred examples of the alkoxy groups in the alkoxysilyl groups are alkoxy groups having one to four carbon atoms, such as methoxy group, ethoxy group, propoxy group, isopropoxy group, butoxy group, isobutyloxy group, s-butyloxy group, and t-butyloxy group. Among them, methoxy group, ethoxy group, and propoxy group are more preferred, and methoxy group and ethoxy group are further preferred. The alkoxy groups can naturally be alkoxy groups having five or more carbon atoms.

In general, one to three, preferably two or three, alkoxy groups are bound to one silicon atom. Each of the alkoxy groups can be used alone or in combination. Namely, a plurality of an alkoxy group or different alkoxy groups can be bound to one silicon atom.

Accordingly, preferred examples of the hydrolysis-reactive groups in the compounds (C) are reactive silyl groups represented by following Formula (10)

(10)

wherein $R^{23}$ represents a hydrogen atom or a hydrocarbon group.

The hydrocarbon groups as $R^{23}$ in Formula (10) include, for example, aliphatic hydrocarbon groups, alicyclic hydrocarbon groups, and aromatic hydrocarbon groups. Examples of the aliphatic hydrocarbon groups in $R^{23}$ include alkyl groups having about one to about twenty carbon atoms, such as methyl group, ethyl group, propyl group, isopropyl group, butyl group, isobutyl group, t-butyl group, s-butyl group, n-pentyl group, hexyl group, heptyl group, octyl group, 2-ethylhexyl group, nonyl group, decyl group, undecyl group, dodecyl group, tridecyl group, tetradecyl group, pentadecyl group, hexadecyl group, heptadecyl group, and octadecyl group. The aliphatic hydrocarbon groups as $R^{23}$ can also be, for example, alkenyl groups, alkadienyl groups, and alkynyl groups corresponding to the alkyl groups, in which the positions of unsaturated bonds are not specifically limited.

The alicyclic hydrocarbon groups as $R^{23}$ include, for example, cycloalkyl groups having about five to about ten carbon atoms constituting the ring, such as cyclohexyl group; and groups having a polycyclic hydrocarbon ring including a bridged ring such as a hydrocarbon ring in norbornane. The aromatic hydrocarbon groups as $R^{23}$ include, for example, aryl groups such as phenyl group and naphthyl group. The aromatic rings in the aromatic hydrocarbon groups can be benzene ring and fused carbon rings including fused carbon rings each comprising two to ten 4- to 7-membered carbon rings being fused, such as naphthalene ring.

Preferred examples of $R^{23}$ include hydrocarbon groups including aliphatic hydrocarbon groups such as alkyl groups. Among them, alkyl groups having about one to about ten carbon atoms are preferred, alkyl groups having about one to about six carbon atoms are more preferred, and alkyl groups having about one to about four carbon atoms are typically preferred.

The hydrocarbon group as $R^{23}$ may have one or more substituents. The hydrocarbon group as $R^{23}$ may be combined with another hydrocarbon group through the intermediary typically of the substituent to form a ring such as an aromatic ring or nonaromatic ring.

The reactive silyl groups represented by Formula (10) may have at least one "—$OR^{23}$" group that exhibits reactivity in one silicon atom. One, two, or three "—$OR^{23}$" groups can be bound to one silicon atom. Plural "—$OR^{23}$" groups, if bound to one silicon atom, can be the same as, or partially or fully different from each other. When one or two "—$OR^{23}$" groups are bound to one silicon atom, one or two groups such as hydrogen atoms or hydrocarbon groups may be bound to the silicon atom. Specific examples of the reactive silyl groups include reactive silyl groups represented by following Formulae (10a) and (10b):

wherein $R^{24}$ represents a hydrogen atom or a hydrocarbon group; $R^{23}$ is as defined above; $p^1$ is 1 or 2; and $p^2$ is 1, 2 or 3, wherein each of $R^{23}$ and $R^{24}$ may be bound to $R^{23}$ or $R^{24}$ which is bound to the same or a different silicon atom.

The hydrocarbon groups as $R^{24}$s in Formulae (10a) and (10b) can be as with the hydrocarbon groups as $R^{23}$, such as aliphatic hydrocarbon groups, alicyclic hydrocarbon groups, and aromatic hydrocarbon groups. Specifically, the aliphatic hydrocarbon groups as $R^{24}$s include alkyl groups having about one to about twenty carbon atoms, such as methyl group, ethyl group, propyl group, isopropyl group, butyl group, isobutyl group, t-butyl group, s-butyl group, n-pentyl group, hexyl group, heptyl group, octyl group, 2-ethylhexyl group, nonyl group, decyl group, undecyl group, dodecyl group, tridecyl group, tetradecyl group, pentadecyl group, hexadecyl group, heptadecyl group, and octadecyl group; and alkenyl groups, alkadienyl groups, and alkynyl groups corresponding to the alkyl groups. Alkenyl groups, for example, as the aliphatic hydrocarbon groups as $R^{24}$s may be alkenyl groups having a terminal carbon-carbon double bond (ethylenic carbon-carbon double bond) or alkenyl groups having a carbon-carbon double bond (non-ethylenic carbon-carbon double bond) inside the molecule. Thus, the positions of unsaturated bonds in the aliphatic unsaturated hydrocarbon groups as R are not specifically limited.

The alicyclic hydrocarbon groups and the aromatic hydrocarbon groups as $R^{24}$s can be as with the alicyclic hydrocarbon groups and the aromatic hydrocarbon groups as listed as $R^{23}$.

As $R^{24}$s preferred are hydrocarbon groups including aliphatic hydrocarbon groups such as alkyl groups. Among them, alkyl groups having about one to about ten carbon atoms are preferred, alkyl groups having about one to about six carbon atoms are more preferred, and alkyl groups having about one to about four carbon atoms are typically preferred.

The hydrocarbon groups as $R^{23}$s and $R^{24}$s in Formulae (10a) and (10b) may each have one or more substituents. Each of the hydrocarbon groups as $R^{23}$s and $R^{24}$s may be combined with another hydrocarbon group (e.g., a hydrocarbon group as $R^{23}$ or $R^{24}$ bound to another silicon atom) through the intermediary typically of the substituent to form a ring such as an aromatic ring or nonaromatic ring.

The group $R^{23}$ may be combined with $R^{23}$ or $R^{24}$ which is bound to the same or a different silicon atom, and $R^{24}$ may be combined with $R^{23}$ or $R^{24}$ which is bound to the same or a different silicon atom. When $R^{23}$ or $R^{24}$ is combined with $R^{23}$ or $R^{24}$ bound to another silicon atom, the silicon atom can be a silicon atom in the same molecule or a silicon atom in a different molecule. $R^{23}$ or $R^{24}$, if combined with $R^{23}$ or $R^{24}$ bound to a silicon atom in the same molecule, forms a ring. $R^{23}$ or $R^{24}$, if combined with $R^{23}$ or $R^{24}$ bound to a silicon atom in a different molecule, forms a crosslinked structure (bridged structure).

The number $p^1$ is 1 or 2 and is preferably 2. When $p^1$ is 2, it means that no $R^{24}$ but two "—$OR^{23}$" groups are bound to the silicon atom in Formula (10a).

The number $p^2$ is 1, 2 or 3 and is preferably 2 or 3. When $p^2$ is 3, it means that no $R^{24}$ but three "—$OR^{23}$" groups are bound to the silicon atom in Formula (10b).

Such a compound having the reactive silyl group represented by Formula (10a) as a reactive group may contain the reactive silyl group represented by Formula (10a) as a repeating unit or part of a repeating unit, or as a single bivalent group not being a repeating unit or part of a repeating unit.

To the other end of the reactive silyl group represented by Formula (10a), the reactive silyl group represented by Formula (10b) or another group may be bound.

The reactive silyl groups are preferably the reactive silyl groups represented by Formula (10b). Specific examples of the reactive silyl groups represented by Formula (10b) include trialkoxysilyl groups such as trimethoxysilyl group, triethoxysilyl group, tripropoxysilyl group, triisopropoxysilyl group, tributoxysilyl group, triisobutoxysilyl group, tri(s-butoxy)silyl group, and tri(t-butoxy)silyl group; alkyldialkoxysilyl groups such as methyldimethoxysilyl group, methyldiethoxysilyl group, methyldipropoxysilyl group, methyldibutoxysilyl group, ethyldimethoxysilyl group, ethyldiethoxysilyl group, ethyldipropoxysilyl group, ethyldibutoxysilyl group, propyldimethoxysilyl group, propyldiethoxysilyl group, propyldipropoxysilyl group, and propyldibutoxysilyl group; corresponding dialkyl(mono)alkoxysilyl groups; and dialkoxysilyl groups and alkoxysilyl groups corresponding to these alkyldialkoxysilyl groups and dialkyl(mono)alkoxysilyl groups, except with hydrogen atom replacing an alkyl group. The reactive silyl groups represented by Formula (10b) further include hydroxyl group-containing silyl groups corresponding to the trialkoxysilyl groups, alkyldialkoxysilyl groups and dialkyl(mono)alkoxysilyl groups, except with hydroxyl group replacing at least one alkoxy group as a result of hydrolysis.

The compounds comprising a reactive silyl group as mentioned above (hereinafter also referred to as "reactive silyl group-containing compounds") as the compounds (C) have only to comprise at least one functional group reactive with an ethylenically unsaturated bond-containing group (unsaturated bond-reactive group) and at least one reactive silyl group as represented by Formula (10) per molecule. Examples of the reactive silyl group-containing compounds are reactive silyl group-containing compounds in which a reactive silyl group represented by Formula (10a) or (10b) is combined with an unsaturated bond-reactive group with or without the intermediary of a bivalent organic group.

Examples of the unsaturated bond-reactive groups include ethylenically unsaturated bond-containing groups including vinyl group, and 1-alkylvinyl groups such as 1-methylvinyl group (isopropenyl group) and 1-ethylvinyl group, as described above, of which vinyl group and isopropenyl group are preferred, and vinyl group is more preferred; as well as mercapto group.

Examples of the bivalent organic group include bivalent hydrocarbon groups comprising hydrocarbon groups alone, such as alkylene groups, arylene groups, alkylene-arylene groups, and alkylene-arylene-alkylene groups; and bivalent organic groups comprising one or more bivalent hydrocarbon groups and one or more other bivalent groups in combination, such as alkylene-oxy-alkylene groups, alkylene-carbonyl-oxy-alkylene groups, alkylene-oxy-carbonyl-alkylene groups, oxy-alkylene groups, carbonyl-oxy-alkylene groups, oxy-carbonyl-alkylene groups, oxy-arylene groups, carbonyl-oxy-arylene groups, oxy-carbonyl-arylene groups, and alkylene-oxy-carbonyl-arylene-carbonyl-oxy-alkylene groups. Examples of the other bivalent groups are oxy group, carbonyl group, carbonyl-oxy group, oxy-carbonyl group, oxy-carbonyl-oxy group, thioxy group, thiocarbonyl group, thiocarbonyl-oxy group, carbonyl-thioxy group, oxy-thiocarbonyl-oxy group, thioxy-carbonyl-thioxy group, amide bond-containing groups such as —NHCO— group and —CONH— group, imide bond-containing group (—CONHCO— group), urethane bond-containing groups such as —NHCOO— group and —OCONH— group, urea bond-containing group (—NHCONH— group; urea bond-containing group).

Of the ethylenically unsaturated bond-containing groups as unsaturated bond-reactive groups to be bound to the reactive silyl group through the intermediary of a bivalent group, groups comprising a vinyl group combined through the intermediary of a bivalent group include, for example, vinyl-alkyl groups such as allyl group (2-propenyl group); vinyl-(alkyl)-aryl groups such as vinyl-phenyl group and allyl-phenyl group; vinyl-(alkyl)-cycloalkyl groups such as vinyl-cyclohexyl group and allyl-cyclohexyl group; (meth)acryloyl groups (acryloyl group and methacryloyl group); (meth)acryloyloxyalkyl groups such as (meth)acryloyloxyethyl group and (meth)acryloyloxypropyl group; (meth)acryloyloxyaryl groups such as (meth)acryloyloxyphenyl group; and vinyl-(alkyl)-oxycarbonyl-phenylene-carbonyloxy-alkyl groups such as vinyl-oxycarbonyl-phenylene-carbonyloxy-ethyl group, vinyl-oxycarbonyl-phenylene-carbonyloxy-propyl group, allyl-oxycarbonyl-phenylene-carbonyloxy-ethyl group, and allyl-oxycarbonyl-phenylene-carbonyloxy-propyl group. Groups comprising a 1-alkylvinyl group (e.g., 1-methylvinyl group) combined through the intermediary of a bivalent group as the groups comprising ethylenically unsaturated bond-containing groups combined through the intermediary of a bivalent group include those corresponding to the groups comprising a vinyl group combined through the intermediary of a bivalent group.

The groups comprising a mercapto group as the unsaturated bond-reactive group combined through the intermediary of a bivalent group include groups corresponding to the above-mentioned groups comprising an ethylenically unsaturated bond-containing group as the unsaturated bond-reactive group combined through the intermediary of a bivalent group, such as mercaptoalkyl groups, mercapto-(alkyl)-aryl groups, and mercapto-(alkyl)-cycloalkyl groups.

The reactive silyl group-containing compounds as the compounds (C) for use in the present invention are preferably ethylenically unsaturated compounds (vinyl group-containing silane coupling agents) in which a vinyl group as the unsaturated bond-reactive group is bound to a silicon atom in the reactive silyl group represented by Formula (10b) with or without the intermediary of a bivalent organic group; and mercapto compounds (mercapto group-containing silane coupling agents) in which a mercapto group as the unsaturated bond-reactive group is bound to a silicon atom in the reactive silyl group represented by Formula (10b) with or without the intermediary of a bivalent organic group.

Examples of the vinyl group-containing silane coupling agents wherein a vinyl group is directly bound to a silicon atom in the reactive silyl group without the intermediary of a bivalent organic group include vinyltrialkoxysilanes such as vinyltrimethoxysilane, vinyltriethoxysilane, vinyltripropoxysilane, vinyltriisopropoxysilane, and vinyltributoxysilane; (vinyl)alkyldialkoxysilanes such as vinylmethyldimethoxysilane, vinylmethyldiethoxysilane, vinylmethyldipropoxysilane, vinylmethyldiisopropoxysilane, vinylmethyldibutoxysilane, vinylethyldimethoxysilane, vinylethyldiethoxysilane, vinylethyldipropoxysilane, vinylethyldiisopropoxysilane, vinylethyldibutoxysilane, vinylpropyldimethoxysilane, vinylpropyldiethoxysilane, vinylpropyldipropoxysilane, vinylpropyldiisopropoxysilane, and vinylpropyldibutoxysilane; and corresponding (vinyl)dialkyl(mono)alkoxysilanes.

Examples of the vinyl group-containing silane coupling agents wherein a vinyl group is bound to a silicon atom in the reactive silyl group through the intermediary of a bivalent organic group include corresponding silane coupling agents comprising a variety of bivalent organic groups, corresponding to the above-exemplified vinyl group-containing silane coupling agents wherein a vinyl group is directly bound to a silicon atom in the reactive silyl group without the intermediary of a bivalent organic group. Specific examples of the vinyl group-containing silane coupling agents wherein a vinyl group is bound to a silicon atom in the reactive silyl group through the intermediary of a bivalent organic group, and wherein the bivalent organic group is an alkylene group, include vinylalkyltrialkoxysilanes such as vinylmethyltrimethoxysilane, vinylmethyltriethoxysilane, β-vinylethyltrimethoxysilane, β-vinylethyltriethoxysilane, β-vinylethyltripropoxysilane, β-vinylethyltriisopropoxysilane, β-vinylethyltributoxysilane, γ-vinylpropyltrimethoxysilane, γ-vinylpropyltriethoxysilane, γ-vinylpropyltripropoxysilane, γ-vinylpropyltriisopropoxysilane, and γ-vinylpropyltributoxysilane; (vinylalkyl)alkyldialkoxysilanes such as β-vinylethylmethyldimethoxysilane, β-vinylethylmethyldiethoxysilane, γ-vinylpropylmethyldimethoxysilane, γ-vinylpropylmethyldiethoxysilane, γ-vinylpropylmethyldipropoxysilane, γ-vinylpropylmethyldiisopropoxysilane, γ-vinylpropylmethyldibutoxysilane, γ-vinylpropylethyldimethoxysilane, γ-vinylpropylethyldiethoxysilane, γ-vinylpropylethyldipropoxysilane, γ-vinylpropylethyldiisopropoxysilane, and γ-vinylpropylethyldibutoxysilane; and corresponding (vinylalkyl)dialkyl(mono)alkoxysilanes.

Examples of the vinyl group-containing silane coupling agents, wherein a vinyl group is bound to the silicon atom in the reactive silyl group through the intermediary of a bivalent organic group and wherein the bivalent organic group is a carbonyloxyalkylene group, include (meth)acryloyloxyalkyl-trialkoxysilanes such as (meth)acryloyloxymethyl-trimethoxysilane, (meth)acryloyloxymethyl-triethoxysilane, 2-(meth)acryloyloxyethyl-trimethoxysilane, 2-(meth)acryloyloxyethyl-triethoxysilane, 2-(meth)acryloyloxyethyl-tripropoxysilane, 2-(meth)acryloyloxyethyl-triisopropoxysilane, 2-(meth)acryloyloxyethyl-tributoxysilane, 3-(meth)acryloyloxypropyl-trimethoxysilane, 3-(meth)acryloyloxypropyl-triethoxysilane, 3-(meth)acryloyloxypropyl-tripropoxysilane, 3-(meth)acryloyloxypropyl-triisopropoxysilane, and 3-(meth)acryloyloxypropyl-tributoxysilane; (meth)acryloyloxyalkyl-alkyldialkoxysilanes such as (meth)acryloyloxymethyl-methyldimethoxysilane, (meth)acryloyloxymethyl-methyldiethoxysilane, 2-(meth)acryloyloxyethyl-methyldimethoxysilane, 2-(meth)acryloyloxyethyl-methyldiethoxysilane, 2-(meth)acryloyloxyethyl-methyldipropoxysilane, 2-(meth)acryloyloxyethyl-methyldiisopropoxysilane, 2-(meth)acryloyloxyethyl-methyldibutoxysilane, 3-(meth)acryloyloxypropyl-methyldimethoxysilane, 3-(meth)acryloyloxypropyl-methyldiethoxysilane, 3-(meth)acryloyloxypropyl-methyldipropoxysilane, 3-(meth)acryloyloxypropyl-methyldiisopropoxysilane, 3-(meth)acryloyloxypropyl-methyldibutoxysilane, 3-(meth)acryloyloxypropyl-ethyldimethoxysilane, 3-(meth)acryloyloxypropyl-ethyldiethoxysilane, 3-(meth)acryloyloxypropyl-ethyldipropoxysilane, 3-(meth)acryloyloxypropyl-ethyldiisopropoxysilane, 3-(meth)acryloyloxypropyl-ethyldibutoxysilane, 3-(meth)acryloyloxypropyl-propyldimethoxysilane, 3-(meth)acryloyloxypropyl-propyldiethoxysilane, 3-(meth)acryloyloxypropyl-propyldipropoxysilane, 3-(meth)acryloyloxypropyl-propyldiisopropoxysilane, and 3-(meth)acryloyloxypropyl-propyldibutoxysilane; and corresponding (meth)acryloyloxyalkyl-dialkyl(mono)alkoxysilanes.

Examples of the mercapto group-containing silane coupling agents include those corresponding to the above-exemplified vinyl group-containing silane coupling agents such as the vinyl group-containing silane coupling agents wherein a vinyl group is bound to the silicon atom in the reactive silyl group through the intermediary of a bivalent organic group and wherein the bivalent organic group is an alkylene group. Specific examples of the mercapto group-containing silane coupling agents include mercaptoalkyltrialkoxysilanes such as mercaptomethyltrimethoxysilane, mercaptomethyltriethoxysilane, β-mercaptoethyltrimethoxysilane, β-mercaptoethyltriethoxysilane, β-mercaptoethyltripropoxysilane, β-mercaptoethyltriisopropoxysilane, β-mercaptoethyltributoxysilane, γ-mercaptopropyltrimethoxysilane, γ-mercaptopropyltriethoxysilane, γ-mercaptopropyltripropoxysilane, γ-mercaptopropyltriisopropoxysilane, and γ-mercaptopropyltributoxysilane; (mercaptoalkyl)alkyldialkoxysilanes such as β-mercaptoethylmethyldimethoxysilane, β-mercaptoethylmethyldiethoxysilane, γ-mercaptopropylmethyldimethoxysilane, γ-mercaptopropylmethyldiethoxysilane, γ-mercaptopropylmethyldipropoxysilane, γ-mercaptopropylmethyldiisopropoxysilane, γ-mercaptopropylmethyldibutoxysilane, γ-mercaptopropylethyldimethoxysilane, γ-mercaptopropylethyldiethoxysilane, γ-mercaptopropylethyldipropoxysilane, γ-mercaptopropylethyldiisopropoxysilane, and γ-mercaptopropylethyldibutoxysilane; and corresponding (mercaptoalkyl)dialkyl(mono)alkoxysilanes.

Some reactive silyl group-containing compounds are included both in the compounds having a reactive silyl group represented by Formula (10a) and in the compounds having a reactive silyl group represented by Formula (10b). The compounds of this type can be classified as appropriate as compounds having a reactive silyl group represented by one of Formula (10a) and Formula (10b).

Silane compounds (D) having at least one silicon-containing hydrolyzable group

The silane compounds (D) having a silicon-containing hydrolyzable group (hereinafter also referred to as "silane compounds (D)") are not specifically limited, as long as they are silane compounds having, per molecule, at least one functional group reactive with a silicon-containing hydrolyzable group. Each of these silane compounds (D) can be used alone or in combination.

The silicon-containing hydrolyzable groups in the silane compounds (D) are preferably hydrolyzable silyl groups, of which alkoxysilyl groups are more preferred, as above. Preferred examples of the alkoxy groups in the alkoxysilyl groups are alkoxy groups having one to four carbon atoms, such as methoxy group, ethoxy group, propoxy group, isopropoxy group, butoxy group, isobutyloxy group, s-butyloxy group, and t-butyloxy group, of which methoxy group, ethoxy group, and propoxy group are more preferred, and methoxy group and ethoxy group are especially preferred. Naturally, the alkoxy groups can be alkoxy groups having five or more carbon atoms.

In general, one to three, preferably two or three, alkoxy groups are bound to one silicon atom. Each of the alkoxy groups can be used alone or in combination. Namely, a plurality of an alkoxy group or different alkoxy groups can be bound to one silicon atom.

The silane compounds (D) can be, for example, silane compounds having a silicon-containing hydrolyzable group represented by following Formula (11):

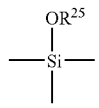

(11)

wherein $R^{25}$ represents a hydrogen atom or a hydrocarbon group.

The hydrocarbon groups as $R^{25}$ in Formula (11) can be as with the hydrocarbon groups as $R^{23}$ in Formula (10), such as aliphatic hydrocarbon groups, alicyclic hydrocarbon groups, and aromatic hydrocarbon groups. The group $R^{25}$ is preferably a hydrocarbon group such as an aliphatic hydrocarbon group, of which an alkyl group is typically preferred. Specific examples of the aliphatic hydrocarbon groups as $R^{25}$ include alkyl groups having about one to about twenty carbon atoms, such as methyl group, ethyl group, propyl group, isopropyl group, butyl group, isobutyl group, t-butyl group, s-butyl group, n-pentyl group, hexyl group, heptyl group, octyl group, 2-ethylhexyl group, nonyl group, decyl group, undecyl group, dodecyl group, tridecyl group, tetradecyl group, pentadecyl group, hexadecyl group, heptadecyl group, and octadecyl group. Among them, alkyl groups having about one to about ten carbon atoms are preferred as the aliphatic hydrocarbon group as $R^{25}$, of which those having about one to about six carbon atoms are more preferred, and those having about one to about four carbon atoms are especially preferred.

The hydrocarbon group as $R^{25}$ may have one or more substituents and may be combined with another hydrocarbon group through the intermediary typically of the substituent to thereby form a ring such as an aromatic ring or nonaromatic ring.

The silane compounds (D) have only to have at least one "—$OR^{25}$" group which exhibits hydrolyzability and is bound to one silicon atom. One, two, three, or four "—$OR^{25}$" groups can be bound to one silicon atom. Plural "—$OR^{25}$" groups, if bound to one silicon atom, may be the same as or partially or fully different from each other.

When one, two, or three "—$OR^{25}$" groups are bound to one silicon atom, three, two, or one group such as a hydrogen atom or a hydrocarbon group may be bound to the silicon atom. Specifically, the silane compounds (D) can be silane compounds having a silicon-containing hydrolyzable group represented by following Formula (11a), (11b), or (11c):

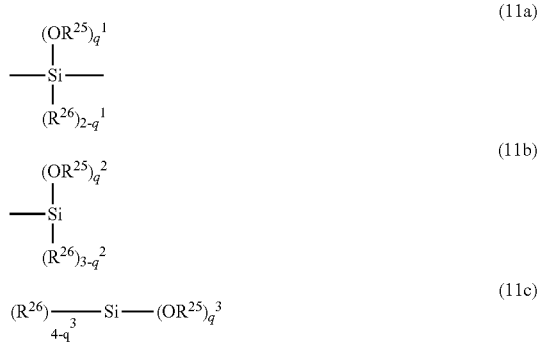

wherein $R^{26}$ represents a hydrogen atom or a hydrocarbon group; $R^{25}$ is as defined above; $q^1$ is 1 or 2; $q^2$ is 1, 2, or 3; and $q^3$ is 1, 2, 3, or 4, wherein each of $R^{25}$ and $R^{26}$ may be combined with $R^{25}$ or $R^{26}$ bound to the same or a different silicon atom.

The hydrocarbon groups as $R^{26}$s in Formulae (11a), (11b), and (11c) can be as with the hydrocarbon groups as $R^{24}$, such as aliphatic hydrocarbon groups, alicyclic hydrocarbon groups, and aromatic hydrocarbon groups. Hydrocarbon groups such as aliphatic hydrocarbon groups are preferred as $R^{26}$, of which alkyl groups are more preferred.

The hydrocarbon groups as $R^{26}$s may each have one or more substituents. Of course, $R^{25}$s may have one or more substituents, as mentioned above. Each of the hydrocarbon groups as $R^{25}$s and $R^{26}$s may be combined with another hydrocarbon group (for example, a hydrocarbon group as $R^{25}$ or $R^{26}$ bound to another silicon atom) through the intermediary typically of the substituent, to thereby form a ring such as an aromatic ring or nonaromatic ring.

The group $R^{25}$ may be combined with $R^{25}$ or $R^{26}$ bound to the same or a different silicon atom. Likewise, the group $R^{26}$ may be combined with R or $R^2$ bound to the same or a different silicon atom. When $R^{25}$ or $R^{26}$ is combined with $R^{25}$ or $R^{26}$ bound to another silicon atom, the other silicon atom can be a silicon atom in the same molecule or a silicon atom in a different molecule. $R^{25}$ or $R^{26}$, if combined with $R^{25}$ or $R^{26}$ bound to a silicon atom in the same molecule, forms a ring. $R^{25}$ or $R^{26}$, if combined with $R^{25}$ or $R^{26}$ bound to a silicon atom in a different molecule, forms a crosslinked structure (bridged structure).

The number $q^1$ is 1 or 2 and is preferably 2. When $q^1$ is 2, it means that no $R^{26}$ but two "—$OR^{25}$" groups are bound to the silicon atom in Formula (11a).

The number $q^2$ is 1, 2, or 3 and is preferably 2 or 3. When $q^2$ is 3, it means that no $R^{26}$ but three "—$OR^{25}$" groups are bound to the silicon atom in Formula (11b).

The number $q^3$ is 1, 2, 3, or 4 and is preferably 2, 3, or 4. When $q^3$ is 4, it means that no $R^{26}$ but four "—$OR^{25}$" groups are bound to the silicon atom in Formula (11c).

Such a silane compound (D) having the silicon-containing hydrolyzable group represented by Formula (11a) as a silicon-containing hydrolyzable group may have the silicon-containing hydrolyzable group represented by Formula (11a) as a repeating unit or part of a repeating unit, or as a single bivalent group not being a repeating unit or part of a repeating unit.

Some silane compounds (D) are simultaneously included in silane compounds (D) represented by Formula (11a), silane compounds (D) represented by Formula (11b), and silane compounds (D) represented by Formula (11c). In this case, the silane compounds (D) in question can be classified as appropriate as silane compounds (D) represented by any one of Formula (11a), Formula (11b), and Formula (11c).

As is described above, the silane compounds (D) have only to have at least one silicon-containing hydrolyzable group represented by Formula (11) per molecule. Preferred examples of the silane compounds (D) are a silane compound (D) represented by following Formula (12a):

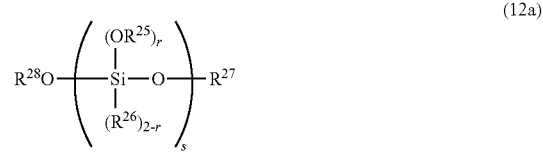

wherein $R^{27}$ and $R^{28}$ are the same as or different from each other and each represent a hydrogen atom or a hydrocarbon group; "r" is 1 or 2; "s" is an integer of 1 or more; and $R^{25}$ and $R^{26}$ are as defined above, and a silane compound (D) represented by following Formula (12b):

wherein $R^2$ represents $OR^{25}$ or $R^{26}$; $R^{30}$ represents an organic group; "t" is an integer of 1 or more; and $R^{25}$, $R^{26}$ "r" are as defined above.

The hydrocarbon groups as $R^{27}$ and $R^{28}$ in Formula (12a) can be as with the hydrocarbon group as $R^{25}$ and are preferably aliphatic hydrocarbon groups. More preferably, $R^{27}$ and $R^{28}$ are the same as or different from each other and are each an alkyl group. The groups $R^{27}$ and $R^{28}$ can be the same hydrocarbon group as or different hydrocarbon groups from $R^{25}$.

The number "r" is 1 or 2 and is preferably 2. When "r" is 2, it means that no $R^{26}$ but two "—$OR^{25}$" groups are bound to the silicon atom in Formula (12a).

The number "s" is an integer of 1 or more. The silane compounds (D) represented by Formula (12a) are monomers when "s" is 1, and they are multimers including oligomers and polymers when "s" is an integer of 2 or more.

Examples of the silane compounds (D) represented by Formula (12a) in the form of monomers are tetraalkoxysilanes such as tetramethoxysilane, tetraethoxysilane, tetrapropoxysilane, tetraisopropoxysilane, and tetrabutoxysilane; alkoxytrialkoxysilanes such as methoxytriethoxysilane; and dialkoxydialkoxysilanes such as dimethoxydiethoxysilane. Examples of the silane compounds (D) in the form of multimers include poly(tetraalkoxysilane)s such as poly(tetramethoxysilane), poly(tetraethoxysilane), poly(tetrapropoxysilane), poly(tetraisopropoxysilane), and poly(tetrabutoxysilane); poly(alkoxyalkoxysilane)s such as poly(methoxyethoxysilane); poly(alkoxysilane)s such as poly(methoxysilane), poly(ethoxysilane), poly(propoxysilane), poly(isopropoxysilane), and poly(butoxysilane); and poly(alkoxyalkylsilane)s such as poly(methoxymethylsilane), poly(methoxyethylsilane), and poly(ethoxymethylsilane).

In Formula (12b), $R^{29}$ is $OR^{25}$ or $R^{26}$, and plural $OR^{25}$s or $R^{26}$s bound to the same silicon atom may be the same as or different from each other.

The organic group as $R^{30}$ includes, for example, hydrocarbon groups, and hetero atom-containing groups corresponding to the hydrocarbon groups, except with another atom than carbon atom in the principal chain. Examples of the other atom are oxygen atom, nitrogen atom, and sulfur atom. The hydrocarbon groups and hetero atom-containing groups relating to $R^{30}$ can be monovalent or multivalent.

The organic group as $R^{30}$ is preferably a monovalent hydrocarbon group. Examples of the hydrocarbon group are aliphatic hydrocarbon groups such as alkyl groups and alkenyl groups; alicyclic hydrocarbon groups such as cycloalkyl groups; and aromatic hydrocarbon groups such as aryl groups, of which aliphatic hydrocarbon groups are preferred. Specific examples of the aliphatic hydrocarbon groups relating to $R^{30}$ include alkyl groups having about one to about twenty carbon atoms, such as methyl group, ethyl group, propyl group, isopropyl group, butyl group, isobutyl group, t-butyl group, s-butyl group, n-pentyl group, hexyl group, heptyl group, octyl group, 2-ethylhexyl group, nonyl group, decyl group, undecyl group, dodecyl group, tridecyl group, tetradecyl group, pentadecyl group, hexadecyl group, heptadecyl group, and octadecyl group, of which those having about one to about ten carbon atoms are preferred, those having about one to about six carbon atoms are more preferred, and those having about one to about four carbon atoms are especially preferred; and alkenyl groups, alkadienyl groups, and alkynyl groups corresponding to the alkyl groups. The alkenyl groups include, for example, vinyl group; 1-alkylvinyl groups such as isopropenyl group and 1-ethylvinyl group; and other alkenyl groups having about two to about twenty carbon atoms, such as allyl group, 2-butenyl group, and 3-butenyl group.

Examples of the alicyclic hydrocarbon groups relating to $R^{30}$ include cycloalkyl groups having about five to about ten carbon atoms constituting the ring, such as cyclohexyl group; and groups having a polycyclic hydrocarbon ring including a bridged ring such as a hydrocarbon ring in norbornane. The aromatic hydrocarbon groups relating to $R^{30}$ include, for example, aryl groups such as phenyl group and naphthyl group. The aromatic rings in the aromatic hydrocarbon groups can be benzene ring, and fused carbon rings including fused carbon rings each comprising two to ten 4- to 7-membered carbon rings being fused, such as naphthalene ring.

Each of these hydrocarbon groups and hetero atom-containing groups relating to $R^{30}$ may have one or more substituents. The substituents include, for example, other hydrocarbon groups, mercapto group, substituted oxycarbonyl groups, carboxyl group, hydroxyl group, alkoxy groups, epoxy group, epoxy-oxy group (glycidoxy group), epoxy-alkoxy groups, epoxy-aryloxy groups, epoxy-cycloalkyloxy groups, isocyanate group, amino groups, cyano group, carbonyl group, oxo group, acyl group, acyloxy groups, substituted oxy groups, and heterocycle-containing groups. Examples of the other hydrocarbon groups include aliphatic hydrocarbon groups including vinyl group, 1-alkylvinyl groups such as isopropenyl group and 1-ethylvinyl group, and alkyl groups; alicyclic hydrocarbon groups; and aromatic hydrocarbon groups. When the group as $R^{30}$ has two or more substituents, the two or more substituents may be the same as or different from each other. When the group as $R^{30}$ has plural different substituents in combination, the plural different substituents may be bound to the same atom (e.g., carbon atom) or to different atoms. One of these plural different substituents may be bound to another substituent optionally through the intermediary of another group.

The group $R^{30}$ can therefore be an ethylenically unsaturated-reactive group, such as vinyl group or mercapto group, or an ethylenically unsaturated-reactive group-organic group, such as a vinyl group-organic group or a mercapto-organic group. Namely, the group $R^{30}$ can also be a group comprising an ethylenically unsaturated-reactive group, such as vinyl group or mercapto group, being bound to a silicon atom in a silicon-containing hydrolyzable group with or without the intermediary of a bivalent organic group. Specific examples of $R^{30}$ include vinyl group, mercapto group, as well as vinyl-alkyl groups, vinyl-(alkyl)-aryl groups, vinyl-(alkyl)-cycloalkyl groups, (meth)acryloyl groups, (meth)acryloyloxy-alkyl groups (vinyl-carbonyloxyalkyl groups), (meth)acryloyloxyaryl groups, mercapto-alkyl groups, mercapto-(alkyl)-aryl groups, and mercapto-(alkyl)-cycloalkyl groups.

The number "t" is not specifically limited, as long as it is an integer of 1 or more, but is preferably an integer of 1 to 4, more preferably 1 or 2, and especialy preferably 1. When "t" is an integer of 2 or more, it means that two or more silicon-containing hydrolyzable groups are bound to the organic group as $R^{30}$. When $R^{30}$ is a multivalent organic group, "t" is generally an integer of 2 or more. For example, when $R^{30}$ is a multivalent organic group and "t" is 2, the silane compound (D) represented by Formula (12b) can be a silane compound comprising a multivalent organic group as $R^{30}$ and silicon-containing hydrolyzable groups bound to the both ends of the multivalent organic group $R^{30}$.

Examples of the silane compounds (D) represented by Formula (12b) wherein $R^{30}$ is an alkyl group include alkyltrialkoxysilanes such as methyltrimethoxysilane, ethyltrimethoxysilane, methyltriethoxysilane, methyltriethoxysilane, methyltripropoxysilane, ethyltripropoxysilane, propyltripropoxysilane, isopropyltripropoxysilane, butyltripropoxysilane, methyltriisopropoxysilane, ethyltriisopropoxysilane, propyltriisopropoxysilane, methyltributoxysilane, ethyltributoxysilane, and propyltributoxysilane; dialkyldialkoxysilanes such as dimethyldimethoxysilane, dimethyldiethoxysilane, dimethyldipropoxysilane, dimethyldiisopropoxysilane, dimethyldibutoxysilane, diethyldimethoxysilane, diethyldiethoxysilane, diethyldipropoxysilane, diethyldiisopropoxysilane, diethyldibutoxysilane, dipropyldimethoxysilane, dipropyldiethoxysilane, and dipropyldipropoxysilane; and corresponding trialkylalkoxysilanes.

The silane compounds represented by Formula (12b) include the vinyl group-containing silane coupling agents and mercapto group-containing silane coupling agents exemplified as the compounds (C), when $R^{30}$ is an ethylenically unsaturated-reactive group, such as vinyl group or mercapto group, or an ethylenically unsaturated-reactive group-organic group, such as a vinyl-organic group or a mercapto-organic group. Namely, the silane compounds represented by Formula (12b) include the compounds (C). Specifically, the silane compounds represented by Formula (12b) wherein $R^{30}$ is, for example, vinyl group include vinyltrialkoxysilanes such as vinyltrimethoxysilane, vinyltriethoxysilane, vinyltripropoxysilane, vinyltriisopropoxysilane, and vinyltributoxysilane; and corresponding vinylalkyldialkoxysilanes. The compounds wherein $R^{30}$ is a vinyl-alkyl group include vinylalkyltrialkoxysilanes such as vinylmethyltrimethoxysilane, vinylmethyltriethoxysilane, β-vinylethyltrimethoxysilane, β-vinylethyltriethoxysilane, β-vinylethyltripropoxysilane, β-vinylethyltriisopropoxysilane, β-vinylethyltributoxysilane, γ-vinylpropyltrimethoxysilane, γ-vinylpropyltriethoxysilane, γ-vinylpropyltripropoxysilane, γ-vinylpropyltriisopropoxysilane, and γ-vinylpropyltributoxysilane; and corresponding vinylalkylalkyldialkoxysilanes. The compounds wherein $R^{30}$ is a mercapto-alkyl group include mercaptoalkyltrialkoxysilanes such as mercaptomethyltrimethoxysilane, mercaptomethyltriethoxysilane, β-mercaptoethyltrimethoxysilane, β-mercaptoethyltriethoxysilane, β-mercaptoethyltripropoxysilane, β-mercaptoethyltriisopropoxysilane, β-mercaptoethyltributoxysilane, γ-mercaptopropyltrimethoxysilane, γ-mercaptopropyltriethoxysilane, γ-mercaptopropyltripropoxysilane, γ-mercaptopropyltriisopropoxysilane, and γ-mercaptopropyltributoxysilane; and corresponding mercaptoalkylalkyldialkoxysilanes.

The compounds wherein $R^{30}$ is an alkyl group having a substituent and wherein the substituent is a glycidoxy group include, for example, glycidoxyalkyltrialkoxysilanes such as β-glycidoxyethyltrimethoxysilane, β-glycidoxyethyltriethoxysilane, γ-glycidoxypropyltrimethoxysilane, γ-glycidoxypropyltriethoxysilane, γ-glycidoxypropyltripropoxysilane, γ-glycidoxypropyltriisopropoxysilane, and γ-glycidoxypropyltributoxysilane; glycidoxyalkylalkyldialkoxysilanes such as γ-glycidoxypropylmethyldimethoxysilane, γ-glycidoxypropylmethyldiethoxysilane, γ-glycidoxypropylethyldimethoxysilane, and γ-glycidoxypropylethyldiethoxysilane; and corresponding glycidoxyalkyldialkylalkoxysilans. Those wherein the substituent is an isocyanate group include, for example, isocyanatoalkyltrialkoxysilanes such as γ-isocyanatopropyltrimethoxysilane, γ-isocyanatopropyltriethoxysilane, γ-isocyanatopropyltripropoxysilane, γ-isocyanatopropyltriisopropoxysilane, and γ-isocyanatopropyltributoxysilane; and corresponding isocyanatoalkylalkyldialkoxysilanes and isocyanatoalkyldialkylalkoxysilanes. Those wherein the substituent is an amino group include, for example, aminoalkyltrialkoxysilanes such as aminomethyltrimethoxysilane, aminomethyltriethoxysilane, β-aminoethyltrimethoxysilane, β-aminoethyltriethoxysilane, γ-aminopropyltrimethoxysilane, γ-aminopropyltriethoxysilane, γ-aminopropyltripropoxysilane, γ-aminopropyltriisopropoxysilane, and γ-aminopropyltributoxysilane; (aminoalkyl)alkyldialkoxysilanes such as β-aminoethylmethyldimethoxysilane, β-aminoethylmethyldiethoxysilane, γ-aminopropylmethyldimethoxysilane, γ-aminopropylmethyldiethoxysilane, and γ-aminopropylmethyldipropoxysilane; and corresponding aminoalkyldialkylalkoxysilanes. Examples of silane compounds (D) having another substituent include those corresponding to the above-exemplified silane compounds (D). Examples of the other substituent are substituted oxycarbonyl groups, carboxyl group, hydroxyl group, alkoxy groups, epoxy group, epoxyalkoxy groups, epoxy-aryloxy groups, epoxy-cycloalkyloxy groups, isocyanate group, cyano group, other hydrocarbon groups, carbonyl group, oxo group, acyl groups, acyloxy groups, substituted oxy groups, and heterocycle-containing groups.

The silane compounds (D) represented by Formulae (12a) and (12b) also include hydroxyl group-containing silane compounds corresponding to the above-exemplified alkoxy group-containing silane compounds, except with hydroxyl group replacing alkoxy group.

Some silane compounds (D) are included both in silane compounds (D) represented by Formula (12a) and in silane compounds (D) represented by Formula (12b). In this case, they can be classified as silane compounds (D) represented by one of Formula (12a) and Formula (12b) as appropriate.

The vinyl group-containing silane coupling agents and mercapto group-containing silane coupling agents as the silane compounds represented by Formula (12b) can also be used as the compounds (C). Specifically, the vinyl group-containing silane coupling agents and mercapto group-containing silane coupling agents can be used as one or both of the silane compound (D) component and the compound (C) component in the present invention. The silane coupling agents and mercapto group-containing silane coupling agents, if used as the silane compound (D), or as the silane compound (D) and the compound (C) essentially have such a configuration in which plural (two or three) hydrolyzable groups (e.g., alkoxy groups) are bound to one silicon atom, as in vinyl-(alkyl)-trialkoxysilanes, vinyl-(alkyl)-alkyldialkoxysilanes, mercaptoalkyl-trialkoxysilanes, and mercaptoalkyl-alkyldialkoxysilanes.

The silane compound (D) for use in the present invention may comprise one or more silane compounds having a functional group reactive with an ethylenically unsaturated bond-containing group (ethylenically unsaturated-reactive group) in combination with one or more silane compounds having no ethylenically unsaturated-reactive group. The ratio of silane compound(s) having an ethylenically unsaturated-reactive group to silane compound(s) having no ethylenically unsaturated-reactive group, if used in combination as the silane compound (D), can be, for example, 1/99 to 99/1 (parts by weight). The silane compound having an ethylenically unsaturated-reactive group is a compound that can also be used as the compound (C), as described above.

[Methods for Producing Vinyl-Urethane Copolymers]

The vinyl-urethane copolymers according to the present invention (i.e., vinyl-urethane copolymers comprising at least one vinyl polymer chain and at least one urethane polymer chain, the vinyl polymer chain being combined with the urethane polymer chain through the intermediary of a linkage segment having a silicon-oxygen bond) can be produced by any method that can produce a vinyl-urethane copolymer comprising at least one vinyl polymer chain and at least one urethane polymer chain, the vinyl polymer chain being combined with the urethane polymer chain through the intermediary of a linkage segment having a silicon-oxygen bond. Such production methods include, for example, a production method comprising following Steps (X) and (Y):

Step (X) of carrying out preparation of an aqueous dispersion or aqueous solution of a urethane polymer (A); and Step (Y) of carrying out polymerization of an ethylenically unsaturated monomer (B) in the aqueous dispersion or aqueous solution of the urethane polymer (A) and carrying out preparation of a vinyl-urethane copolymer using a compound (C) in at least one period selected from the group consisting of before the polymerization reaction, during the polymerization reaction, and after the polymerization reaction.

Step (Y) in the present invention can be a step comprising one or more of following Steps (Y1-a), (Y1-b), (Y1-c), and (Y1-d):

Step (Y1-a) of carrying out a reaction using the compound (C) simultaneously with the polymerization of the ethylenically unsaturated monomer (B) in the aqueous dispersion or aqueous solution of the urethane polymer (A) to thereby yield a vinyl-urethane copolymer comprising a low-molecular-weight or high-molecular-weight Si—O bond-containing linkage segment as the Si—O bond-containing linkage segment;

Step (Y1-b) of carrying out the polymerization of the ethylenically unsaturated monomer (B) and subsequently carrying out a reaction using the compound (C) in the aqueous dispersion or aqueous solution of the urethane polymer (A), to thereby yield a vinyl-urethane copolymer comprising a low-molecular-weight or high-molecular-weight Si—O bond-containing linkage segment as the Si—O bond-containing linkage segment;

Step (Y1-c) of carrying out a reaction using a hydrolysis-reactive group in the compound (C), and subsequently carrying out the polymerization of the ethylenically unsaturated monomer (B) simultaneously with a reaction using an unsaturated bond-reactive group in the compound (C) in the aqueous dispersion or aqueous solution of the urethane polymer (A), to thereby yield a vinyl-urethane copolymer comprising a low-molecular-weight or high-molecular-weight Si—O bond-containing linkage segment as the Si—O bond-containing linkage segment; and Step (Y1-d) of carrying out a reaction using a hydrolysis-reactive group of the compound (C), and subsequently carrying out the polymerization of the ethylenically unsaturated monomer (B) and a reaction using an unsaturated bond-reactive group of the compound (C), and simultaneously with these reactions, carrying out a reaction using another additional portion of the compound (C) in the aqueous dispersion or aqueous solution of the urethane polymer (A), to thereby yield a vinyl-urethane copolymer comprising a low-molecular-weight or high-molecular-weight Si—O bond-containing linkage segment as the Si—O bond-containing linkage segment.

When the target vinyl-urethane copolymer is a vinyl-urethane terpolymer, Step (Y) can be a "step of carrying out the polymerization of the ethylenically unsaturated monomer (B), and carrying out a reaction using the compound (C) and the silane compound (D) simultaneously or separately in at least one period selected from before the polymerization reaction, during the polymerization reaction, and after the polymerization reaction in the aqueous dispersion or aqueous solution of the urethane polymer (A), to thereby yield a vinyl-urethane copolymer comprising a vinyl polymer chain, a silicone polymer chain, and a urethane polymer chain, wherein the vinyl polymer chain is combined with the urethane polymer chain through the intermediary of the silicone polymer chain (high-molecular-weight Si—O bond-containing linkage segment) as the Si—O bond-containing linkage segment". Specifically, Step (Y) can be a step comprising one or more of following Steps (Y2-a), (Y2-b), and (Y2-c):

Step (Y2-a) of carrying out hydrolysis or condensation of the silane compound (D), subsequently carrying out the polymerization of the ethylenically unsaturated monomer (B), and carrying out a reaction using the compound (C) in at least one period selected from before the hydrolysis or condensation reaction, during the hydrolysis or condensation reaction, after the hydrolysis or condensation reaction or before the polymerization reaction, during the polymerization reaction, and after the polymerization reaction, in the aqueous dispersion or aqueous solution of the-urethane polymer (A), to thereby yield a vinyl-urethane copolymer comprising a silicone polymer chain as the Si—O bond-containing linkage segment;

Step (Y2-b) of carrying out the hydrolysis or condensation of the silane compound (D) simultaneously with the polymerization of the ethylenically unsaturated monomer (B), and carrying out a reaction using the compound (C) in at least one period selected from before the hydrolysis or condensation reaction and the polymerization reaction, during the hydrolysis or condensation reaction and the polymerization reaction, and after the hydrolysis or condensation reaction and the polymerization reaction, in the aqueous dispersion or aqueous solution of the urethane polymer (A), to thereby yield a vinyl-urethane copolymer comprising a silicone polymer chain as the Si—O bond-containing linkage segment; and Step (Y2-c) of carrying out the polymerization of the ethylenically unsaturated monomer (B), subsequently carrying out the hydrolysis or condensation of the silane compound (D), and carrying out a reaction using the compound (C) in at least one period selected from before the polymerization reaction, during the polymerization reaction, after the polymerization reaction and before the hydrolysis or condensation reaction, during the hydrolysis or condensation reaction, and after the hydrolysis or condensation reaction, in the aqueous dispersion or aqueous solution of the urethane polymer (A), to thereby yield a vinyl-urethane copolymer comprising a silicone polymer chain as the Si—O bond-containing linkage segment.

Specifically, the methods for producing a vinyl-urethane copolymer according to the present invention include methods for producing a vinyl-urethane bipolymer, comprising Step (X) and Step (Y) (for example, Step (Y1-a), Step (Y1-b), Step (Y1-c), and/or Step (Y1-d)]. For producing a vinyl-urethane bipolymer, it is essential to carry out a reaction, such as hydrolysis or condensation, of the compound (C) within such a range that a low-molecular-weight Si—O bond-containing linkage segment is formed in Step (Y), especially in Step (Y1-a), Step (Y1-b), Step (Y1-c), and/or Step (Y1-d). The hydrolysis or condensation of the silane compound (D) is not substantially carried out, but it can be carried out within such a range that a low-molecular-weight Si—O bond-containing linkage segment is formed.

Specifically, as a result of polymerization of the ethylenically unsaturated monomer (B), a polymerization reaction of the ethylenically unsaturated monomer (B) occurs and a reaction of the compound (C) occurs in Step (Y1-a). More specifically, the polymerization reaction of the ethylenically unsaturated monomer (B) yields a polymer or polymerization product (vinyl polymer) derived from the ethylenically unsaturated monomer (B). In addition, there occur a reaction, such as an addition reaction or polymerization reaction, between an unsaturated bond-reactive group derived from the compound (C) and an ethylenically unsaturated bond derived from the ethylenically unsaturated monomer (B); a reaction (e.g., hydrolysis reaction or condensation reaction) between a hydrolysis-reactive group derived from the compound (C) and a silicon-containing hydrolyzable group of the urethane polymer (A); and optionally a reaction (hydrolysis reaction or condensation reaction) between molecules of the compound (C), to thereby yield a vinyl-urethane copolymer (vinyl-urethane bipolymer) comprising a vinyl polymer chain combined with a urethane polymer chain through the intermediary of a low-molecular-weight Si—O bond-containing linkage segment, such as a bond of a silicon atom-oxygen atom-silicon atom, or a low-molecular-weight linkage segment containing the bond.

In Step (Y1-b), a polymerization reaction of the ethylenically unsaturated monomer (B) occurs as the polymerization of the ethylenically unsaturated monomer (B), and the polymerization of the ethylenically unsaturated monomer (B) yields a polymer or polymerization product derived from the ethylenically unsaturated monomer (B) (vinyl polymer), to thereby yield a mixture comprising the urethane polymer (A) and the vinyl polymer. A reaction of the compound (C) is further carried out in the mixture, and this invites a reaction between an unsaturated bond-reactive group derived from the compound (C) and an ethylenically unsaturated bond derived from the ethylenically unsaturated monomer (B); a reaction between a hydrolysis-reactive group derived from the compound (C) and a silicon-containing hydrolyzable group of the urethane polymer (A); and optionally a reaction between molecules of the compound (C). This in tern yields a vinyl-urethane copolymer (vinyl-urethane bipolymer) comprising a vinyl polymer chain and a urethane polymer chain combined with each other through the intermediary of a low-molecular-weight Si—O bond-containing linkage segment.

In Step (Y1-c), a reaction of the compound (C) is initially carried out without carrying out a reaction of the ethylenically unsaturated monomer (B). This yields a reaction between a hydrolysis-reactive group derived from the compound (C) and a silicon-containing hydrolyzable group of the urethane polymer (A), and optionally a reaction between molecules of the compound (C), to thereby yield a urethane polymer having a silicone segment comprising a silicon-containing hydrolyzable group. After yielding the urethane polymer having a silicone segment comprising a silicon-containing hydrolyzable group, polymerization of the ethylenically unsaturated monomer (B) and a reaction using an unsaturated bond-reactive group of the compound (C) are carried out. More specifically, the polymerization of the ethylenically unsaturated monomer (B) yields a polymer or polymerization product derived from the ethylenically unsaturated monomer (B) (vinyl polymer), and the reaction using an unsaturated bond-reactive group of the compound (C) invites a reaction of an unsaturated bond-reactive group derived from the compound (C) in the urethane polymer having a silicone segment with an ethylenically unsaturated bond derived from the ethylenically unsaturated monomer (B). This yields a vinyl-urethane copolymer (vinyl-urethane bipolymer) comprising a vinyl polymer chain and a urethane polymer chain combined with each other through the intermediary of a low-molecular-weight Si—O bond-containing linkage segment.

In Step (Y1-d), a reaction of the compound (C) is initially carried out without carrying out a reaction of the ethylenically unsaturated monomer (B), as in Step (Y1-c). This causes a reaction between a hydrolysis-reactive group derived from the compound (C) and a silicon-containing hydrolyzable group of the urethane polymer (A), and, optionally, a reaction between molecules of the compound (C), to thereby yield a urethane polymer having a silicone segment comprising a silicon-containing hydrolyzable group. After yielding the urethane polymer having a silicone segment comprising a silicon-containing hydrolyzable group, the polymerization of the ethylenically unsaturated monomer (B) and a reaction using an unsaturated bond-reactive group of the compound (C) are carried out, and, in addition, a reaction of another portion of the compound (C) is carried out, which another portion of the compound (C) is further added to the reaction system. More specifically, the polymerization of the ethylenically unsaturated monomer (B) yields a polymer or polymerization product derived from the ethylenically unsaturated monomer (B) (vinyl polymer), and the reaction using an unsaturated bond-reactive group of the compound (C) invites a reaction of an unsaturated bond-reactive group derived from the compound (C) in the urethane polymer having a silicone segment with an ethylenically unsaturated bond derived from the ethylenically unsaturated monomer (B). The reaction of another additional portion of the compound (C) causes a reaction of the unsaturated bond-reactive group derived from the compound (C) with the ethylenically unsaturated bond derived from the ethylenically unsaturated monomer (B) or an unsaturated bond-reactive group derived from an initially added portion of the compound (C); a reaction of the hydrolysis-reactive group derived from the compound (C) with a silicon-containing hydrolyzable group derived from the urethane polymer (A) or a hydrolysis-reactive group derived from an initially added portion of the compound (C); and, optionally, a reaction between molecules of the compound (C). This yields a vinyl-urethane copolymer (vinyl-urethane bipolymer) comprising a vinyl polymer chain and a urethane polymer chain combined with each other through the intermediary of a low-molecular-weight Si—O bond-containing linkage segment.

Under some conditions, not a vinyl-urethane bipolymer but a vinyl-urethane terpolymer is yielded in Step (Y1-a), Step (Y1-b), Step (Y1-c), and Step (Y1-d). The conditions include, for example, the type and amount of the compound (C), and reaction conditions. It is therefore essential to appropriately adjust the type and amount of the compound (C) and reaction conditions according to the type of a target vinyl-urethane copolymer (vinyl-urethane bipolymer or vinyl-urethane terpolymer) in Step (Y1-a), Step (Y1-b), Step (Y1-c), and Step (Y1-d). Specifically, a vinyl-urethane terpolymer can be prepared by using, as the compound (C), a compound (C) having a silicon-containing hydrolyzable group as the hydrolysis-reactive group, and controlling the amount of the compound (C) to such an amount that a high-molecular-weight Si—O bond-containing linkage segment is formed in Steps (Y1-a), (Y1-b), (Y1-c), and (Y1-d). In this case, the compound (C) having a silicon-containing hydrolyzable group as the hydrolysis-reactive group can also serve as a silane compound (D), and the hydrolysis or condensation of the compound (C) is carried out so as to form a high-molecular-weight Si—O bond-containing linkage segment.

Accordingly, a compound having a silicon-containing hydrolyzable group as the hydrolysis-reactive group and containing an unsaturated bond-reactive group can be classified as a compound (C) and/or a silane compound (D) as appropriate according to the purpose. For example, the compound can be classified as a compound (C) when it is mainly used for, for example, combining a vinyl polymer with a urethane polymer (A), a urethane polymer (A) having a silicone segment, or a urethane polymer (A) having a silicone polymer chain. In contrast, part of a compound (C) can be classified as a compound (D) when the compound is mainly used for forming a silicone polymer chain as a high-molecular-weight Si—O bond-containing linkage segment. Specifically, such a compound having a silicon-containing hydrolyzable group as the hydrolysis-reactive group and containing an unsaturated bond-reactive group can be classified as a compound (C) alone or as both a compound (C) and a compound (D).

The methods for producing a vinyl-urethane copolymer according to the present invention include, as methods for producing a vinyl-urethane terpolymer, methods comprising Steps (X) and (Y2-a); Step (X) and Step (Y2-b); Steps (X) and (Y2-c), or steps comprising these steps in combination, in addition to the methods comprising Step (X) and Step (Y)

including Step (Y1-a), Step (Y1-b), Step (Y1-c), and/or Step (Y1-d). It is essential to carry out the reaction, such as hydrolysis or condensation, of the compound (C) within such a range that a high-molecular-weight Si—O bond-containing linkage segment is formed in Step (Y1-a), Step (Y1-b), Step (Y1-c), and Step (Y1-d). Accordingly, when a vinyl-urethane terpolymer is produced in Steps (Y1-a), (Y1-b), (Y1-c), and (Y1-d), a compound (C) having a silicon-containing hydrolyzable group as the hydrolysis-reactive group is used as the compound (C), and the compound (C) is also used as a silane compound (D). Namely, for producing a vinyl-urethane terpolymer, the hydrolysis or condensation of the silane compound (D) is carried out in Step (Y) so as to form a high-molecular-weight Si—O bond-containing linkage segment. The hydrolysis or condensation of the silane compound (D) in Steps (Y2-a), (Y2-b), and (Y2-c) includes not only hydrolysis or condensation of a silane compound (D) having no unsaturated bond-reactive group, but also the hydrolysis or condensation of a silane compound (D) having an unsaturated bond-reactive group [i.e., a compound (C) also classified as a silane compound (D)]. Accordingly, some high-molecular-weight Si—O bond-containing linkage segments comprise a constitutional unit derived from the compound (C).

In Step (Y2-a), a urethane polymer comprising a silicone polymer chain having a silicon-containing hydrolyzable group is formed, as a result of the hydrolysis or condensation of the silane compound (D), and resulting reactions (hydrolysis reaction and/or condensation reaction) between silicon-containing hydrolyzable groups derived from the silane compound (D), and between a silicon-containing hydrolyzable group derived from the silane compound (D) and a silicon-containing hydrolyzable group of the urethane polymer (A). The urethane polymer comprising a silicone polymer chain having a silicon-containing hydrolyzable group and the urethane polymer (A) having at least one silicon-containing hydrolyzable group before carrying out the hydrolysis or condensation of the silane compound (D) are in common with each other in that they each have a silicon-containing hydrolyzable group, but differ from each other in whether or not the polymer in question has a high-molecular-weight Si—O bond-containing linkage segment (silicone polymer chain) between a silicon-containing hydrolyzable group and a urethane polymer chain and in that they may have different silicon-containing hydrolyzable groups.

After the urethane polymer comprising a silicone polymer chain having a silicon-containing hydrolyzable group is obtained, the polymerization of the ethylenically unsaturated monomer (B) is carried out, and the polymerization causes a polymerization reaction of the ethylenically unsaturated monomer (B). A reaction using the compound (C) is carried out in at least one period before or after the hydrolysis or condensation, simultaneously with (during) the hydrolysis or condensation, before or after the polymerization, and simultaneously with (during) the polymerization. This results in, for example, a reaction, such as an addition reaction or a polymerization reaction, between an unsaturated bond-reactive group derived from the compound (C) and an ethylenically unsaturated bond derived from the ethylenically unsaturated monomer (B), and a reaction, such as a hydrolysis reaction or a condensation reaction, between a hydrolysis-reactive group derived from the compound (C) and the silicon-containing hydrolyzable group of the urethane polymer comprising a silicone polymer chain having a silicon-containing hydrolyzable group, and optionally a reaction between molecules of the compound (C) and a reaction between the compound (C) and the silane compound (D). A vinyl polymer chain is formed as a result of the polymerization reaction of the ethylenically unsaturated monomer (B). The vinyl polymer chain is combined with the silicone polymer chain as a result of the reaction between an unsaturated bond-reactive group derived from the compound (C) and an ethylenically unsaturated bond derived from the ethylenically unsaturated monomer (B) and the reaction between a hydrolysis-reactive group derived from the compound (C) and the silicon-containing hydrolyzable group of the urethane polymer comprising a silicone polymer chain having a silicon-containing hydrolyzable group. The Si—O bond-containing linkage segment may be extended in chain length as a result of the reaction between molecules of the compound (C) and/or the reaction between the compound (C) and the silane compound (D). Accordingly, Step (Y2-a) yields a vinyl-urethane copolymer (i.e., a vinyl-silicone-urethane copolymer; a vinyl-urethane terpolymer) comprising a vinyl polymer chain and a urethane polymer chain combined with each other through the intermediary of a high-molecular-weight Si—O bond-containing linkage segment (i.e., a silicone polymer chain).

In Step (Y2-b), the hydrolysis or condensation of the silane compound (D) and the polymerization of the ethylenically unsaturated monomer (B) are carried out simultaneously, and a reaction using the compound (C) is carried out simultaneously with (during), or before or after these reactions. This results in reactions (hydrolysis reaction or condensation reaction) between silicon-containing hydrolyzable groups derived from the silane compound (D), those between a silicon-containing hydrolyzable group derived from the silane compound (D) and a silicon-containing hydrolyzable group of the urethane polymer (A), and a polymerization reaction of the ethylenically unsaturated monomer (B). In addition, there occur a reaction, such as an addition reaction or a polymerization reaction, between an unsaturated bond-reactive group derived from the compound (C) and an ethylenically unsaturated bond derived from the ethylenically unsaturated monomer (B), and a reaction, such as a hydrolysis reaction or a condensation reaction, between a silicon-containing hydrolyzable group derived from the silane compound (D) and a hydrolysis-reactive group derived from the compound (C); and, optionally, a reaction between molecules of the compound (C) and/or a reaction between the compound (C) and the silane compound (D). The reaction between silicon-containing hydrolyzable groups derived from the silane compound (D) yields a silicone polymer chain, and the polymerization reaction of the ethylenically unsaturated monomer (B) yields a vinyl polymer chain. The silicone polymer chain and the urethane polymer chain are combined with each other as a result of the reaction between a silicon-containing hydrolyzable group derived from the silane compound (D) and a silicon-containing hydrolyzable group of the urethane polymer (A). In addition, the vinyl polymer chain and the silicone polymer chain are combined with each other as a result of the reaction between an unsaturated bond-reactive group derived from the compound (C) and an ethylenically unsaturated bond derived from the ethylenically unsaturated monomer (B) and the reaction between a silicon-containing hydrolyzable group derived from the silane compound (D) and a hydrolysis-reactive group derived from the compound (C). The Si—O bond-containing linkage segment may be extended in chain length as a result of the reaction between molecules of the compound (C) and/or the reaction between the compound (C) and the silane compound (D). Accordingly, Step (Y2-b) yields a vinyl-urethane copolymer (i.e., a vinyl-silicone-urethane copolymer; a vinyl-urethane terpolymer) comprising a vinyl polymer chain and a urethane polymer chain combined with each other through the intermediary of a high-molecular-weight Si—O bond-containing linkage segment (i.e., a silicone polymer chain).

In Step (Y2-c), the polymerization of the ethylenically unsaturated monomer (B) yields a polymer or polymerization product derived from the ethylenically unsaturated monomer (B) (vinyl polymer) to thereby yield a mixture containing the urethane polymer (A) and the vinyl polymer. The hydrolysis or condensation of the silane compound (D) is carried out in the mixture. A reaction using the compound (C) is carried out in at least one period selected from before or after the polymerization, simultaneously with (during) the polymerization, before or after the hydrolysis or condensation, and simultaneously with (during) the hydrolysis or condensation. This leads to a reaction, such as a hydrolysis reaction or a condensation reaction, between silicon-containing hydrolyzable groups derived from the silane compound (D) and a reaction between a silicon-containing hydrolyzable group derived from the silane compound (D) and a silicon-containing hydrolyzable group of the urethane polymer (A). There also occur, for example, a reaction, such as an addition reaction or a polymerization reaction, between an unsaturated bond-reactive group derived from the compound (C) and an ethylenically unsaturated bond derived from the ethylenically unsaturated monomer (B); a reaction, such as a hydrolysis reaction or a condensation reaction, between a silicon-containing hydrolyzable group derived from the silane compound (D) and a hydrolysis-reactive group derived from the compound (C); and, optionally, a reaction between molecules of the compound (C) and a reaction between the compound (C) and the silane compound (D). A silicone polymer chain is formed as a result of the reaction between silicon-containing hydrolyzable groups derived from the silane compound (D). The silicone polymer chain and the urethane polymer chain are combined with each other as a result of the reaction between a silicon-containing hydrolyzable group derived from the silane compound (D) and a silicon-containing hydrolyzable group of the urethane polymer (A). In addition, the vinyl polymer chain and the silicone polymer chain are combined with each other as a result of the reaction between an unsaturated bond-reactive group derived from the compound (C) and an ethylenically unsaturated bond derived from the ethylenically unsaturated monomer (B) and the reaction between a silicon-containing hydrolyzable group derived from the silane compound (D) and a hydrolysis-reactive group derived from the compound (C). The Si—O bond-containing linkage segment may be extended in chain length as a result of the reaction between molecules of the compound (C) and/or the reaction between the compound (C) and the silane compound (D). Accordingly, Step (Y2-c) yields a vinyl-urethane copolymer (i.e., a vinyl-silicone-urethane copolymer; a vinyl-urethane terpolymer) comprising a vinyl polymer chain and a urethane polymer chain combined with each other through the intermediary of a high-molecular-weight Si—O bond-containing linkage segment (i.e., a silicone polymer chain).

The compound (C) is preferably used in a period during or after the hydrolysis or condensation reaction of the silane compound (D) in Steps (Y2-a), (Y2-b), and (Y2-c). In Step (Y2-a), for example, the compound (C) is preferably used in a period during the hydrolysis or condensation reaction of the silane compound (D), after the hydrolysis or condensation reaction of the silane compound (D) and before the polymerization reaction of the ethylenically unsaturated monomer (B), during the polymerization reaction of the ethylenically unsaturated monomer (B), and/or after the polymerization reaction of the ethylenically unsaturated monomer (B). In Step (Y2-b), the compound (C) is preferably used in a period during the hydrolysis or condensation reaction of the silane compound (D) and the polymerization reaction of the ethylenically unsaturated monomer (B), and/or after the hydrolysis or condensation reaction of the silane compound (D) and the polymerization reaction of the ethylenically unsaturated monomer (B). In Step (Y2-c), the compound (C) is preferably used in a period during the hydrolysis or condensation reaction of the silane compound (D) and/or after the hydrolysis or condensation reaction of the silane compound (D).

The unsaturated bond-reactive group derived from the compound (C) includes, according to components in the reaction system, an unsaturated bond-reactive group of the compound (C); an unsaturated bond-reactive group of a polymer as a reaction product between the compound (C) and the urethane polymer (A); an unsaturated bond-reactive group of a compound (including a polymer) as a reaction product between the compound (C) and the ethylenically unsaturated monomer (B); an unsaturated bond-reactive group of a compound (including a polymer) as a reaction product between the compound (C) and the silane compound (D); an unsaturated bond-reactive group of a polymer as a reaction product among the compound (C), the silane compound (D), and the urethane polymer (A); and an unsaturated bond-reactive group of a compound (including a polymer) as a reaction product among the compound (C), the ethylenically unsaturated monomer (B), and the silane compound (D). The hydrolysis-reactive group derived from the compound (C) includes, according to components in the reaction system, a hydrolysis-reactive group of the compound (C); a hydrolysis-reactive group of a polymer as a reaction product between the compound (C) and the urethane polymer (A); a hydrolysis-reactive group of a compound (including a polymer) as a reaction product between the compound (C) and the ethylenically unsaturated monomer (B); a hydrolysis-reactive group of a compound (including a polymer) as a reaction product between the compound (C) and the silane compound (D); a hydrolysis-reactive group of a polymer as a reaction product among the compound (C), the silane compound (D), and the urethane polymer (A); and a hydrolysis-reactive group of a compound (including a polymer) as a reaction product among the compound (C), the ethylenically unsaturated monomer (B), and the silane compound (D). The reaction between molecules of the compound (C) includes a reaction between unsaturated bond-reactive groups of the compound (C); a reaction between hydrolysis-reactive groups of the compound (C); a reaction between an unsaturated bond-reactive group of the compound (C) and an unsaturated bond-reactive group derived from the compound (C); and a reaction between a hydrolysis-reactive group of the compound (C) and a hydrolysis-reactive group derived from the compound (C).

The ethylenically unsaturated bond derived from the ethylenically unsaturated monomer (B) includes, according to components in the reaction system, an ethylenically unsaturated bond of the ethylenically unsaturated monomer (B); an ethylenically unsaturated bond of a compound (including a polymer) as a reaction product between the ethylenically unsaturated monomer (B) and the compound (C); an ethylenically unsaturated bond of a polymer as a reaction product among the ethylenically unsaturated monomer (B), the compound (C), and the urethane polymer (A); and an ethylenically unsaturated bond of a compound (including a polymer) as a reaction product among the ethylenically unsaturated monomer (B), the compound (C), and the silane compound (D).

The silicon-containing hydrolyzable group derived from the urethane polymer (A) includes, according to components in the reaction system, a silicon-containing hydrolyzable group of the urethane polymer (A); a silicon-containing hydrolyzable group of a polymer as a reaction product between the urethane polymer (A) and the compound (C); a silicon-containing hydrolyzable group of a polymer as a reaction product among the urethane polymer (A), the compound (C), and the ethylenically unsaturated monomer (B); and a silicon-containing hydrolyzable group of a polymer as a reaction product among the urethane polymer (A), the silane compound (D), and the compound (C).

The silicon-containing hydrolyzable group derived from the silane compound (D) includes, according to components in the reaction system, a silicon-containing hydrolyzable group of the silane compound (D); a silicon-containing hydrolyzable group of a polymer as a reaction product between the silane compound (D) and the urethane polymer (A); as well as a silicon-containing hydrolyzable group of a compound (including a polymer) as a reaction product between the silane compound (D) and the compound (C); and a silicon-containing hydrolyzable group of a polymer as a reaction product among the silane compound (D), the urethane polymer (A), and the compound (C).

Thus, the present invention can efficiently produce the vinyl-urethane copolymers, by comprising Step (X) and Step (Y) [Steps (Y1-a), (Y1-b), (Y1-c), and (Y1-d), Steps (Y2-a), (Y2-b), and (Y2-c)].

Step (X) is Preferably Following Step (X1):

Step (X1) of carrying out preparation of a urethane polymer (A) using an ethylenically unsaturated monomer (B) as a solvent to yield a reaction mixture, and dispersing or dissolving the reaction mixture in water to thereby yield an aqueous dispersion or aqueous solution of the urethane polymer (A).

Thus, a vinyl-urethane copolymer can be prepared more efficiently by using the ethylenically unsaturated monomer, (B) as a solvent in the preparation of the urethane polymer (A), because this eliminates the need for removing the solvent as in conventional techniques. An organic solvent such as methyl ethyl ketone is conventionally used as a solvent in the preparation of the urethane polymer (A). However, the use of Step (X1) eliminates the need for disposing or treating the organic solvent as a waste, is excellent from an environmental viewpoint, and can reduce the cost.

[Step (X)]

Step (X) is a step for preparing an aqueous dispersion or aqueous solution of the urethane polymer (A) as is described above, and the aqueous dispersion or aqueous solution of the urethane polymer (A) can be prepared, for example, by dispersing or dissolving a urethane polymer (A) in water.

In Step (X), an aqueous dispersion or aqueous solution of a urethane polymer (A) can be prepared by dispersing or dissolving the urethane polymer (A) in water. Among such urethane polymers (A), an alkoxysilylated urethane polymer (A1) containing at least one hydrophilic group is preferably used. The dispersion or dissolution procedure is not specifically limited. A preferred procedure is a procedure of admixing the urethane polymer (A) with water optionally using a basic compound and/or a dispersing agent such as an emulsifier or a surfactant to thereby disperse or dissolve the urethane polymer (A) in water.

When the urethane polymer (A) is prepared using the ethylenically unsaturated monomer (B) as a solvent, the urethane polymer (A) can be dispersed or dissolved in water by placing the reaction mixture obtained as a result of the preparation, and admixing the urethane polymer (A) with water optionally using a basic compound, a dispersing agent such as an emulsifier or a surfactant, and/or an acid.

The water can be, for example, tap water, ion-exchanged water, or pure water. The amount of water can be selected within a range of about 65 to about 900 parts by mass, and preferably about 100 to about 400 parts by mass, to 100 parts by mass of the urethane polymer (A).

A basic compound is preferably used in the dispersion or dissolution of the urethane polymer (A) in water when the urethane polymer (A) comprises an anionic group as a hydrophilic group, namely when the urethane polymer (A) is an anionic group-containing hydrolyzable silylated urethane polymer comprising an anionic group as a hydrophilic group. This is more preferred when the urethane polymer (A) is an anionic group-containing alkoxysilylated urethane polymer comprising an anionic group as a hydrophilic group and containing an alkoxysilyl group as a hydrolyzable silyl group. The basic compound herein can be any of basic inorganic compounds and basic organic compounds. Each of these basic compounds can be used alone or in combination.

More specifically, preferred examples of the basic inorganic compounds include alkali metal compounds including alkali metal hydroxides such as sodium hydroxide and potassium hydroxide; alkali metal carbonates such as sodium carbonate and potassium carbonate; hydrogen carbonates of alkali metals, such as sodium hydrogen carbonate and potassium hydrogen carbonate; alkali metal acetates such as sodium acetate and potassium acetate, alkaline earth metal compounds including alkaline earth metal hydroxides such as magnesium hydroxide; and alkaline earth metal carbonates such as magnesium carbonate, as well as ammonia.

Preferred examples of the basic organic compounds are amine compounds including aliphatic amines, aromatic amines, and basic nitrogen-containing heterocyclic compounds. The aliphatic amines include, for example, trialkylamines such as trimethylamine, triethylamine, tripropylamine, triisopropylamine, tributylamine, triisobutylamine, tri(s-butyl)amine, tri(t-butyl)amine, tripentylamine, and trihexylamine; dialkylamines such as dimethylamine, diethylamine, and dibutylamine; monoalkylamines such as methylamine, ethylamine, and butylamine; tri(alcohol)amines such as trimethanolamine, triethanolamine, tripropanolamine, triisopropanolamine, tributanolamine, tripentanolamine, triisopentanolamine, and trihexanolamine; di(alcohol)amines such as dimethanolamine and diethanolamine; mono(alcohol)amines such as methanolamine and ethanolamine; as well as ethylenediamine and diethylenetriamine. The aromatic amines include, for example, N,N-dimethylaniline. Examples of the basic nitrogen-containing heterocyclic compounds include cyclic amines such as morpholine, piperidine, and pyrrolidine; as well as pyridine, α-picoline, β-picoline, γ-picoline, quinoline, and N-methylmorpholine.

Ammonia and amine compounds are preferred as the basic compound. Of such amine compounds, tertiary amine compounds such as trialkylamine and trialcoholamine are more preferred.

Thus, by using a basic compound in the dispersion or dissolution of an anionic group-containing hydrolyzable silylated urethane polymer comprising an anionic group as a hydrophilic group as the urethane polymer (A) [especialy, an anionic group-containing alkoxysilylated urethane polymer comprising an anionic group as a hydrophilic group and containing an alkoxysilyl group as a hydrolyzable silyl group] in water, the anionic group of the anionic group-containing hydrolyzable silylated urethane polymer comprising an anionic group as a hydrophilic group is partially or fully neutralized with the basic compound to form a salt. This enables the anionic group-containing hydrolyzable silylated urethane polymer to disperse or dissolve in water.

Such a hydrophilic group-containing hydrolyzable silylated urethane polymer as the urethane polymer (A) wherein the hydrophilic group is a cationic group or nonionic group can disperse or dissolve in water by using a mechanism as in the case where the hydrophilic group is an anionic group.

Part or all of silicon-containing hydrolyzable groups of the urethane polymer (A) [especially, of the alkoxysilylated urethane polymer (A1) containing at least one hydrophilic group] in the aqueous dispersion or aqueous solution may be converted into silanol groups and/or siloxane bonds as a result of hydrolysis of the silicon-containing hydrolyzable groups, such as hydrolyzable silyl groups, due to a reaction (hydrolysis reaction) between water and the urethane polymer (A). Specifically, at least one silicon-containing hydrolyzable group (e.g., an alkoxyl group) of silicon-containing hydrolyzable groups (especially, alkoxysilyl groups) of the urethane polymer (A) may be affected by the hydrolysis reaction with water. The "silanol group" means a group comprising a silicon atom having at least one hydroxyl group and may have one or more substituents such as alkoxy groups.

As is described above, the aqueous dispersion or aqueous solution of the urethane polymer (A) may be an aqueous dispersion or aqueous solution prepared by admixing the urethane polymer (A), water, and additional components optionally used, such as a basic compound. Alternatively, it may be a reaction mixture containing a reaction product among the urethane polymer (A), water, and the basic compound as a result of mixing. The reaction product among an anionic group-containing alkoxysilylated urethane polymer as the urethane polymer (A), water, and the basic compound includes water-based silanolized urethane prepolymers in which an anionic group of the anionic group-containing alkoxysilylated urethane polymer is neutralized with the basic compound to form a salt of the anionic group, and part or all of terminal alkoxysilyl groups are hydrolyzed by the action of water into silanol groups and/or siloxane bonds.

The amount of the basic compound, if used, is preferably 50 to 120 percent by mole and preferably 80 to 110 percent by mole to an ionic groups of an anionic group-containing alkoxysilylated urethane polymer, if used as the urethane polymer (A).

The water and additional components such as a basic compound for use in the present invention may be used upon the dispersion or dissolution of the urethane polymer (A) [especially, an alkoxysilylated urethane polymer (A1) containing at least one hydrophilic group] in water or may be used in any period during the preparation of the urethane polymer (A). For example, additional components such as a basic compound, a dispersing agent and/or an acid can be used in any reaction period of the preparation of the urethane polymer (A) or after the reaction. Specifically, when an anionic group-containing alkoxysilylated urethane polymer is prepared as the alkoxysilylated urethane polymer (A1) containing at least one hydrophilic group as the urethane polymer (A), a basic compound may be added upon the reaction between an isocyanate-reactive group-containing alkoxysilane (A1-d) and the reaction product among an isocyanate-reactive compound (A1-a), an isocyanate-reactive compound (A1-b), and a polyisocyanate (A1-c). Thus, the reaction can be carried out in the presence of the basic compound.

[Step (Y)]

In Step (Y), the polymerization of the ethylenically unsaturated monomer (B) is carried out and the preparation of a vinyl-urethane copolymer using the compound (C) is conducted in the aqueous dispersion or aqueous solution of the urethane polymer (A), as is described above. In Step (Y), (1) the ethylenically unsaturated monomer (B) and the compound (C) are basically used to prepare a vinyl-urethane copolymer (vinyl-urethane bipolymer) comprising two different polymer chains, i.e., a vinyl polymer chain and a urethane polymer chain; and (2) the ethylenically unsaturated monomer (B), the compound (C), and the silane compound (D) are basically used to prepare a vinyl-urethane copolymer (vinyl-urethane terpolymer) comprising three different polymer chains, i.e., a vinyl polymer chain, a silicone polymer chain, and a urethane polymer chain, as is described above.

Preparation of Vinyl-Urethane Bipolymers

To prepare a vinyl-urethane bipolymer according to the production methods comprising Steps (X) and (Y), the polymerization of the ethylenically unsaturated monomer (B) is carried out, and the vinyl-urethane bipolymer is prepared by using the compound (C) in the aqueous dispersion or aqueous solution of the urethane polymer (A) so as to combine a vinyl polymer chain with a urethane polymer chain through the intermediary of a low-molecular-weight Si—O bond-containing linkage segment, as is described above. Accordingly, the silane compound (D) is basically not used in Step (Y), and the reaction of the compound (C), such as hydrolysis or condensation, is carried out within such a range that a low-molecular-weight Si—O bond-containing linkage segment is formed, as is described above. Accordingly, Step (Y) can be at least one of Steps (Y1-a), (Y1-b), (Y1-c), and (Y1-d).

Specifically, a vinyl-urethane bipolymer is prepared according to a method using Step (Y1-a) by carrying out a reaction relating to the compound (C) using the compound (C) simultaneously with the polymerization of the ethylenically unsaturated monomer (B) in the aqueous dispersion or aqueous solution of the urethane polymer (A), to thereby yield a vinyl polymer and combine a vinyl polymer chain comprising vinyl polymer segments in the principal chain or skeleton of the vinyl polymer with a urethane polymer chain comprising urethane polymer segments in the principal chain or skeleton of the urethane polymer (A). According to a method using Step (Y1-b), a vinyl-urethane bipolymer is prepared by initially carrying out the polymerization of the ethylenically unsaturated monomer (B) in the aqueous dispersion or aqueous solution of the urethane polymer (A) to thereby yield a vinyl polymer, and thereafter carrying out a reaction relating the compound (C) using the compound (C), to combine a urethane polymer chain comprising urethane polymer segments in the principal chain or skeleton of the urethane polymer (A) with a vinyl polymer chain comprising vinyl polymer segments in the principal chain or skeleton of the vinyl polymer. According to a method using Step (Y1-c), a vinyl-urethane bipolymer is prepared by carrying out a reaction between the compound (C) and the urethane polymer (A) using the compound (C) in the aqueous dispersion or aqueous solution of the urethane polymer (A) to yield a urethane polymer having an ethylenically unsaturated bond; thereafter carrying out the polymerization of the ethylenically unsaturated monomer (B) to thereby yield a vinyl polymer and to combine a vinyl polymer chain comprising vinyl polymer segments in the principal chain or skeleton of the vinyl polymer with a urethane polymer chain comprising urethane polymer segments in the principal chain or skeleton of the urethane polymer having an ethylenically unsaturated bond. According to a method using Step (Y1-d), a vinyl-urethane bipolymer is prepared by carrying out a reaction between the compound (C) and the urethane polymer (A) in the aqueous dispersion or aqueous solution of the urethane polymer (A) using the compound (C) to yield a urethane polymer having an ethylenically unsaturated bond; carrying out a reaction relating to the ethylenically unsaturated bond of the urethane polymer simultaneously with the polymerization of the ethylenically unsaturated monomer (B); and, simultaneously with these reactions, adding another portion of the compound (C) to the system and carrying out a reaction relating to the compound (C), so as to prepare a vinyl polymer and to combine a vinyl polymer chain comprising vinyl polymer segments in the principal chain or skeleton of the vinyl polymer with a urethane polymer chain comprising urethane polymer segments in the principal chain or skeleton of the urethane polymer (A).

Of methods for preparing a vinyl-urethane bipolymer by carrying out a reaction using the compound (C) simultaneously with the polymerization of the ethylenically unsaturated monomer (B) as in the method using Step (Y1-a), the method using Step (Y1-a), for example, can be any of: (Y1-a1) a method for preparing a vinyl-urethane bipolymer by carrying out a reaction of the compound (C) with the ethylenically unsaturated monomer (B) to yield a vinyl polymer containing a hydrolysis-reactive group, and then carrying out a reaction of the vinyl polymer containing a hydrolysis-reactive group with the urethane polymer (A); (Y1-a2) a method for preparing a vinyl-urethane bipolymer by initially carrying out a reaction of the compound (C) with the urethane polymer (A) to yield a urethane polymer containing an unsaturated bond-reactive group, and then carrying out a reaction of the urethane polymer containing an unsaturated bond-reactive group with a vinyl polymer as a polymerized product of the ethylenically unsaturated monomer (B); and (Y1-a3) a method for preparing a vinyl-urethane bipolymer by carrying out a reaction of the compound (C) with the urethane polymer (A) simultaneously with a reaction of the compound (C) with the ethylenically unsaturated monomer (B) or a vinyl polymer as a polymerized product of the ethylenically unsaturated monomer (B), and a polymerization reaction of the ethylenically unsaturated monomer (B).

Thus, the polymerization reaction of the ethylenically unsaturated monomer (B), the reaction relating to an unsaturated bond-reactive group derived from the compound (C), and the reaction relating to a hydrolysis-reactive group derived from the compound (C) may be carried out simultaneously with each other or sequentially.

The method for polymerizing the ethylenically unsaturated monomer (B) is not specifically limited and can be any known or conventional method for polymerizing an ethylenically unsaturated monomer. For example, a method of carrying out the polymerization using a polymerization initiator and/or a chain-transfer agent can be employed. Examples of the polymerization initiator include azo compound polymerization initiators such as 2,2'-azobisisobutyronitrile, 2,2'-azobis(2-methylbutyronitrile), 2,2'-azobis(2,4-dimethylvaleronitrile), 2,2'-azobis(2-methyl-4-trimethoxysilylpentanitrile), 2,2'-azobis(2-methyl-4-methyldimethoxysilylpentanitrile), and 2,2'-azobis(2-N-benzylamidino)propane hydrochloride; peroxide polymerization initiators such as t-butyl hydroperoxide, t-butyl hydroperoxymaleate, succinyl peroxide, benzoyl peroxide, cumene hydroperoxide, diisopropyl peroxydicarbonate, cumyl peroxyneodecanoate, cumyl peroxyoctoate, and hydrogen peroxide; persulfate polymerization initiators such as potassium persulfate, sodium persulfate, and ammonium persulfate; redox polymerization initiators using a reducing agent such as acidic sodium sulfite, Rongalite, and ascorbic acid. Examples of the chain-transfer agent include mercaptans including alkylmercaptans such as laurylmercaptan, n-butylmercaptan, t-butylmercaptan, and isopropylmercaptan, and arylmercaptans; thiocarboxylic acids such as thioacetic acid and thiobenzoic acid; sulfides such as dibutyl disulfide and diacetyl disulfide; thioalcohols such as 2-mercaptoethanol, 2,3-dimethylcapto-1-propanol, thio-β-naphthol, and thiophenol; glycidylmercaptan; mercaptosilanes such as γ-mercaptopropyltrimethoxysilane and γ-mercaptopropylmethyldimethoxysilane; and γ-trimethoxysilylpropyl disulfide.

The polymerization temperature can be selected as appropriate according typically to the type of the ethylenically unsaturated monomer (B) and can be, for example, about 20° C. to about 100° C. and preferably about 40° C. to about 90° C. The polymerization reaction time is not specifically limited and can be, for example, several hours to several tens of hours.

When none or only part of the ethylenically unsaturated monomer (B) is used as a solvent in the preparation of the urethane polymer (A), the polymerization of the ethylenically unsaturated monomer (B) can be conducted, for example, by a method of adding the ethylenically unsaturated monomer (B) or the remainder thereof to the aqueous dispersion or aqueous solution of the urethane polymer (A) in one process and then carrying out the polymerization; a method of adding part of the ethylenically unsaturated monomer (B) and then carrying out the polymerization while adding the remainder dropwise to the aqueous dispersion or aqueous solution; or a method of carrying out the polymerization while adding the whole dropwise to the aqueous dispersion or aqueous solution. The ethylenically unsaturated monomer (B) can be added dropwise by any procedure such as continuous dropwise addition or intermittent dropwise addition.

A dispersing agent such as a surfactant or an emulsifier may be used in the polymerization while adding the ethylenically unsaturated monomer (B) dropwise. Specifically, the ethylenically unsaturated monomer (B) can be added dropwise to the aqueous dispersion or aqueous solution of the urethane polymer (A) by emulsifying or dispersing the ethylenically unsaturated monomer (B) typically with a surfactant to yield an emulsion and adding the emulsion dropwise.

Reactions relating to the compound (C) include reactions relating to an unsaturated bond-reactive group derived from the compound (C), and reactions relating to a hydrolysis-reactive group derived from the compound (C). The reactions relating to an unsaturated bond-reactive group derived from the compound (C) include a reaction between an unsaturated bond-reactive group derived from the compound (C) and an ethylenically unsaturated bond derived from the ethylenically unsaturated monomer (B); and a reaction between unsaturated bond-reactive groups derived from the compound (C). The reaction procedure herein is not specifically limited and can be carried out as in the procedure of polymerizing the ethylenically unsaturated monomer (B).

The unsaturated bond-reactive group derived from the compound (C) includes an unsaturated bond-reactive group of the compound (C), and an unsaturated bond-reactive group of a urethane polymer having an unsaturated bond-reactive group, as a reaction product between the compound (C) and the urethane polymer (A). The ethylenically unsaturated bond derived from the ethylenically unsaturated monomer (B) includes an ethylenically unsaturated bond of the ethylenically unsaturated monomer (B), and an ethylenically unsaturated bond of a polymerized product of the ethylenically unsaturated monomer (B).

Reactions relating to a hydrolysis-reactive group derived from the compound (C) include a reaction between a hydrolysis-reactive group derived from the compound (C) and a silicon-containing hydrolyzable group of the urethane polymer (A), and a reaction between hydrolysis-reactive groups derived from the compound (C). The reaction method is not specifically limited, and the reaction can be carried out, for example, by heating to 30° C. or higher. The heating temperature is not specifically limited, as long as it is 30° C. or higher, and is preferably 35° C. or higher, and more preferably 38° C. or higher. The upper limit of the heating temperature is not specifically limited, but the temperature is, for example, 70° C. or lower, preferably 60° C. or lower, more preferably 50° C. or lower, and specifically preferably 45° C. or lower. The reaction temperature is preferably kept constant or substantially constant. Accordingly, heating and/or cooling may be conducted so as to keep such a constant or substantially constant temperature.

This reaction[the reaction relating to a hydrolysis-reactive group derived from the compound (C)] is preferably carried out under flow of nitrogen gas. The reaction time is not specifically limited, can be selected within a range of, for example, ten minutes to one day, and is preferably about thirty minutes to about five hours.

The method for introducing the compound (C) into the reaction system[into the aqueous dispersion or aqueous solution of the urethane polymer (A)] in reactions relating to the compound (C) is not specifically limited. The compound (C) can be added by one process, by adding part of the compound (C) and further adding the remainder dropwise, or by adding as a whole dropwise. The dropwise addition can be carried out by any process such as continuous dropwise addition or intermittent dropwise addition.

A dispersing agent such as a surfactant or an emulsifier can be used in the introduction of the compound (C) into the reaction system[into the aqueous dispersion or aqueous solution of the urethane polymer (A)]. Specifically, the compound (C) can be introduced into the reaction system by using an emulsion which is prepared by emulsifying or dispersing the compound (C) typically with a surfactant. The compound (C) can be introduced, if in the form of an emulsion, into the reaction system, for example, by carrying out preparation of an emulsion containing the compound (C) and the ethylenically unsaturated monomer (B) and introducing the compound (C) together with the ethylenically unsaturated monomer (B) into the reaction system, or by carrying out preparation of an emulsion containing the compound (C) and another emulsion containing the ethylenically unsaturated monomer (B) separately and introducing the compound (C) into the reaction system separately from or simultaneously with the introduction of the ethylenically unsaturated monomer (B). In these procedures, the compound (C) is preferably introduced into the reaction system by dropwise addition. Of course, it is also acceptable that an emulsion containing part of the compound (C) with part or all of the ethylenically unsaturated monomer (B) is prepared so as to introduce part of the compound (C) with part or all of the ethylenically unsaturated monomer (B) is introduced into the reaction system, preferably by dropwise addition, and the remainder of the compound (C) is introduced into the reaction system before or after the introduction of the part, separately from the introduction of the ethylenically unsaturated monomer (B).

The hydrolysis-reactive group derived from the compound (C) includes a hydrolysis-reactive group of the compound (C), and a hydrolysis-reactive group of a compound having a hydrolysis-reactive group (e.g., a vinyl polymer having a hydrolysis-reactive group) as a reaction product between the compound (C) and the ethylenically unsaturated monomer (B) or a polymer thereof.

The proportions of the urethane polymer (A), the ethylenically unsaturated monomer (B), and the compound (C) components in the vinyl-urethane bipolymers are not specifically limited. For example, the proportions the urethane polymer (A) and the compound (C) can be selected within such a range that the equivalent ratio of silicon-containing hydrolyzable groups of the urethane polymer (A) to hydrolysis-reactive groups of the compound (C) [(SiO group)/(SiO-reactive group)] is more than 0.01 and equal to or less than 20, and preferably from 0.05 to 10. If the ratio [(SiO group)/(SiO-reactive group)] is 0.01 or less, the stability of the system may deteriorate due to condensation between hydrolyzable silicon atoms derived from the compound (C). If the ratio [(SiO group)/(SiO-reactive group)] exceeds 20, bipolymers may not be efficiently formed, and expected advantages may not be obtained.

The proportions of the ethylenically unsaturated monomer (B) and the compound (C) can be selected within such a range that the equivalent ratio of ethylenically unsaturated bonds of the ethylenically unsaturated monomer (B) to unsaturated bond-reactive groups of the compound (C) [(C=C unsaturated group)/(C=C unsaturated-reactive group)] is 0.2 to 2500, preferably 0.6 to 500, and more preferably 1 to 100. If the ratio [(C=C unsaturated group)/(C=C unsaturated-reactive group)] is less than 0.2, the stability may deteriorate due to condensation between hydrolyzable silicon atoms derived from the compound (C). In contrast if the ratio [(C=C unsaturated group)/(C=C unsaturated-reactive group)] exceeds 2500, bipolymers may not be efficiently formed, and expected advantages may not be obtained.

Preparation of Vinyl-Urethane Terpolymers

To prepare a vinyl-urethane terpolymer according to the production methods comprising Steps (X) and (Y), the polymerization of the ethylenically unsaturated monomer (B) is carried out and the vinyl-urethane terpolymer is prepared in the aqueous dispersion or aqueous solution of the urethane polymer (A) by combining a vinyl polymer chain with a urethane polymer chain through the intermediary of a silicone polymer chain as a Si—O bond-containing linkage segment while using the compound (C) and the silane compound (D), as is described above. Accordingly, the silane compound (D) is basically used, and the compound (C) may be used in Step (Y) within such a range that a high-molecular-weight Si—O bond-containing linkage segment is formed. Step (Y) can therefore be at least one of Steps (Y1-a), (Y1-b), (Y1-c), and (Y1-d) or at least one of Steps (Y2-a), (Y2-b), and (Y2-c).

Specifically, methods for preparing vinyl-urethane terpolymers using Steps (Y1-a), (Y1-b), (Y1-c), and/or (Y1-d) can be carried out as the methods for preparing vinyl-urethane bipolymers using Steps (Y1-a), (Y1-b), (Y1-c), and/or (Y1-d). In this procedure, a high-molecular-weight Si—O bond-containing linkage segment must be formed by carrying out a reaction relating to the compound (C) using the compound (C).

Methods for preparing vinyl-urethane terpolymers using Step (Y2-a) include: (Y2-a1) a method for preparing a vinyl-urethane terpolymer by carrying out the hydrolysis or condensation of the silane compound (D) in the aqueous dispersion or aqueous solution of the urethane polymer (A) to prepare a polymer of the silane compound (D), simultaneously therewith, combining a urethane polymer chain comprising urethane polymer segments in the principal chain or skeleton of the urethane polymer (A) with a silicone polymer chain comprising silicone polymer segments in the principal chain or skeleton of the polymer of the silane compound (D) to thereby yield a urethane polymer comprising a silicone polymer chain having a silicon-containing hydrolyzable group, thereafter carrying out the polymerization of the ethylenically unsaturated monomer (B) to prepare a vinyl polymer, and then carrying out a reaction relating to the compound (C) using the compound (C), to combine the silicone polymer chain of the urethane polymer comprising a silicone polymer chain having a silicon-containing hydrolyzable group with a vinyl polymer chain comprising vinyl polymer segments in the principal chain or skeleton of the vinyl polymer to thereby yield a vinyl-urethane terpolymer; (Y2-a2) a method for producing a vinyl-urethane terpolymer, by, in the aqueous dispersion or aqueous solution of the urethane polymer (A), carrying out the hydrolysis or condensation of the silane compound (D) to prepare a polymer of the silane compound (D) and combining a urethane polymer chain comprising urethane polymer segments in the principal chain or skeleton of the urethane polymer (A) with a silicone polymer chain comprising silicone polymer segments in the principal chain or skeleton of the polymer of the silane compound (D) to prepare a urethane polymer comprising a silicone polymer chain having a silicon-containing hydrolyzable group, further carrying out a reaction relating to the compound (C) using the compound (C) simultaneously with the polymerization of the ethylenically unsaturated monomer (B) to yield a vinyl polymer and to combine a vinyl polymer chain comprising vinyl polymer segments in the principal chain or skeleton of the vinyl polymer with the silicone polymer chain of the urethane polymer comprising a silicone polymer chain having a silicon-containing hydrolyzable group, to thereby yield a vinyl-urethane terpolymer; (Y2-a3) a method for preparing a vinyl-urethane terpolymer by, in the aqueous dispersion or aqueous solution of the urethane polymer (A), carrying out the hydrolysis or condensation of the silane compound (D) to yield a polymer of the silane compound and combining a urethane polymer chain comprising urethane polymer segments in the principal chain or skeleton of the urethane polymer (A) with a silicone polymer chain comprising silicone polymer segments in the principal chain or skeleton of the polymer of the silane compound (D) to yield a urethane polymer comprising a silicone polymer chain having a silicon-containing hydrolyzable group, thereafter carrying out a reaction between the compound (C) and the urethane polymer comprising a silicone polymer chain having a silicon-containing hydrolyzable group using the compound (C) to yield a urethane polymer having an unsaturated bond-reactive group and comprising a silicone polymer chain, and then carrying out the polymerization of the ethylenically unsaturated monomer (B) to prepare a vinyl polymer and to combine a vinyl polymer chain comprising vinyl polymer segments in the principal chain or skeleton of the vinyl polymer with the silicone polymer chain of the urethane polymer having an unsaturated bond-reactive group and comprising a silicone polymer chain, to thereby yield a vinyl-urethane terpolymer; and (Y2-a4) a method for preparing a vinyl-urethane terpolymer by, in the aqueous dispersion or aqueous solution of the urethane polymer (A), carrying out a reaction relating to the compound (C) using the compound (C) simultaneously with the hydrolysis or condensation of the silane compound (D) to prepare a polymer comprising the silane compound (D) and/or the compound (C) as a monomer component, combining a urethane polymer chain comprising urethane polymer segments in the principal chain or skeleton of the urethane polymer (A) with a silicone polymer chain comprising silicone polymer segments having an unsaturated bond-reactive group in the principal chain or skeleton of the polymer comprising the silane compound (D) and/or the compound (C) as a monomer component to thereby yield a urethane polymer comprising a silicone polymer chain having an unsaturated bond-reactive group, thereafter further carrying out the polymerization of the ethylenically unsaturated monomer (B) to prepare a vinyl polymer and to combine a vinyl polymer chain comprising vinyl polymer segments in the principal chain or skeleton of the vinyl polymer with the silicone polymer chain of the urethane polymer comprising a silicone polymer chain having an unsaturated bond-reactive group, to thereby yield a vinyl-urethane terpolymer; and a method comprising these methods in combination.

Methods for preparing vinyl-urethane terpolymers using Step (Y2-b) include: (Y2-b1) a method for preparing a vinyl-urethane terpolymer by, in the aqueous dispersion or aqueous solution of the urethane polymer (A), carrying out the polymerization of the ethylenically unsaturated monomer (B) simultaneously with the hydrolysis or condensation of the silane compound (D) to prepare a polymer of the silane compound (D), combining a urethane polymer chain comprising urethane polymer segments in the principal chain or skeleton of the urethane polymer (A) with a silicone polymer chain comprising silicone polymer segments in the principal chain or skeleton of the polymer of the silane compound (D) to thereby yield a urethane polymer comprising a silicone polymer chain having a silicon-containing hydrolyzable group and to yield a polymer of the ethylenically unsaturated monomer (B) (vinyl polymer), thereafter carrying out a reaction relating to the compound (C) using the compound (C) to thereby combine the silicone polymer chain of the urethane polymer comprising a silicone polymer chain having a silicon-containing hydrolyzable group with a vinyl polymer chain comprising vinyl polymer segments in the principal chain or skeleton of the vinyl polymer, to thereby yield a vinyl-urethane terpolymer; (Y2-b2) a method for preparing a vinyl-urethane terpolymer by, in the aqueous dispersion or aqueous solution of the urethane polymer (A), carrying out the polymerization of the ethylenically unsaturated monomer (B) simultaneously with the hydrolysis or condensation of the silane compound (D), and simultaneously carrying out a reaction relating to the compound (C) using the compound (C), to thereby yield a polymer of the silane compound (D) and a polymer of the ethylenically unsaturated monomer (B) (vinyl polymer), to combine a urethane polymer chain comprising urethane polymer segments in the principal chain or skeleton of the urethane polymer (A) with a silicone polymer chain comprising silicone polymer segments in the principal chain or skeleton of the polymer of the silane compound (D), and to combine a silicone polymer chain comprising silicone polymer segments in the principal chain or skeleton of the polymer of the silane compound (D) with a vinyl polymer chain comprising vinyl polymer segments in the principal chain or skeleton of the vinyl polymer, to thereby yield a vinyl-urethane terpolymer; and a method comprising these methods in combination.

Methods for preparing vinyl-urethane terpolymers using Step (Y2-c) include: (Y2-c1) a method for preparing a vinyl-urethane terpolymer by, in the aqueous dispersion or aqueous solution of the urethane polymer (A), carrying out the polymerization of the ethylenically unsaturated monomer (B) to prepare a vinyl polymer, thereafter carrying out the hydrolysis or condensation of the silane compound (D) to prepare a polymer of the silane compound (D) and to combine a urethane polymer chain comprising urethane polymer segments in the principal chain or skeleton of the urethane polymer (A) with a silicone polymer chain comprising silicone polymer segments in the principal chain or skeleton of the polymer of the silane compound (D) to thereby yield a urethane polymer comprising a silicone polymer chain having a silicon-containing hydrolyzable group, thereafter carrying out a reaction relating to the compound (C) using the compound (C) to combine the silicone polymer chain of the urethane polymer comprising a silicone polymer chain having a silicon-containing hydrolyzable group with a vinyl polymer chain comprising vinyl polymer segments in the principal chain or skeleton of the vinyl polymer, to thereby yield a vinyl-urethane terpolymer; (Y2-c2) a method for preparing a vinyl-urethane terpolymer by, in the aqueous dispersion or aqueous solution of the urethane polymer (A), carrying out the polymerization of the ethylenically unsaturated monomer (B) to prepare a vinyl polymer, thereafter carrying out a reaction relating to the compound (C) using the compound (C) simultaneously with the hydrolysis or condensation of the silane compound (D) to prepare a polymer of the silane compound (D) and to combine a urethane polymer chain comprising urethane polymer segments in the principal chain or skeleton of the urethane polymer (A) with a silicone polymer chain comprising silicone polymer segments in the principal chain or skeleton of the polymer of the silane compound (D), and to combine a silicone polymer chain comprising silicone polymer segments in the principal chain or skeleton of the polymer of the silane compound (D) with a vinyl polymer chain comprising vinyl polymer segments in the principal chain or skeleton of the vinyl polymer to thereby yield a vinyl-urethane terpolymer; and a method comprising these methods in combination.

The polymerization reaction of the ethylenically unsaturated monomer (B), the reaction relating to an unsaturated bond-reactive group derived from the compound (C), and the reaction relating to a hydrolysis-reactive group derived from the compound (C) in the preparation methods using Step (Y2-a2) can be carried out simultaneously with one another or sequentially, as in the preparation of the vinyl-urethane bipolymers. The polymerization reaction of the ethylenically unsaturated monomer (B), the reaction relating to an unsaturated bond-reactive group derived from the compound (C), the reaction relating to a hydrolysis-reactive group derived from the compound (C), and the hydrolysis reaction or condensation reaction (polymerization reaction caused by condensation) of the silane compound (D) in the preparation methods using Step (Y2-b2) can be carried out simultaneously with one another or sequentially. Likewise, the reaction relating to an unsaturated bond-reactive group derived from the compound (C), the reaction relating to a hydrolysis-reactive group derived from the compound (C), and the hydrolysis reaction or condensation reaction (polymerization reaction caused by condensation) of the silane compound (D) in the preparation methods using Step (Y2-c2) can be carried out simultaneously with one another or sequentially.

The procedure of carrying out the polymerization of the ethylenically unsaturated monomer (B) in Steps (Y2-a), (Y2-b), and (Y2-c) is not specifically limited and can be a known or conventional polymerization procedure of an ethylenically unsaturated monomer. For example, a method of carrying out the polymerization typically using a polymerization initiator and/or a chain-transfer agent can be employed, as in the polymerization of the ethylenically unsaturated monomer (B) in the preparation of the vinyl-urethane bipolymers. The polymerization initiator and the chain-transfer agent can be as mentioned above. The polymerization temperature and reaction time can also be as mentioned above. When none or only part of the ethylenically unsaturated monomer (B) is used as a solvent in the preparation of the urethane polymer (A), the polymerization of the ethylenically unsaturated monomer (B) can be conducted, for example, by a method of adding the ethylenically unsaturated monomer (B) or the remainder thereof to the aqueous dispersion or aqueous solution of the urethane polymer (A) in one process and then carrying out the polymerization; a method of adding part of the ethylenically unsaturated monomer (B) and then carrying out the polymerization while adding the remainder dropwise to the aqueous dispersion or aqueous solution; or a method of carrying out the polymerization while adding the whole dropwise to the aqueous dispersion or aqueous solution, as is described above. The ethylenically unsaturated monomer (B) can be added dropwise by any procedure such as continuous dropwise addition or intermittent dropwise addition, as is described above.

The procedure for carrying out the hydrolysis reaction or condensation reaction (polycondensation) of the silane compound (D) is not specifically limited and can be a known or conventional procedure for the hydrolysis reaction or condensation reaction of a silane compound. For example, a procedure as in the reaction relating to a hydrolysis-reactive group derived from the compound (C) in the preparation of the vinyl-urethane bipolymers, namely, a procedure of heating to 30° C. or higher can be employed. A catalyst for promoting the hydrolysis reaction or condensation reaction of the silane compound (D) can be used herein. The catalyst can be selected as appropriate from among known catalysts.

The heating temperature in the hydrolysis reaction or condensation reaction of the silane compound (D) is not specifically limited, as long as it is 30° C. or higher, but is preferably 35° C. or higher and more preferably 38° C. or higher. The upper limit of the heating temperature is not specifically limited, but the heating temperature is, for example, 70° C. or lower, preferably 60° C. or lower, more preferably 50° C. or lower, and especially preferably 45° C. or lower. The reaction temperature is preferably kept constant or substantially constant for adjusting the reactivity. Accordingly, heating and/or cooling may be conducted for keeping such a constant or substantially constant temperature.

This reaction [hydrolysis reaction or condensation reaction of the silane compound (D)] is preferably carried out under flow of nitrogen gas. The reaction time is not specifically limited, can be selected within the range of, for example, ten minutes to one day and is preferably about thirty minutes to about five hours.

In this reaction, the silane compound (D) can be added to the reaction system [to the aqueous dispersion or aqueous solution of the urethane polymer (A)] by one process, by adding part of the silane compound (D) and further adding the remainder dropwise, or by adding as a whole dropwise. The dropwise addition can be carried out by any process such as continuous dropwise addition or intermittent dropwise addition.

A dispersing agent such as a surfactant or an emulsifier can be used in the introduction of the silane compound (D) into the reaction system [into the aqueous dispersion or aqueous solution of the urethane polymer (A)]. Specifically, the silane compound (D) can be introduced into the reaction system by using an emulsion which is prepared by emulsifying or dispersing the compound (D) typically with a surfactant. The silane compound (D) can be introduced, if in the form of an emulsion, together with the ethylenically unsaturated monomer (B) and/or the compound (C) into the reaction system (preferably by dropwise addition) by preparing, for example, an emulsion containing the silane compound (D) and the ethylenically unsaturated monomer (B); an emulsion containing the silane compound (D) and the compound (C); or an emulsion containing the silane compound (D), the ethylenically unsaturated monomer (B), and the compound (C). Alternatively, the silane compound (D) can be introduced into the reaction system (preferably by dropwise addition) separately from or simultaneously with the introduction of the ethylenically unsaturated monomer (B) and/or the compound (C), by preparing an emulsion containing the silane compound (D) and separately preparing an emulsion containing the ethylenically unsaturated monomer (B) and/or the compound (C). It is also acceptable that an emulsion containing part of the silane compound (D) together with part or all of the ethylenically unsaturated monomer (B) and/or the compound (C) to thereby introduce (preferably by dropwise addition) part of the silane compound (D) together with part or all of the ethylenically unsaturated monomer (B) and/or the compound (C) into the reaction system, and the remainder of the silane compound (D) is introduced into the reaction system before or after the introduction of the part, separately from the introduction of the ethylenically unsaturated monomer (B) and/or the compound (C).

The reactions relating to the compound (C) include reactions relating to an unsaturated bond-reactive group derived from the compound (C); and reactions relating to a hydrolysis-reactive group derived from the compound (C), as is mentioned above. The reactions relating to a unsaturated bond-reactive group derived from the compound (C) include a reaction between an unsaturated bond-reactive group derived from the compound (C) and an ethylenically unsaturated bond derived from the ethylenically unsaturated monomer (B); and a reaction between unsaturated bond-reactive groups derived from the compound (C). The reaction procedure herein is not specifically limited and can be a procedure as in the method for polymerizing the ethylenically unsaturated monomer (B) in the preparation of the vinyl-urethane bipolymers.

The unsaturated bond-reactive group derived from the compound (C) includes an unsaturated bond-reactive group of the compound (C); and an unsaturated bond-reactive group of a urethane polymer having an unsaturated bond-reactive group, as a reaction product between the compound (C) and the urethane polymer (A) having at least one silicon-containing hydrolyzable group. The ethylenically unsaturated bond derived from the ethylenically unsaturated monomer (B) includes an ethylenically unsaturated bond of the ethylenically unsaturated monomer (B); and an ethylenically unsaturated bond of a polymer of the ethylenically unsaturated monomer (B).

The reactions relating to a hydrolysis-reactive group derived from the compound (C) include a reaction between a hydrolysis-reactive group derived from the compound (C) and a silicon-containing hydrolyzable group derived from the silane compound (D); a reaction between a hydrolysis-reactive group derived from the compound (C) and a silicon-containing hydrolyzable group of the urethane polymer (A); and a reaction between hydrolysis-reactive groups derived from the compound (C). The reaction procedure herein can be a procedure as in the reaction procedure between a hydrolysis-reactive group derived from the compound (C) and a silicon-containing hydrolyzable group of the urethane polymer (A) or a procedure for carrying out the hydrolysis reaction or condensation reaction of the silane compound (D) in the preparation of the vinyl-urethane bipolymers.

The hydrolysis-reactive group derived from the compound (C) includes a hydrolysis-reactive group of the compound (C); a hydrolysis-reactive group of a compound having a hydrolysis-reactive group, such as a vinyl polymer having a hydrolysis-reactive group, as a reaction product between the compound (C) and the ethylenically unsaturated monomer (B) or a polymer thereof; a hydrolysis-reactive group of a compound as a reaction product between the compound (C) and the silane compound (D); and a hydrolysis-reactive group of a polymer as a reaction product among the compound (C), the silane compound (D), and the urethane polymer (A). The silicon-containing hydrolyzable group derived from the silane compound (D) includes a silicon-containing hydrolyzable group of the silane compound (D); a silicon-containing hydrolyzable group of a urethane polymer comprising a silicone polymer chain having a silicon-containing hydrolyzable group, as a reaction product between the silane compound (D) and the urethane polymer (A); a silicon-containing hydrolyzable group of a compound as a reaction product between the silane compound (D) and the compound (C); and a silicon-containing hydrolyzable group of a polymer as a reaction product among the silane compound (D), the urethane polymer (A), and the compound (C).

The method for introducing the compound (C) into the reaction system [into the aqueous dispersion or aqueous solution of the urethane polymer (A)] in reactions relating to the compound (C) is not specifically limited. The compound (C) can be added to the reaction system by one process, by adding part of the compound (C) and further adding the remainder dropwise, or by adding as a whole dropwise, as mentioned above. The dropwise addition can be carried out by any process such as continuous dropwise addition or intermittent dropwise addition.

A dispersing agent such as a surfactant or an emulsifier can be used in the introduction of the compound (C) into the reaction system[into the aqueous dispersion or aqueous solution of the urethane polymer (A)], as mentioned above. Specifically, the compound (C) can be introduced into the reaction system by using an emulsion which is prepared by emulsifying or dispersing the compound (C) typically with a surfactant. If introduced in the form of an emulsion, the compound (C) can be introduced into the reaction system together with the ethylenically unsaturated monomer (B) and/or the silane compound (D), for example, by preparing an emulsion containing the compound (C) and the ethylenically unsaturated monomer (B); an emulsion containing the compound (C) and the silane compound (D); or an emulsion containing the compound (C), the ethylenically unsaturated monomer (B), and the silane compound (D). Alternatively, the compound (C) can be introduced (preferably by dropwise addition) into the reaction system separately from or simultaneously with the introduction of the ethylenically unsaturated monomer (B) and/or the silane compound (D), by preparing an emulsion containing the compound (C) and separately preparing an emulsion containing the ethylenically unsaturated monomer (B) and/or the silane compound (D). It is also acceptable that an emulsion containing part of the compound (C) and part or all of the ethylenically unsaturated monomer (B) and/or the silane compound (D) is prepared to introduce (preferably by dropwise addition) the part of the compound (C) and part or all of the ethylenically unsaturated monomer (B) and/or the silane compound (D) into the reaction system, and the remainder of the compound (C) is introduced into the reaction system before or after the introduction of the part thereof, separately from the introduction of the ethylenically unsaturated monomer (B) and/or the silane compound (D).

The proportions of the urethane polymer (A), the ethylenically unsaturated monomer (B), the compound (C), and the silane compound (D) components in the vinyl-urethane terpolymers are not specifically limited. For example, the proportions of the urethane polymer (A) and the silane compound (D) can be selected within such a range that the equivalent ratio of silicon-containing hydrolyzable groups of the urethane polymer (A) to silicon-containing hydrolyzable groups of the silane compound (D) [(SiO group)/(SiO group)] is 0.001 or more, for example, 0.001 to 10, and preferably 0.008 to 5. If the ratio [(SiO group)/(SiO group)] is less than 0.001, terpolymers may not be efficiently formed and expected advantages may not be obtained. The resulting polymers may tend to be bipolymers more with an increasing equivalent ratio of silicon-containing hydrolyzable groups of the urethane polymer (A) to silicon-containing hydrolyzable groups of the silane compound (D) [(SiO group)/(SiO group)], and with the resulting decreasing proportion of the compound (D).

The proportions of the compound (C) and the silane compound (D) can be selected within such a range that the equivalent ratio of hydrolysis-reactive groups of the compound (C) to silicon-containing hydrolyzable groups of the silane compound (D) [(SiO-reactive group)/(SiO group)] is 0.0001 or more, for example, 0.002 to 100, and preferably 0.01 to 10. Terpolymers may not be efficiently formed and expected advantages may not be obtained if the ratio [(SiO-reactive group)/(SiO group)] is less than 0.0001. The proportion of terpolymers may decrease and that of bipolymers may increase with an increasing equivalent ratio of hydrolysis-reactive groups of the compound (C) to silicon-containing hydrolyzable groups of the silane compound (D) [(SiO-reactive group)/(SiO group)].

The proportions of the ethylenically unsaturated monomer (B) and the compound (C) can be selected within such a range that the equivalent ratio of ethylenically unsaturated bond of the ethylenically unsaturated monomer (B) to unsaturated bond-reactive groups of the compound (C) [(C=C unsaturated group)/(C=C unsaturated-reactive group)] is 0.2 to 2500, preferably 0.6 to 500, and more preferably 1 to 100. If the ratio [(C=C unsaturated group)/(C=C unsaturated-reactive group)] is less than 0.2, the stability of the system may decrease due to condensation between hydrolyzable silicon atoms derived from the compound (C). In contrast, if the ratio [(C=C unsaturated group)/(C=C unsaturated-reactive group)] exceeds 2500, bipolymers may not be efficiently formed, and expected advantages may not be obtained.

The vinyl-urethane copolymers according to the present invention, such as vinyl-urethane bipolymers and vinyl-urethane terpolymers, can yield coatings and other cured articles having excellent hot-water resistance, water resistance, heat resistance, and weather resistance. Among them, vinyl-urethane terpolymers having a vinyl polymer chain, a silicone polymer chain, and a urethane polymer chain can yield coatings and other cured articles having excellent optical transparency, although the vinyl polymer chain and the silicone polymer chain have low solubilities (miscibilities) with each other. This is probably because they have a structure in which a vinyl polymer chain and a silicone polymer chain are combined with each other, and a vinyl polymer chain is combined at the other end of the silicone polymer chain.

As is described above, the vinyl-urethane copolymers comprise a vinyl polymer chain, a urethane polymer chain, and, optionally, a silicone polymer chain combined with one another, thereby effectively exhibit properties of the individual polymer chains, and effectively exhibit properties due to their binding. Accordingly, they exhibit excellent properties as vinyl-urethane copolymers, in which insufficient properties of the individual polymer chains are augmented with each other, in contrast to simple mixtures of the polymer chains without binding.

The vinyl-urethane copolymers have residual silicon-containing hydrolyzable groups in the urethane polymer chain, and they are cured as a result of a curing reaction, preferably a condensation reaction, of silicon-containing hydrolyzable groups of the urethane polymer chain when inside water decreases due typically to evaporation or volatilization of water. In addition, the resulting coatings and other cured articles are excellent in hot-water resistance, water resistance, heat resistance, and weather resistance and have good optical transparency. The vinyl-urethane copolymers exhibit excellent adhesion upon curing.

Consequently, the vinyl-urethane copolymers according to the present invention, such as vinyl-urethane bipolymers and vinyl-urethane terpolymers, can improve the properties of adhesives, sealing materials, and paints and other coating agents, such as adhesion, hot-water resistance, water resistance, heat resistance, and weather resistance. Especially, vinyl-urethane copolymers produced by the production methods according to the present invention are useful as base polymers for paints and other coating agents. Among them, vinyl-urethane terpolymers are more useful. Consequently, the vinyl-urethane copolymers produced by the production methods according to the present invention are useful as base polymers and other components of adhesives, sealing materials, and paints and other coating agents. Among them, the vinyl-urethane terpolymers are more useful. The vinyl-urethane copolymers produced by the production methods according to the present invention can also be used as components for treating agents (treating liquids) such as binders, laminates, sealers, and primers, sizing agents; and as base polymers and other components for cosmetics such as skin creams, milky lotions, lotions, hair styling products, hair treatment agents, hair rinses, nail care products, and antiperspirants, in addition to components for adhesives, sealing materials, and coating agents.

Articles containing vinyl-urethane copolymers, such as adhesives, sealing materials, paints and other coating agents, and cosmetics, may further comprise various additives, components, and solvents according to the types of the adhesives, coating agents and other treating agents, and cosmetics, in addition to the vinyl-urethane copolymers. Examples of such additives and other components are fillers, plasticizers, age resistors, ultraviolet absorbers, antioxidants, thermal stabilizers, colorants such as pigments and dyestuffs, fungicides, wet promoters, viscosity improvers, flavors, tackifiers, coupling agents, photo-initiated curing catalyst, emulsifier, surfactant, emulsions or latexes, crosslinking agents, moisturizing agents, antifoaming agents, and silica particles.

The silica particles can be selected as appropriate from among known silica particles (particles comprising silicon dioxide), of which silica particles containing a hydrophilic group (hereinafter also referred to as "hydrophilic group-containing silica") are preferred. Hydroxyl group is typically preferred as the hydrophilic group of the hydrophilic group-containing silica. Such a hydrophilic group-containing silica can be used as silica particles alone, such as in the form of powder, or as is dispersed in water, such as in the form of colloid dispersed in water. Specifically, the hydrophilic group-containing silica can be in any of a dry form or wet form. The hydrophilic group-containing silica can be selected as appropriate from among known silica particles containing a hydrophilic group. Examples of powdery hydrophilic group-containing silica are hydrophilic group-containing silica known as, for example, hydrophilic fumed silica or hydrophilic finely powdered silica. Examples of the hydrophilic group-containing silica in the form of colloid are hydrophilic group-containing silica known as, for example, colloidal silica or colloid of silicic acid.

Of the hydrophilic group-containing silica, the powdery hydrophilic group-containing silica can be commercially available products such as those from Nippon Aerosil Co., Ltd. under the trade names of "AEROSIL" series, such as "AEROSIL 50", "AEROSIL 90G", "AEROSIL 130", "AEROSIL 200", "AEROSIL 200V", "AEROSIL 200CF", "AEROSIL 200FAD", "AEROSIL 300", "AEROSIL 300CF", and "AEROSIL 380".

Of the hydrophilic group-containing silica, the colloidal hydrophilic group-containing silica can be commercially available products including those from Asahi Denka Co., Ltd. under the trade names of "ADELITE AT" series, such as "ADELITE AT-20", "ADELITE AT-30", "ADELITE AT-40", "ADELITE AT-50", and "ADELITE AT-20N", and those from Nissan Chemical Industries, Ltd. under the trade names of "Snowtex" series, such as "Snowtex 20", "Snowtex 30", "Snowtex 40", "Snowtex N", "Snowtex NS", and "Snowtex NXS".

The heat resistance of coatings and other cured articles derived from treating agents containing the vinyl-urethane copolymers, such as adhesives, sealing materials, and coating agents, can be significantly improved by using hydrophilic group-containing silica as silica particles. This is because residual silicon-containing hydrolyzable groups (silyl groups) in the vinyl-urethane copolymers react with hydrophilic groups of the hydrophilic group-containing silica upon curing, to thereby yield more firmly cured articles (coatings). This reaction preferably occur with surfacial hydrophilic groups of the silica particles of the hydrophilic group-containing silica.

EXAMPLES

The present invention will be illustrated in further detail with reference to several Examples below, which by no means limit the scope of the present invention. All "parts" and "percentages (%)" below are by mass, unless otherwise specified.

Preparation Example 1 of Amino Group-Containing Alkoxysilanes

An amino group-containing alkoxysilane was obtained as a reaction product by mixing N-β-(aminoethyl)-γ-aminopropylmethyldimethoxysilane with 2-ethylhexyl acrylate by a ratio of 1 mole to 2 moles and carrying out a reaction at 50° C. for seven days.

Production Example 1 of Urethane Polymer Dispersions

A reaction mixture comprising a polymer containing carboxyl groups and having terminal isocyanate groups with a content of residual isocyanate groups of 1.2% was prepared by placing 150 parts of a product of Asahi Denka Co., Ltd. under the trade name of "NS 2471" (a polyester diol, having a number-average molecular weight of 2000 and a hydroxyl value of 56.1 mg-KOH/g), 15 parts of 2,2-dimethylolbutanoic acid (having a hydroxyl value of 754.0 mg-KOH/g), 8 parts of 1,4-butanediol, 66.8 parts of isophorone diisocyanate [having an isocyanate content (NCO content) of 37.8%, IPDI], 190 parts of methyl methacrylate, and 100 parts of butyl acrylate in a four-neck separable flask equipped with a stirrer, a nitrogen gas duct, a thermometer, and a condenser, and carrying out a reaction at temperatures of 75° C. to 80° C. under flow of nitrogen gas for three hours.

Next, the whole quantity of the reaction mixture comprising a polymer containing carboxyl groups and having terminal isocyanate groups was admixed with 39.4 parts of the amino group-containing alkoxysilane obtained in "Preparation Example 1 of amino group-containing alkoxysilanes", and a reaction was carried out at temperatures of 75° C. to 80° C. under flow of nitrogen gas for one hour, to thereby yield a reaction mixture comprising a carboxyl group-containing alkoxysilylated urethane polymer.

After neutralizing carboxyl groups in the reaction mixture comprising a carboxyl group-containing alkoxysilylated urethane polymer with 10.2 parts of triethylamine, the reaction mixture was cooled to 40° C., was combined with 1350 parts of deionized water with stirring at high speed, and thereby yielded an aqueous dispersion comprising 15% of a hydrolyzable silylated urethane polymer and 15% of an acrylic monomer (aqueous dispersion of a monomer-containing silylated urethane polymer).

Production Example 2 of Urethane Polymer Dispersions

A reaction mixture comprising a polymer containing carboxyl groups and having terminal isocyanate groups with a content of residual isocyanate groups of 1.2% was prepared by placing 150 parts of a product of Asahi Denka Co., Ltd. under the trade name of "NS 2471" (a polyester diol, having a number-average molecular weight of 2000 and a hydroxyl value of 56.1 mg-KOH/g), 15 parts of 2,2-dimethylolbutanoic acid (having a hydroxyl value of 754.0 mg-KOH/g), 8 parts of 1,4-butanediol, 66.8 parts of isophorone diisocyanate [having an isocyanate content (NCO content) of 37.8%, IPDI], and 250 parts of acetone in a four-neck separable flask equipped with a stirrer, a nitrogen gas duct, a thermometer, and a condenser, and carrying out a reaction at temperatures of 75° C. to 80° C. under flow of nitrogen gas for three hours.

Next, the whole quantity of the reaction mixture comprising a polymer containing carboxyl groups and having terminal isocyanate groups was admixed with 39.4 parts of the amino group-containing alkoxysilane obtained in "Preparation Example 1 of amino group-containing alkoxysilanes", and a reaction was carried out at temperatures of 75° C. to 80° C. under flow of nitrogen gas for one hour, to thereby yield a reaction mixture comprising a carboxyl group-containing alkoxysilylated urethane polymer.

After neutralizing carboxyl groups in the reaction mixture comprising a carboxyl group-containing alkoxysilylated urethane polymer with 10.2 parts of triethylamine, the reaction mixture was cooled to 40° C., was combined with 1350 parts of deionized water with stirring at high speed, and thereby yielded a hydrolyzable silylated urethane polymer dispersion. After distilling off acetone from the dispersion at 45° C. to 50° C. under reduced pressure, the dispersion was diluted with deionized water so as to have a solid content of 15% and thereby yielded a hydrolyzable silylated urethane polymer dispersion (aqueous dispersion of a monomer-free silylated urethane polymer).

Production Example 3 of Urethane Polymer Dispersions

A reaction mixture comprising a polymer containing carboxyl groups and having terminal isocyanate groups with a content of residual isocyanate groups of 1.2% was prepared by placing 150 parts of a product of Asahi Denka Co., Ltd. under the trade name of "NS 2471" (a polyester diol, having a number-average molecular weight of 2000 and a hydroxyl value of 56.1 mg-KOH/g), 15 parts of 2,2-dimethylolbutanoic acid (having a hydroxyl value of 754.0 mg-KOH/g), 8 parts of 1,4-butanediol, 66.8 parts of isophorone diisocyanate [having an isocyanate content (NCO content) of 37.8%, IPDI], 150 parts of methyl methacrylate, and 100 parts of butyl acrylate in a four-neck separable flask equipped with a stirrer, a nitrogen gas duct, a thermometer, and a condenser, and carrying out a reaction at temperatures of 75° C. to 80° C. under flow of nitrogen gas for three hours.

Next, the whole quantity of the reaction mixture comprising a polymer containing carboxyl groups and having terminal isocyanate groups was admixed with 2.2 parts of methanol, a reaction was carried out at temperatures of 75° C. to 80° C. under flow of nitrogen gas for two hours so as to react all the residual isocyanate groups, to thereby yield a reaction mixture comprising a carboxyl group-containing urethane polymer.

After neutralizing carboxyl groups in the reaction mixture comprising a carboxyl group-containing urethane polymer with 10.2 parts of triethylamine, the reaction mixture was cooled to 40° C., was combined with 700 parts of deionized water with stirring at high speed, and thereby yielded an aqueous dispersion comprising 15% of a urethane polymer and 15% of an acrylic monomer (aqueous dispersion of a monomer-containing urethane polymer).

Example 1

A monomer emulsion was prepared by weighing 75 parts of butyl acrylate (BA), 65 parts of butyl methacrylate (BMA), 100 parts of methyl methacrylate (MMA), and 5 parts of γ-methacryloxypropyltrimethoxysilane (a product of Shin-Etsu Chemical Co., Ltd. under the trade name of "KBM 503"), and emulsifying these monomers in 200 parts of deionized water using 5 parts of a product of Asahi Denka Co., Ltd. under the trade name of "ADEKAREASOAP SR-1025" as an emulsifier.

Next, a silicone-urethane copolymer was obtained by placing 400 parts of the aqueous dispersion of a monomer-containing silylated urethane polymer obtained in "Production Example 1 of urethane polymer dispersions", 150 parts of deionized water, and 50 parts of methyltrimethoxysilane (a product of Shin-Etsu Chemical Co., Ltd. under the trade name of "KBM 13") in a four-neck separable flask equipped with a stirrer, a nitrogen gas duct, a thermometer, and a reflux condenser, elevating the temperature to 40° C. with stirring in a nitrogen atmosphere, and carrying out a reaction for one hour while maintaining the temperature (40° C.)

After elevating the liquid temperature in the separable flask to 80° C., the monomer emulsion and 2 parts of potassium persulfate (KPS) as a polymerization initiator were continuously and homogeneously added dropwise separately from different inlets over two hours, to thereby yield a vinyl-silicone-urethane copolymer.

Example 2

A silicone-urethane copolymer was obtained by placing 400 parts of the aqueous dispersion of a monomer-containing silylated urethane polymer obtained in "Production Example 1 of urethane polymer dispersions", 150 parts of deionized water, 30 parts of methyltrimethoxysilane (a product of Shin-Etsu Chemical Co., Ltd. under the trade name of "KBM 13"), and 20 parts of methyltrimethoxysilane (a product of Shin-Etsu Chemical Co., Ltd. under the trade name of "KBM 22") in a four-neck separable flask equipped with a stirrer, a nitrogen gas duct, a thermometer, and a reflux condenser, elevating the temperature to 40° C. with stirring in a nitrogen atmosphere, and carrying out a reaction for one hour while maintaining the temperature (40° C.).

Next, after elevating the liquid temperature in the separable flask to 80° C., a monomer emulsion prepared by the procedure of Example 1 and 2 parts of potassium persulfate (KPS) as a polymerization initiator were continuously and homogeneously added dropwise separately from different inlets over two hours, to thereby yield a vinyl-silicone-urethane copolymer.

Example 3

A silicone-urethane copolymer was obtained by placing 400 parts of the aqueous dispersion of a monomer-containing silylated urethane polymer obtained in "Production Example 1 of urethane polymer dispersions", 150 parts of deionized water, and 50 parts of a product of Shin-Etsu Chemical Co., Ltd. under the trade name of "KR-500" (a silicone alkoxy oligomer) in a four-neck separable flask equipped with a stirrer, a nitrogen gas duct, a thermometer, and a reflux condenser, elevating the temperature to 40° C. with stirring in a nitrogen atmosphere, and carrying out a reaction for one hour while maintaining the temperature (40° C.).

Next, after elevating the liquid temperature in the separable flask to 80° C., a monomer emulsion prepared by the procedure of Example 1 and 2 parts of potassium persulfate (KPS) as a polymerization initiator were continuously and homogeneously added dropwise separately from different inlets over two hours, to thereby yield a vinyl-silicone-urethane copolymer.

Example 4

A monomer emulsion was prepared by weighing 75 parts of butyl acrylate (BA), 65 parts of butyl methacrylate (BMA), 40 parts of methyl methacrylate (MMA), 60 parts of styrene (St), and 5 parts of γ-methacryloxypropyltrimethoxysilane (a product of Shin-Etsu Chemical Co., Ltd. under the trade name of "KBM 503"), and emulsifying these monomers in 200 parts of deionized water using 5 parts of a product of Asahi Denka Co., Ltd. under the trade name of "ADEKAREASOAP SR-1025" as an emulsifier. A vinyl-silicone-urethane copolymer was prepared by the procedure of Example 1, except for using the above-prepared monomer emulsion.

Example 5

A monomer emulsion was prepared by weighing 75 parts of butyl. acrylate (BA), 65 parts of butyl methacrylate (BMA), 100 parts of methyl methacrylate (MMA), and 5 parts of γ-mercaptopropyltrimethoxysilane (a product of Shin-Etsu Chemical Co., Ltd. under the trade name of "KBM 803"), and emulsifying these monomers in 200 parts of deionized water using 5 parts of a product of Asahi Denka Co., Ltd. under the trade name of "ADEKAREASOAP SR-1025" as an emulsifier. A vinyl-silicone-urethane copolymer was prepared by the procedure of Example 1, except for using the above-prepared monomer emulsion.

Example 6

A silicone-urethane copolymer containing an ethylenically unsaturated bond was obtained by placing 400 parts of the aqueous dispersion of a monomer-containing silylated urethane polymer obtained in "Production Example 1 of urethane polymer dispersions", 150 parts of deionized water, 40 parts of methyltrimethoxysilane (a product of Shin-Etsu Chemical Co., Ltd. under the trade name of "KBM 13"), and 10 parts of γ-methacryloxypropyltrimethoxysilane (a product of Shin-Etsu Chemical Co., Ltd. under the trade name of "KBM 503") in a four-neck separable flask equipped with a stirrer, a nitrogen gas duct, a thermometer, and a reflux condenser, elevating the temperature to 40° C. with stirring in a nitrogen atmosphere, and carrying out a reaction for one hour while maintaining the temperature (40° C.)

Next, after elevating the liquid temperature in the separable flask to 80° C., a monomer emulsion prepared by the procedure of Example 1 and 2 parts of potassium persulfate (KPS) as a polymerization initiator were continuously and homogeneously added dropwise separately from different inlets over two hours, to thereby yield a vinyl-silicone-urethane copolymer.

Example 7

A vinyl-urethane copolymer was obtained by placing 400 parts of the aqueous dispersion of a monomer-containing silylated urethane polymer obtained in "Production Example 1 of urethane polymer dispersions", and 80 parts of deionized water in a four-neck separable flask equipped with a stirrer, a nitrogen gas duct, a thermometer, and a reflux condenser, elevating the temperature to 80° C. with stirring in a nitrogen atmosphere, and continuously and homogenously adding dropwise a monomer emulsion prepared by the procedure of Example 1 and 2 parts of potassium persulfate (KPS) as a polymerization initiator dropwise separately from different inlets over two hours.

Example 8

A monomer emulsion [Monomer Emulsion (I)] was prepared by weighing 37.5 parts of butyl acrylate (BA), 32.5 parts of butyl methacrylate (BMA), and 50 parts of methyl methacrylate (MMA), and emulsifying these monomers in 100 parts of deionized water using 2.5 parts of a product of Asahi Denka Co., Ltd. under the trade name of "ADEKAREASOAP SR-1025" as an emulsifier.

Another monomer emulsion [Monomer Emulsion (II)] was prepared by weighing 37.5 parts of butyl acrylate (BA), 32.5 parts of butyl methacrylate (BMA), 50 parts of methyl methacrylate (MMA), and 5 parts of γ-methacryloxypropyltrimethoxysilane (a product of Shin-Etsu Chemical Co., Ltd. under the trade name of "KBM 503"), and emulsifying these monomers in 100 parts of deionized water using 2.5 parts of a product of Asahi Denka Co., Ltd. under the trade name of "ADEKAREASOAP SR-1025" as an emulsifier.

Next, a mixture of a vinyl polymer and a urethane polymer was obtained by placing 400 parts of the aqueous dispersion of a monomer-containing silylated urethane polymer obtained in "Production Example 1 of urethane polymer dispersions" and 80 parts of deionized water in a four-neck separable flask equipped with a stirrer, a nitrogen gas duct, a thermometer, and a reflux condenser, elevating the liquid temperature in the separable flask to 80° C. with stirring in a nitrogen atmosphere, and continuously and homogenously adding dropwise Monomer Emulsion (I) and 1 part of potassium persulfate (KPS) as a polymerization initiator separately from different inlets over one hour.

A vinyl-urethane copolymer was then obtained by carrying out aging at the temperature (80° C.) for one hour after the completion of dropwise addition, and continuously and homogenously adding dropwise Monomer Emulsion (II) and 1 part of potassium persulfate (KPS) as a polymerization initiator separately from different inlets over one hour.

Example 9

A monomer emulsion was prepared by weighing 75 parts of butyl acrylate (BA), 65 parts of butyl methacrylate (BMA), and 100 parts of methyl methacrylate (MMA), and emulsifying these monomers in 110 parts of deionized water using 5 parts of a product of Asahi Denka Co., Ltd. under the trade name of "ADEKAREASOAP SR-1025" as an emulsifier.

Next, a silicone-urethane copolymer containing an ethylenically unsaturated bond was obtained by placing 400 parts of the aqueous dispersion of a monomer-containing silylated urethane polymer obtained in "Production Example 1 of urethane polymer dispersions", 110 parts of deionized water, and 25 parts of γ-methacryloxypropyltrimethoxysilane (a product of Shin-Etsu Chemical Co., Ltd. under the trade name of "KBM 503") in a four-neck separable flask equipped with a stirrer, a nitrogen gas duct, a thermometer, and a reflux condenser, elevating the temperature to 40° C. with stirring in a nitrogen atmosphere, and carrying out a reaction for one hour while maintaining the temperature (40° C.).

After elevating the liquid temperature in the separable flask to 80° C., the monomer emulsion and 2 parts of potassium persulfate (KPS) as a polymerization initiator were continuously and homogeneously added dropwise separately from different inlets over two hours, to thereby yield a vinyl-silicone-urethane copolymer.

Example 10

A silicone-urethane copolymer containing an ethylenically unsaturated bond was obtained by placing 400 parts of the aqueous dispersion of a monomer-containing silylated urethane polymer obtained in "Production Example 1 of urethane polymer dispersions", 110 parts of deionized water, and 20 parts of γ-methacryloxypropyltrimethoxysilane (a product of Shin-Etsu Chemical Co., Ltd. under the trade name of "KBM 503") in a four-neck separable flask equipped with a stirrer, a nitrogen gas duct, a thermometer, and a reflux condenser, elevating the temperature to 40° C. with stirring in a nitrogen atmosphere, and carrying out a reaction for one hour while maintaining the temperature (40° C.).

Next, after elevating the liquid temperature in the separable flask to 80° C., a monomer emulsion prepared by the procedure of Example 1 and 2 parts of potassium persulfate (KPS) as a polymerization initiator were continuously and homogeneously added dropwise separately from different inlets over two hours, to thereby yield a vinyl-silicone-urethane copolymer.

In Example 10, γ-methacryloxypropyltrimethoxysilane (a product of Shin-Etsu Chemical Co., Ltd. under the trade name of "KBM 503") was used in the preparation of a monomer emulsion (5 parts) and in the preparation of a silicone-urethane copolymers (20 parts). In Example 9, γ-methacryloxypropyltrimethoxysilane (a product of Shin-Etsu Chemical Co., Ltd. under the trade name of "KBM 503") was used in the preparation of a silicone-urethane copolymer (25 parts).

The infrared absorption spectral data relating to the vinyl-silicone-urethane copolymer obtained in Example 10 are shown in FIG. 1. The infrared absorption spectral data are shown in FIG. 1 with the abscissa indicating the wave number (the reciprocal of the wavelength; $cm^{-1}$) and the ordinate indicating the transmittance of infrared radiation (%)

Example 11

A monomer emulsion was prepared by weighing 75 parts of butyl acrylate (BA), 65 parts of butyl methacrylate (BMA), 100 parts of methyl methacrylate (MMA), and 5 parts of γ-methacryloxypropyltrimethoxysilane (a product of Shin-Etsu Chemical Co., Ltd. under the trade name of "KBM 503") and emulsifying these monomers in 160 parts of deionized water using 5 parts of a product of Asahi Denka Co., Ltd. under the trade name of "ADEKAREASOAP SR-1025" as an emulsifier.

Next, a silicone-urethane copolymer containing an ethylenically unsaturated bond was obtained by placing 400 parts of the aqueous dispersion of a monomer-containing silylated urethane polymer obtained in "Production Example 1 of urethane polymer dispersions" and 20 parts of γ-methacryloxypropyltrimethoxysilane (a product of Shin-Etsu Chemical Co., Ltd. under the trade name of "KBM 503") in a four-neck separable flask equipped with a stirrer, a nitrogen gas duct, a thermometer, and a reflux condenser, elevating the temperature to 40° C. with stirring in a nitrogen atmosphere, and carrying out a reaction for one hour while maintaining the temperature (40° C.).

A vinyl-silicone-urethane copolymer was then prepared by elevating the liquid temperature in the separable flask to 80° C., continuously and homogenously adding dropwise the monomer emulsion and 2 parts of potassium persulfate (KPS) as a polymerization initiator separately from different inlets over two hours, adding 300 parts of an aqueous dispersion comprising hydrophilic group-containing silica as silica particles in the form of colloid dispersed in water (colloidal silica) (a product of Asahi Denka Co., Ltd. under the trade name of "ADELITE AT-20"; having a concentration of 20 percent by mass) while keeping the temperature of the system to 80° C., and carrying out a reaction at this temperature for one hour.

Example 12

A monomer emulsion was prepared by weighing 75 parts of butyl acrylate (BA), 65 parts of butyl methacrylate (BMA), 100 parts of methyl methacrylate (MMA), and 5 parts of γ-methacryloxypropyltrimethoxysilane (a product of Shin-Etsu Chemical Co., Ltd. under the trade name of "KBM 503"), and emulsifying these monomers in 160 parts of deionized water using 5 parts of a product of Asahi Denka Co., Ltd. under the trade name of "ADEKAREASOAP SR-1025" as an emulsifier.

Next, an aqueous dispersion of a hydrophilic group-containing silica was prepared by dispersing 60 parts of a hydrophilic group-containing silica (a product of Nippon Aerosil Co., Ltd. under the trade name of "AEROSIL 200") as silica particles in 240 parts of deionized water with stirring at high speed.

A silicone-urethane copolymer containing an ethylenically unsaturated bond was then obtained by placing 400 parts of the aqueous dispersion of a monomer-containing silylated urethane polymer obtained in "Production Example 1 of urethane polymer dispersions" and 20 parts of γ-methacryloxypropyltrimethoxysilane (a product of Shin-Etsu Chemical Co., Ltd. under the trade name of "KBM 503") in a four-neck separable flask equipped with a stirrer, a nitrogen gas duct, a thermometer, and a reflux condenser, elevating the temperature to 40° C. with stirring in a nitrogen atmosphere, and carrying out a reaction for one hour while maintaining the temperature (40° C.).

A vinyl-silicone-urethane copolymer was prepared by elevating the liquid temperature in the separable flask to 80° C., continuously and homogenously adding dropwise the monomer emulsion and 2 parts of potassium persulfate (KPS) as a polymerization initiator separately from different inlets over two hours, adding the aqueous dispersion of a hydrophilic group-containing silica while keeping the temperature of the system to 80° C., and carrying out a reaction at this temperature for one hour.

Example 13

A monomer emulsion was prepared by weighing 75 parts of butyl acrylate (BA), 65 parts of butyl methacrylate (BMA), 100 parts of methyl methacrylate (MMA), 5 parts of γ-methacryloxypropyltrimethoxysilane (a product of Shin-Etsu Chemical Co., Ltd. under the trade name of "KBM 503"), and 50 parts of a product of Shin-Etsu Chemical Co., Ltd. under the trade name of "KR-500" (a silicone alkoxy oligomer), and emulsifying these monomers in 200 parts of deionized water using 5 parts of a product of Asahi Denka Co., Ltd. under the trade name of "ADEKAREASOAP SR-1025" as an emulsifier.

A vinyl-silicone-urethane copolymer was then prepared by placing 400 parts of the aqueous dispersion of a monomer-containing silylated urethane polymer obtained in "Production Example 1 of urethane polymer dispersions" and 150 parts of deionized water in a four-neck separable flask equipped with a stirrer, a nitrogen gas duct, a thermometer, and a reflux condenser, elevating the liquid temperature in the separable flask to 80° C. with stirring in a nitrogen atmosphere, and continuously and homogenously adding dropwise the monomer emulsion and 2 parts of potassium persulfate (KPS) as a polymerization initiator separately from different inlets over two hours.

Example 14

A monomer emulsion [Monomer Emulsion (I)] was prepared by weighing 37.5 parts of butyl acrylate (BA), 32.5 parts of butyl methacrylate (BMA), 50 parts of methyl methacrylate (MMA), and 50 parts of a product of Shin-Etsu Chemical Co., Ltd. under the trade name of "KR-500" (a silicone alkoxy oligomer), and emulsifying these monomers in 100 parts of deionized water using 2.5 parts of a product of Asahi Denka Co., Ltd. under the trade name of "ADEKAREASOAP SR-1025" as an emulsifier.

Another monomer emulsion [Monomer Emulsion (II)] was prepared by weighing 37.5 parts of butyl acrylate (BA), 32.5 parts of butyl methacrylate (BMA), 50 parts of methyl methacrylate (MMA), and 5 parts of γ-methacryloxypropyltrimethoxysilane (a product of Shin-Etsu Chemical Co., Ltd. under the trade name of "KBM 503"), and emulsifying these monomers in 100 parts of deionized water using 2.5 parts of a product of Asahi Denka Co., Ltd. under the trade name of "ADEKAREASOAP SR-1025" as an emulsifier.

Next, a mixture of a vinyl polymer and a silicone-urethane copolymer was obtained by placing 400 parts of the aqueous dispersion of a monomer-containing silylated urethane polymer obtained in "Production Example 1 of urethane polymer dispersions" and 150 parts of deionized water in a four-neck separable flask equipped with a stirrer, a nitrogen gas duct, a thermometer, and a reflux condenser, elevating the liquid temperature in the separable flask to 80° C. with stirring in a nitrogen atmosphere, and continuously and homogenously adding dropwise Monomer Emulsion (I) and 1 part of potassium persulfate (KPS) as a polymerization initiator separately from different inlets over one hour.

Finally a vinyl-silicone-urethane copolymer was obtained by carrying out aging at the temperature (80° C.) for one hour from the completion of the dropwise addition, and continuously and homogenously adding dropwise Monomer Emulsion (II) and 1 part of potassium persulfate (KPS) as a polymerization initiator separately from different inlets over one hour.

Example 15

A monomer emulsion was prepared by weighing 75 parts of butyl acrylate (BA), 65 parts of butyl methacrylate (BMA), 100 parts of methyl methacrylate (MMA), and 5 parts of γ-methacryloxypropyltrimethoxysilane (a product of Shin-Etsu Chemical Co., Ltd. under the trade name of "KBM 503"), and emulsifying these monomers in 200 parts of deionized water using 5 parts of a product of Asahi Denka Co., Ltd. under the trade name of "ADEKAREASOAP SR-1025" as an emulsifier.

Next, 400 parts of the aqueous dispersion of a monomer-containing silylated urethane polymer obtained in "Production Example 1 of urethane polymer dispersions" and 150 parts of deionized water were placed in a four-neck separable flask equipped with a stirrer, a nitrogen gas duct, a thermometer, and a reflux condenser. The liquid temperature in the separable flask was elevated to 80° C. with stirring in a nitrogen atmosphere, and the monomer emulsion and 2 parts of potassium persulfate (KPS) as a polymerization initiator were continuously and homogenously added dropwise from different inlets over two hours. A polymerization reaction was continued at the temperature (80° C.) for one hour, the reaction mixture was cooled to 40° C., was combined with 50 parts of methyltrimethoxysilane (a product of Shin-Etsu Chemical Co., Ltd. under the trade name of "KBM 13"), and a reaction was carried out for one hour with stirring in a nitrogen atmosphere while keeping the same temperature (40° C.), to thereby yield a vinyl-silicone-urethane copolymer.

Example 16

A monomer emulsion [Monomer Emulsion (I)] was prepared by weighing 37.5 parts of butyl acrylate (BA), 32.5 parts of butyl methacrylate (BMA), and 50 parts of methyl methacrylate (MMA), and emulsifying these monomers in 100 parts of deionized water using 2.5 parts of a product of Asahi Denka Co., Ltd. under the trade name of "ADEKAREASOAP SR-1025" as an emulsifier.

Another monomer emulsion [Monomer Emulsion (II)] was prepared by weighing 75 parts of butyl acrylate (BA), 65 parts of butyl methacrylate (BMA), 100 parts of methyl methacrylate (MMA), 5 parts of γ-methacryloxypropyltrimethoxysilane (a product of Shin-Etsu Chemical Co., Ltd. under the trade name of "KBM 503"), and 50 parts of a product under the trade name of "KR-500" (Shin-Etsu Chemical Co., Ltd., silicone alkoxy oligomer), and emulsifying these monomers in 100 parts of deionized water using 2.5 parts of a product of Asahi Denka Co., Ltd. under the trade name of "ADEKAREASOAP SR-1025" as an emulsifier.

Next, a mixture of a vinyl polymer and a urethane polymer was obtained by placing 400 parts of the aqueous dispersion of a monomer-containing silylated urethane polymer obtained in "Production Example 1 of urethane polymer dispersions" and 150 parts of deionized water in a four-neck separable flask equipped with a stirrer, a nitrogen gas duct, a thermometer, and a reflux condenser, elevating the liquid temperature in the separable flask to 80° C. with stirring in a nitrogen atmosphere, and continuously and homogenously adding dropwise Monomer Emulsion (I) and 1 part of potassium persulfate (KPS) as a polymerization initiator separately from different inlets over one hour.

Finally, a vinyl-silicone-urethane copolymer was obtained by carrying out aging at the temperature (80° C.) for one hour from the completion of the dropwise addition and continuously and homogenously adding dropwise Monomer Emulsion (II) and 1 part of potassium persulfate (KPS) as a polymerization initiator separately from different inlets over one hour.

Example 17

A vinyl-silicone-urethane copolymer was prepared by the procedure of Example 1, except for using the aqueous dispersion of a monomer-free silylated urethane polymer obtained in "Production Example 2 of urethane polymer dispersions" instead of 400 parts of the aqueous dispersion of a monomer-containing silylated urethane polymer obtained in "Production Example 1 of urethane polymer dispersions", and not charging water in the polymerization.

Example 18

A vinyl-urethane copolymer was prepared by the procedure of Example 7, except for using the aqueous dispersion of a monomer-free silylated urethane polymer obtained in "Production Example 2 of urethane polymer dispersions" instead of 400 parts of the aqueous dispersion of a monomer-containing silylated urethane polymer obtained in "Production Example 1 of urethane polymer dispersions", not charging water in the polymerization, and using 120 parts of deionized water in the preparation of monomer emulsions.

Vinyl-urethane bipolymers were basically prepared in Examples 7, 8, and 18. These vinyl-urethane bipolymers each basically or mainly comprise a low-molecular-weight Si—O bond-containing linkage segment as the Si—O bond-containing linkage segment between a vinyl polymer chain and a urethane polymer chain. Accordingly, the Si—O bond-containing linkage segment in these vinyl-urethane bipolymers may further comprise a high-molecular-weight Si—O bond-containing linkage segment (silicone polymer chain).

Comparative Example 1

A monomer emulsion was prepared by weighing 75 parts of butyl acrylate (BA), 65 parts of butyl methacrylate (BMA), and 100 parts of methyl methacrylate (MMA), and emulsifying these monomers in 200 parts of deionized water using 5 parts of a product of Asahi Denka Co., Ltd. under the trade name of "ADEKAREASOAP SR-1025" as an emulsifier.

Next, a mixture of a urethane polymer and a vinyl polymer was obtained by 400 parts of the aqueous dispersion of a monomer-containing silylated urethane polymer obtained in "Production Example 1 of urethane polymer dispersions", and 70 parts of deionized water in a four-neck separable flask equipped with a stirrer, a nitrogen gas duct, a thermometer, and a reflux condenser, elevating the liquid temperature in the separable flask to 80° C. with stirring in a nitrogen atmosphere, and continuously and homogeneously adding dropwise the monomer emulsion and 2 parts of potassium persulfate (KPS) as a polymerization initiator separately from different inlets over two hours.

Comparative Example 2

A silicone-urethane copolymer was obtained by placing 400 parts of the aqueous dispersion of a monomer-containing silylated urethane polymer obtained in "Production Example 1 of urethane polymer dispersions", 140 parts of deionized water, and 50 parts of methyltrimethoxysilane (a product of Shin-Etsu Chemical Co., Ltd. under the trade name of "KBM 13") in a four-neck separable flask equipped with a stirrer, a nitrogen gas duct, a thermometer, and a reflux condenser, elevating the temperature to 40° C. with stirring in a nitrogen atmosphere, and carrying out a reaction for one hour while maintaining the temperature (40° C.).

Next, a mixture of a silicone-urethane copolymers and an acrylic polymer was obtained by elevating the liquid temperature in the separable flask to 80° C., and continuously and homogeneously adding dropwise a monomer emulsion prepared by the procedure of Comparative Example 1 and 2 parts of potassium persulfate (KPS) as a polymerization initiator separately from different inlets over two hours.

Comparative Example 3

A mixture of a silicone polymer and a urethane polymer was obtained by placing 400 parts of the aqueous dispersion of a monomer-containing urethane polymer obtained in "Production Example 3 of urethane polymer dispersion", 150 parts of deionized water, 50 parts of methyltrimethoxysilane (a product of Shin-Etsu Chemical Co., Ltd. under the trade name of "KBM 13"), and 5 parts of γ-methacryloxypropyltrimethoxysilane (a product of Shin-Etsu Chemical Co., Ltd. under the trade name of "KBM 503") in a four-neck separable flask equipped with a stirrer, a nitrogen gas duct, a thermometer, and a reflux condenser, elevating the temperature to 40° C. with stirring in a nitrogen atmosphere, and carrying out a reaction for one hour while maintaining the temperature (40° C.).

Then, a mixture of a vinyl-silicone copolymer and a urethane polymer was obtained by elevating the liquid temperature in the separable flask to 80° C., and continuously and homogeneously adding dropwise a monomer emulsion prepared by the procedure of Comparative Example 1 and 2 parts of potassium persulfate (KPS) as a polymerization initiator separately from different inlets over two hours.

Comparative Example 4

A monomer emulsion was prepared by weighing 75 parts of butyl acrylate (BA), 65 parts of butyl methacrylate (BMA), and 100 parts of methyl methacrylate (MMA), and emulsifying these monomers in 100 parts of deionized water using 5 parts of a product of Asahi Denka Co., Ltd. under the trade name of "ADEKAREASOAP SR-1025" as an emulsifier.

Next, an acrylic polymer was obtained by placing 100 parts of deionized water in a four-neck separable flask equipped with a stirrer, a nitrogen gas duct, a thermometer, and a reflux condenser, elevating the liquid temperature in the separable flask to 80° C. with stirring in a nitrogen atmosphere, and continuously and homogenously adding dropwise the monomer emulsion and 2 parts of potassium persulfate (KPS) as a polymerization initiator separately from different inlets over two hours.

Aside from this, a silicone-urethane copolymer was obtained by placing 400 parts of the aqueous dispersion of a monomer-free silylated urethane polymer obtained in "Production Example 2 of urethane polymer dispersions" and 50 parts of methyltrimethoxysilane (a product of Shin-Etsu Chemical Co., Ltd. under the trade name of "KBM 13") in a four-neck separable flask equipped with a stirrer, a nitrogen gas duct, a thermometer, and a reflux condenser, elevating the temperature to 40° C. with stirring in a nitrogen atmosphere, and carrying out a reaction for one hour while maintaining the temperature (40° C.).

Subsequently, the above-prepared acrylic polymer was placed in the separable flask containing the silicone-urethane copolymer and thereby yielded a mixture of the silicone-urethane copolymers and the acrylic polymer.

Comparative Example 5

A silicone-urethane copolymer was obtained by placing 400 parts of the aqueous dispersion of a monomer-free silylated urethane polymer obtained in "Production Example 2 of urethane polymer dispersions" and 25 parts of γ-methacryloxypropyltrimethoxysilane (a product of Shin-Etsu Chemical Co., Ltd. under the trade name of "KBM 503") in a four-neck separable flask equipped with a stirrer, a nitrogen gas duct, a thermometer, and a reflux condenser, elevating the temperature to 40° C. with stirring in a nitrogen atmosphere, and carrying out a reaction for one hour while maintaining the temperature (40° C.).

Comparative Example 6

A monomer emulsion was prepared by weighing 95 parts of butyl acrylate (BA), 65 parts of butyl methacrylate (BMA), 140 parts of methyl methacrylate (MMA), and 25 parts of γ-methacryloxypropyltrimethoxysilane (a product of Shin-Etsu Chemical Co., Ltd. under the trade name of "KBM 503"), and emulsifying these monomers in 200 parts of deionized water using 40 parts of a product of Asahi Denka Co., Ltd. under the trade name of "ADEKAREASOAP SR-1025" as an emulsifier.

Next, a vinyl-silicone copolymer was obtained by placing 270 parts of deionized water in a four-neck separable flask equipped with a stirrer, a nitrogen gas duct, a thermometer, and a reflux condenser, elevating the liquid temperature in the separable flask to 80° C. with stirring in a nitrogen atmosphere, and continuously and homogenously adding dropwise the monomer emulsion and 2 parts of potassium persulfate (KPS) as a polymerization initiator separately from different inlets over two hours.

Evaluations

The hot-water resistance, water resistance, heat resistance, and weather resistance of the polymers (vinyl-silicone-urethane terpolymers and vinyl-urethane bipolymers) according to Examples 1 to 18, and the polymers or polymer mixtures according to Comparative Examples 1 to 6 by carrying out the following hot-water resistance tests, water resistance tests, heat resistance tests, and weather resistance tests. The determination results are shown in Tables 1 to 4.

Hot-water Resistance Test

Each of the polymers (vinyl-silicone-urethane terpolymers and vinyl-urethane bipolymers) according to Examples 1 to 18, and the polymers or polymer mixtures according to Comparative Examples 1 to 6 was applied to a separate paper in such an amount as to yield a coating having a thickness after drying of 0.5 mm, was left stand at 23° C. for fourteen days, and thereby yielded a coating. The coating was peeled off from the separate paper, was immersed in deionized water at 90° C. for six hours, and was taken out from the deionized water. The degree of whitening (degree of discoloration) of the coating was visually observed, and the hot-water resistance of the coating was evaluated according to following criteria:

A: No discoloration is observed
B: Only slight bluish discoloration is observed
C: Partial whitening is observed in the coating
D: Whitening is observed overall the coating Water Resistance Test Each of the polymers (vinyl-silicone-urethane terpolymers and vinyl-urethane bipolymers) according to Examples 1 to 18, and the polymers or polymer mixtures according to Comparative Examples 1 to 6 was applied to a separate paper in such an amount as to yield a coating having a thickness after drying of 0.5 mm, was left stand at 23° C. for fourteen days, and thereby yielded a coating. The coating was peeled off from the separate paper, was immersed in deionized water at 23° C. for twenty-four hours. The degree of whitening (degree of discoloration) of the coating was visually observed, and the water resistance of the coating was evaluated according to following criteria:

A: No discoloration is observed
B: Only slight bluish discoloration is observed
C: Partial whitening is observed in the coating
D: Whitening is observed overall the coating Heat Resistance Test Each of the polymers (vinyl-silicone-urethane terpolymers and vinyl-urethane bipolymers) according to Examples 1 to 18, and the polymers or polymer mixtures according to Comparative Examples 1 to 6 was applied to a separate paper in such an amount as to yield a coating having a thickness after drying of 0.5 mm, was left stand at 23° C. for fourteen days, and thereby yielded a coating. The coating was peeled off from the separate paper, was placed on an aluminum sheet, and was left stand in an atmosphere of high temperatures at 220° C. for five minutes. A stainless steel spatula was brought into contact with the surface of the coating in an atmosphere of the temperature (220° C.) to observe tack (stickiness), and the heat resistance of the coating was determined according to the following criteria:

AA: No tack is felt and the coating can be easily peeled off from the aluminum sheet
A: No tack is felt, but the coating shows some resistance when it is peeled off from the aluminum sheet
B: Little tack is felt
C: The coating adheres to the stainless steel spatula
D: The coating is molten due to heat Weather Resistance Test Each of the polymers (vinyl-silicone-urethane terpolymers and vinyl-urethane bipolymers) according to Examples 1 to 18, and the polymers or polymer mixtures according to Comparative Examples 1 to 6 was applied to a separate paper in such an amount as to yield a coating having a thickness after drying of 0.5 mm, was left stand at 23° C. for fourteen days, and thereby yielded a coating. The coating was peeled off from the separate paper, was placed in a sunshine weather-o-meter (S.W.O.M) (an apparatus as a product of Suga Test Instruments under the trade name of "WEL-SUN-HL"). An accelerated deterioration test of the coating was carried out, the coating after 1000-hour irradiation was observed, and the weather resistance of the coating was determined according to the following criteria:

B: No change is observed
C: The coating is cured
D: The coating is disintegrated The symbols "AA", "A", "B", "C", and "D" mean "Very Excellent", "Excellent", "Good", "Fair", and "Failure", respectively, in the hot-water resistance tests, water resistance tests, heat resistance tests, and weather resistance tests.

TABLE 1

|  | Example | | | | | | | |
| --- | --- | --- | --- | --- | --- | --- | --- | --- |
|  | 1 | 2 | 3 | 4 | 5 | 6 | 7 | 8 |
| Urethane polymer (A) | | | | | | | | |
| Monomer-containing silylated urethane polymer aqueous dispersion | 400 | 400 | 400 | 400 | 400 | 400 | 400 | 400 |
| Monomer-free silylated urethane polymer aqueous dispersion | | | | | | | | |
| Monomer-containing urethane polymer aqueous dispersion | | | | | | | | |
| Ethylenically unsaturated monomer (B) | | | | | | | | |
| Methyl methacrylate (MMA) | 100 | 100 | 100 | 40 | 100 | 100 | 100 | 50 | 50 |
| Butyl methacrylate (BMA) | 65 | 65 | 65 | 65 | 65 | 65 | 65 | 32.5 | 32.5 |
| Butyl acrylate (BA) | 75 | 75 | 75 | 75 | 75 | 75 | 75 | 37.5 | 37.5 |
| Styrene (St) | | | | 60 | | | | |
| Compound (C) | | | | | | | | |
| γ-Methacryloxypropyltrimethoxysilane | 5 | 5 | 5 | 5 | | 15 | 5 | 5 |
| γ-Mercaptopropyltrimethoxysilane | | | | | 5 | | | |
| Silane compound (D) | | | | | | | | |
| Methyltrimethoxysilane | 50 | 30 | | 50 | 50 | 40 | | |
| Dimethyldimethoxysilane | | 20 | | | | | | |
| Silicone alkoxy oligomer | | | 50 | | | | | |
| Water used in polymerization | 150 | 150 | 150 | 150 | 150 | 150 | 80 | 80 |
| Water used in the preparation of monomer emulsion | 200 | 200 | 200 | 200 | 200 | 200 | 200 | 100 | 100 |
| Emulsifier | 5 | 5 | 5 | 5 | 5 | 5 | 5 | 2.5 | 2.5 |
| Nonvolatile content (%) | 40 | 40 | 40 | 40 | 40 | 40 | 40 | 40 |
| Hot-water resistance | AA | A | AA | AA | A | AA | A | A |
| Water resistance | AA | A | AA | AA | A | AA | A | A |
| Heat resistance | AA | AA | AA | AA | A | AA | AA | AA |
| Weather resistance | A | A | A | A | A | A | A | A |

TABLE 2

| | EXAMPLE | | | | | | |
|---|---|---|---|---|---|---|---|
| | 9 | 10 | 11 | 12 | 13 | 14 | 15 |
| Urethane polymer (A) | | | | | | | |
| Monomer-containing silylated urethane polymer aqueous dispersion | 400 | 400 | 400 | 400 | 400 | 400 | 400 |
| Monomer-free silylated urethane polymer aqueous dispersion | | | | | | | |
| Monomer-containing urethane polymer aqueous dispersion | | | | | | | |
| Ethylenically unsaturated monomer (B) | | | | | | | |
| Methyl methacrylate (MMA) | 100 | 100 | 100 | 100 | 100 | 50 | 50 | 100 |
| Butyl methacrylate (BMA) | 65 | 65 | 65 | 65 | 65 | 32.5 | 32.5 | 65 |
| Butyl acrylate (BA) | 75 | 75 | 75 | 75 | 75 | 37.5 | 37.5 | 75 |
| Styrene (St) | | | | | | | |
| Compound (C) | | | | | | | |
| γ-Methacryloxypropyltrimethoxysilane | 25 | 25 | 25 | 25 | 5 | | 5 | 5 |
| γ-Mercaptopropyltrimethoxysilane | | | | | | | |
| Silane compound (D) | | | | | | | |
| Methyltrimethoxysilane | | | | | | | 50 |
| Dimethyldimethoxysilane | | | | | | | |
| Silicone alkoxy oligomer | | | | 50 | 50 | | |
| Silica particles | | | | | | | |
| Silica in colloidal silica | | | 60 | | | | |
| Hydrophilic group-containing silica | | | | 60 | | | |
| Water used in polymerization | 110 | 110 | | | 150 | 150 | 150 |
| Water used in the preparation of monomer emulsion | 200 | 200 | 160 | 160 | 200 | 100 | 100 | 200 |
| Water used in preparation of silica particles or water in silica particle-containing aqueous dispersion | | | 240 | 240 | | | |
| Emulsifier | 5 | 5 | 5 | 5 | 5 | 2.5 | 2.5 | 5 |
| Nonvolatile content (%) | 40 | 40 | 40 | 40 | 40 | 40 | 40 |
| Hot-water resistance | B | A | A | A | B | B | B |
| Water resistance | B | A | A | A | B | B | B |
| Heat resistance | A | A | AA | AA | A | A | A |
| Weather resistance | B | B | B | B | B | B | B |

TABLE 3

| | Example | | |
|---|---|---|---|
| | 16 | 17 | 18 |
| Urethane polymer (A) | | | |
| Monomer-containing silylated urethane polymer aqueous dispersion | 400 | | |
| Monomer-free silylated urethane polymer aqueous dispersion | | 400 | 400 |
| Monomer-containing urethane polymer aqueous dispersion | | | |
| Ethylenically unsaturated monomer (B) | | | |
| Methyl methacrylate (MMA) | 50 | 50 | 100 | 100 |
| Butyl methacrylate (BMA) | 32.5 | 32.5 | 65 | 65 |
| Butyl acrylate (BA) | 37.5 | 37.5 | 75 | 75 |
| Styrene (St) | | | |
| Compound (C) | | | |
| γ-Methacryloxypropyltrimethoxysilane | | 5 | |
| γ-Mercaptopropyltrimethoxysilane | | | |
| Silane compound (D) | | | |
| Methyltrimethoxysilane | | | 50 |
| Dimethyldimethoxysilane | | | |
| Silicone alkoxy oligomer | | 50 | |
| Water used in polymerization | 150 | | |
| Water used in the preparation of monomer emulsion | 100 | 100 | 200 | 120 |
| Emulsifier | 2.5 | 2.5 | 5 | 5 |
| Nonvolatile content (%) | 40 | 40 | 40 |
| Hot-water resistance | B | A | B |
| Water resistance | B | A | B |
| Heat resistance | A | A | A |
| Weather resistance | B | B | B |

TABLE 4

| | Comparative Example | | | | | |
|---|---|---|---|---|---|---|
| | 1 | 2 | 3 | 4 | 5 | 6 |
| Urethane polymer (A) | | | | | | |
| Monomer-containing silylated urethane polymer aqueous dispersion | 400 | 400 | | | | |
| Monomer-free silylated urethane polymer aqueous dispersion | | | | | 400 | 400 |
| Monomer-containing urethane polymer aqueous dispersion | | | | 400 | | |

TABLE 4-continued

| | Comparative Example | | | | | |
|---|---|---|---|---|---|---|
| | 1 | 2 | 3 | 4 | 5 | 6 |
| Ethylenically unsaturated monomer (B) | | | | | | |
| Methyl methacrylate (MMA) | 100 | 100 | 100 | 100 | | 140 |
| Butyl methacrylate (BMA) | 65 | 65 | 65 | 65 | | 65 |
| Butyl acrylate (BA) | 75 | 75 | 75 | 75 | | 95 |
| Styrene (St) | | | | | | |
| Compound (C) | | | | | | |
| γ-Methacryloxypropyl-trimethoxysilane | | | 5 | | 25 | 25 |
| γ-Mercaptopropyl-trimethoxysilane | | | | | | |
| Silane compound (D) | | | | | | |
| Methyltrimethoxysilane | | 50 | 50 | 50 | | |
| Dimethyldimethoxysilane | | | | | | |
| Silicone alkoxy oligomer | | | | | | |
| Water used in polymerization | 70 | 140 | 150 | 100 | | 270 |
| Water used in the preparation of monomer emulsion | 200 | 200 | 200 | 100 | | 200 |
| Emulsifier | 5 | 5 | 5 | 5 | | 40 |
| Nonvolatile content (%) | 40 | 40 | 40 | 40 | 20 | 40 |
| Hot-water resistance | D | D | D | D | C | C |
| Water resistance | D | D | D | D | C | B |
| Heat resistance | D | C | C | D | C | C |
| Weather resistance | D | D | C | D | D | C |

Tables 1 to 4 show that the coatings derived from the vinyl-urethane copolymers (vinyl-silicone-urethane terpolymers and vinyl-urethane bipolymers) according to Examples 1 to 18 corresponding to the present invention are excellent in hot-water resistance, water resistance, heat resistance, and weather resistance. Among them, those according to Examples 11 and 12 exhibit very excellent heat resistance, because they use silica particles. In addition, the coatings derived from the vinyl-urethane copolymers according to Examples 1 to 18 have good adhesion.

In addition, the vinyl-urethane copolymers can be efficiently prepared without the use of organic solvents by using ethylenically unsaturated monomers as a solvent in the preparation of urethane polymers. This avoids treatment of wasted organic solvents. Consequently, water-based treating agents such as adhesives and coating agents can be obtained by using the vinyl-urethane copolymers according to Examples. They are water-based, thereby are highly safe and can yield coatings and other cured articles excellent in hot-water resistance, water resistance, heat resistance, and weather resistance despite that they are water-based.

The vinyl-urethane copolymers according to the present invention have the above-mentioned configurations and can yield cured articles having excellent hot-water resistance, water resistance, heat resistance, and weather resistance, despite that they are water-based. The vinyl-urethane copolymers can be efficiently produced without using organic solvents.

INDUSTRIAL APPLICABILITY

As is described above, the vinyl-urethane copolymers according to the present invention have the above-mentioned configurations and can yield cured articles having excellent hot-water resistance, water resistance, heat resistance, and weather resistance, despite that they are water-based. The vinyl-urethane copolymers can be efficiently produced without using organic solvents. Consequently, the vinyl-urethane copolymers according to the present invention are very useful as components for adhesives, sealing materials, and coating agents, as well as components for treating agents (treating liquids) such as binders, laminates, sealers, primers, and sizing agents, and components for cosmetics.

The invention claimed is:

1. An aqueous dispersion of a vinyl-urethane copolymer, said vinyl-urethane copolymer comprising:
   at least one vinyl polymer chain and at least one urethane polymer chain, the vinyl polymer chain being combined with the urethane polymer chain through the intermediary of a linkage segment having a silicon-oxygen bond,
   wherein the linkage segment having a silicon-oxygen bond is bonded to the urethane polymer chain and the vinyl polymer chain,
   wherein the urethane polymer chain is a residue of a urethane polymer (A) having at least one silicon-containing hydrolyzable group, and the vinyl polymer chain is a residue of a polymer derived from an ethylenically unsaturated monomer (B) and a compound (C) as monomer components, wherein the compound (C) comprises at least one functional group reactive with a silicon-containing hydrolyzable group and at least one functional group reactive with an ethylenically unsaturated bond-containing group,
   wherein the bonding between the urethane polymer chain and the linkage segment is at the terminal of the urethane polymer chain, and
   wherein the urethane polymer (A) having at least one silicon-containing hydrolyzable group is an alkoxysilylated urethane polymer (A1) containing at least one hydrophilic group.

2. The vinyl-urethane copolymer of claim 1, wherein the linkage segment is a silicone polymer chain.

3. The vinyl-urethane copolymer of claim 2, wherein the silicone polymer chain is derived from: a silicon-containing hydrolyzable group of a urethane polymer (A) having at least one silicon-containing hydrolyzable group; a functional group reactive with a silicon-containing hydrolyzable group of a compound (C) having at least one functional group reactive with a silicon-containing hydrolyzable group and at least one functional group reactive with an ethylenically unsaturated bond-containing group; and a silane compound (D) comprising at least one silicon-containing hydrolyzable group.

4. The vinyl-urethane copolymer of claim 1, wherein the alkoxysilylated urethane polymer (A1) containing at least one hydrophilic group is a urethane polymer containing at least one hydrophilic group and having at least one terminal alkoxysilyl group, the urethane polymer corresponding to a hydrophilic group-containing urethane polymer, except with at least part of terminal isocyanate groups being alkoxysilylated.

5. The vinyl-urethane copolymer of claim 1, wherein the alkoxysilylated urethane polymer (A1) containing at least one hydrophilic group is a urethane polymer containing at least one hydrophilic group and having at least one terminal alkoxysilyl group, as a reaction product among a compound (A1-a) containing plural isocyanate-reactive groups and having no hydrophilic group; a compound (A1-b) containing at least one hydrophilic group and plural isocyanate-reactive groups; a polyisocyanate compound (A1-c); and an alkoxysilane compound (A1-d) containing at least one isocyanate-reactive group.

6. The vinyl-urethane copolymer of claim 3, wherein the silane compound (D) having a silicon-containing hydrolyzable group is an alkoxy group-containing silane compound.

7. The vinyl-urethane copolymer of claim 1, wherein the ethylenically unsaturated monomer (B) comprises an acrylic monomer.

8. The vinyl-urethane copolymer of claim 1, wherein the compound (C) having at least one functional group reactive with a silicon-containing hydrolyzable group and at least one functional group reactive with an ethylenically unsaturated bond-containing group is a compound comprising a silicon-containing hydrolyzable group and an ethylenically unsaturated bond-containing group, or a compound comprising a silicon-containing hydrolyzable group and a mercapto group.

9. A method for producing an aqueous dispersion or aqueous solution of a vinyl-urethane copolymer comprising at least one vinyl polymer chain and at least one urethane polymer chain, the vinyl polymer chain being combined with the urethane polymer chain through the intermediary of a linkage segment having a silicon-oxygen bond, the method comprising following Steps (X) and (Y):
- Step (X) of carrying out preparation of an aqueous dispersion or aqueous solution of a urethane polymer (A) having at least one silicon-containing hydrolyzable group; and
- Step (Y) of, in the aqueous dispersion or aqueous solution of the urethane polymer (A) having at least one silicon-containing hydrolyzable group, carrying out polymerization of an ethylenically unsaturated monomer (B), and carrying out preparation of a vinyl-urethane copolymer using a compound (C) in at least one period selected from the group consisting of before the polymerization reaction, during the polymerization reaction, and after the polymerization reaction, the compound (C) having at least one functional group reactive with a silicon-containing hydrolyzable group and at least one functional group reactive with an ethylenically unsaturated bond-containing group,
- wherein the linkage segment having a silicon-oxygen bond is bonded to the urethane polymer chain and the vinyl polymer chain in the vinyl-urethane copolymer, and
- wherein the bonding between the urethane polymer chain and the linkage segment is at the terminal of the urethane polymer chain.

10. The method for producing a vinyl-urethane copolymer of claim 9, wherein Step (Y) is at least one step selected from the group consisting of following Steps (Y1-a), (Y1-b), (Y1-c), and (Y1-d):
- Step (Y1-a) of, in the aqueous dispersion or aqueous solution of the urethane polymer (A) having at least one silicon-containing hydrolyzable group, carrying out the polymerization of the ethylenically unsaturated monomer (B) simultaneously with a reaction using the compound (C) having at least one functional group reactive with a silicon-containing hydrolyzable group and at least one functional group reactive with an ethylenically unsaturated bond-containing group, to thereby yield a vinyl-urethane copolymer;
- Step (Y1-b) of, in the aqueous dispersion or aqueous solution of the urethane polymer (A) having at least one silicon-containing hydrolyzable group, carrying out the polymerization of the ethylenically unsaturated monomer (B) and subsequently carrying out a reaction using the compound (C) having at least one functional group reactive with a silicon-containing hydrolyzable group and at least one functional group reactive with an ethylenically unsaturated bond-containing group, to thereby yield a vinyl-urethane copolymer;
- Step (Y1-c) of, in the aqueous dispersion or aqueous solution of the urethane polymer (A) having at least one silicon-containing hydrolyzable group, carrying out a reaction using the functional group reactive with a silicon-containing hydrolyzable group of the compound (C) having at least one functional group reactive with a silicon-containing hydrolyzable group and at least one functional group reactive with an ethylenically unsaturated bond-containing group, and subsequently carrying out the polymerization of the ethylenically unsaturated monomer (B) simultaneously with a reaction using the functional group reactive with an ethylenically unsaturated bond-containing group of the compound (C) having at least one functional group reactive with a silicon-containing hydrolyzable group and at least one functional group reactive with an ethylenically unsaturated bond-containing group, to thereby yield a vinyl-urethane copolymer; and
- Step (Y1-d) of, in the aqueous dispersion or aqueous solution of the urethane polymer (A) having at least one silicon-containing hydrolyzable group, carrying out a reaction using the functional group reactive with a silicon-containing hydrolyzable group of the compound (C) having at least one functional group reactive with a silicon-containing hydrolyzable group and at least one functional group reactive with an ethylenically unsaturated bond-containing group, subsequently carrying out the polymerization of the ethylenically unsaturated monomer (B) and a reaction using the functional group reactive with an ethylenically unsaturated bond-containing group of the compound (C) having at least one functional group reactive with a silicon-containing hydrolyzable group and at least one functional group reactive with an ethylenically unsaturated bond-containing group simultaneously with a reaction using another additional portion of the compound (C) having at least one functional group reactive with a silicon-containing hydrolyzable group and at least one functional group reactive with an ethylenically unsaturated bond-containing group, to thereby yield a vinyl-urethane copolymer.

11. The method for producing a vinyl-urethane copolymer of claim 9, wherein Step (Y) is at least one step selected from the group consisting of following Steps (Y2-a), (Y2-b) and (Y2-c):
- Step (Y2-a) of, in the aqueous dispersion or aqueous solution of the urethane polymer (A) having at least one silicon-containing hydrolyzable group, carrying out hydrolysis or condensation of a silane compound (D) having a silicon-containing hydrolyzable group, subsequently carrying out the polymerization of the ethylenically unsaturated monomer (B) and carrying out preparation of a vinyl-urethane copolymer using the compound (C) having at least one functional group reactive with a silicon-containing hydrolyzable group and at least one functional group reactive with an ethylenically unsaturated bond-containing group in at least one period selected from the group consisting of before the hydrolysis or condensation reaction, during the hydrolysis or condensation reaction, after the hydrolysis or condensation reaction and before the polymerization reaction, during the polymerization reaction, and after the polymerization reaction;
- Step (Y2-b) of, in the aqueous dispersion or aqueous solution of the urethane polymer (A) having at least one silicon-containing hydrolyzable group, carrying out the polymerization of the ethylenically unsaturated monomer (B) simultaneously with hydrolysis or condensation of a silane compound (D) having a silicon-containing hydrolyzable group, and carrying out preparation of a vinyl-urethane copolymer using the compound (C) having at least one functional group reactive with a silicon-containing hydrolyzable group and at least one functional group reactive with an ethylenically unsaturated bond-containing group in at least one period selected from the group consisting of before the hydrolysis or condensation reaction and the polymerization reaction, during the hydrolysis or condensation reaction and the polymerization reaction, and after the hydrolysis or condensation reaction and the polymerization reaction; and Step (Y2-c) of, in the aqueous dispersion or aqueous solution of the urethane polymer (A) having at least one silicon-containing hydrolyzable group, carrying out the polymerization of the ethylenically unsaturated monomer (B), subsequently carrying out hydrolysis or condensation of a silane compound (D) having a silicon-containing hydrolyzable group, and carrying out preparation of a vinyl-urethane copolymer using the compound (C) having at least one functional group reactive with a silicon-containing hydrolyzable group and at least one functional group reactive with an ethylenically unsaturated bond-containing group in at least one period selected from the group consisting of before the polymerization reaction, during the polymerization reaction, after the polymerization reaction and before the hydrolysis or condensation reaction, during the hydrolysis or condensation reaction, and after the hydrolysis or condensation reaction.

12. The method for producing a vinyl-urethane copolymer of claim 11, wherein the silane compound (D) having a silicon-containing hydrolyzable group comprises a silane compound having at least one functional group reactive with an ethylenically unsaturated bond-containing group in combination with a silane compound free from a functional group reactive with an ethylenically unsaturated bond-containing group.

13. The method for producing a vinyl-urethane copolymer of claim 9, wherein Step (X) is following Step (X1):

Step (X1) of carrying out preparation of a urethane polymer (A) having at least one silicon-containing hydrolyzable group using an ethylenically unsaturated monomer (B) as a solvent to yield a reaction mixture, and dispersing or dissolving the reaction mixture in water to thereby yield an aqueous dispersion or aqueous solution of the urethane polymer (A) having at least one silicon-containing hydrolyzable group.

14. The method for producing a vinyl-urethane copolymer of claim 9, wherein the urethane polymer (A) having at least one silicon-containing hydrolyzable group used in Step (X) is an alkoxysilylated urethane polymer (A1) containing at least one hydrophilic group.

* * * * *